United States Patent
Duparre et al.

(10) Patent No.: US 9,516,222 B2
(45) Date of Patent: *Dec. 6, 2016

(54) ARRAY CAMERAS INCORPORATING MONOLITHIC ARRAY CAMERA MODULES WITH HIGH MTF LENS STACKS FOR CAPTURE OF IMAGES USED IN SUPER-RESOLUTION PROCESSING

(71) Applicant: Pelican Imaging Corporation, Santa Clara, CA (US)

(72) Inventors: Jacques Duparre, Jena (DE); Dan Lelescu, Morgan Hill, CA (US); Kartik Venkataraman, San Jose, CA (US)

(73) Assignee: KIP PELI P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,925

(22) Filed: May 6, 2015

(65) Prior Publication Data

US 2015/0296137 A1    Oct. 15, 2015

Related U.S. Application Data

(63) Continuation of application No. 13/832,120, filed on Mar. 15, 2013, which is a continuation-in-part of (Continued)

(51) Int. Cl.
*G02B 27/10* (2006.01)
*H04N 5/232* (2006.01)
(Continued)

(52) U.S. Cl.
CPC ........ *H04N 5/23232* (2013.01); *G02B 3/0068* (2013.01); *G02B 13/002* (2013.01);
(Continued)

(58) Field of Classification Search
CPC . G02B 27/0025; G02B 21/36; G02B 27/0075;
G02B 27/0012; G02B 3/0006; G02B 21/244; G02B 7/38; G02B 3/0068; G02B 13/002; G02B 13/0035; G02B 13/004; G02B 13/0045; H04N 5/523238; H04N 5/23229; H04N 5/2258; H04N 11/048; H04N 13/0242; H04N 9/09; H04N 9/3188; H04N 5/23232; H04N 13/0271; H04N 5/2254; H04N 5/23238; G06T 7/0051
(Continued)

(56) References Cited

U.S. PATENT DOCUMENTS 4,124,798 A  11/1978  Thompson
4,198,646 A   4/1980  Alexander et al.
(Continued)

FOREIGN PATENT DOCUMENTS

EP   840502 A2   5/1998
EP  1201407 A2   5/2002
(Continued)

OTHER PUBLICATIONS

US 8,957,977, 02/2015, Venkataraman et al. (withdrawn)
(Continued)

*Primary Examiner* — Alicia M Harrington
(74) *Attorney, Agent, or Firm* — KPPB LLP

(57) ABSTRACT

A variety of optical arrangements and methods of modifying or enhancing the optical characteristics and functionality of these optical arrangements are provided. The optical arrangements being specifically designed to operate with camera arrays that incorporate an imaging device that is formed of a plurality of imagers that each include a plurality of pixels. The plurality of imagers include a first imager having a first imaging characteristics and a second imager having a second imaging characteristics. The images generated by the plurality of imagers are processed to obtain an
(Continued)

enhanced image compared to images captured by the imagers. In many optical arrangements the MTF characteristics of the optics allow for contrast at spatial frequencies that are at least as great as the desired resolution of the high resolution images synthesized by the array camera, and significantly greater than the Nyquist frequency of the pixel pitch of the pixels on the focal plane, which in some cases may be 1.5, 2 or 3 times the Nyquist frequency.

17 Claims, 44 Drawing Sheets

Related U.S. Application Data application No. 13/536,520, filed on Jun. 28, 2012, now Pat. No. 8,804,255.

(60) Provisional application No. 61/502,158, filed on Jun. 28, 2011.

(51) Int. Cl.
  *G02B 13/00* (2006.01)
  *G06T 7/00* (2006.01)
  *H04N 5/225* (2006.01)
  *H04N 13/02* (2006.01)
  *G02B 3/00* (2006.01)

(52) U.S. Cl.
  CPC ....... *G02B 13/004* (2013.01); *G02B 13/0035* (2013.01); *G02B 13/0045* (2013.01); *G06T 7/0051* (2013.01); *H04N 5/2254* (2013.01); *H04N 5/2258* (2013.01); *H04N 5/23238* (2013.01); *H04N 13/0271* (2013.01); *G02B 3/0006* (2013.01)

(58) Field of Classification Search
  USPC .................. 359/618–622; 382/254–275, 294
  See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,358,862 B1 | 3/2002 | Ireland et al. |
| 6,443,579 B1 | 9/2002 | Myers et al. |
| 6,476,805 B1 | 11/2002 | Shum et al. |
| 6,477,260 B1 | 11/2002 | Shimomura |
| 6,502,097 B1 | 12/2002 | Chan et al. |
| 6,525,302 B2 | 2/2003 | Dowski, Jr. et al. |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,639,596 B1 | 10/2003 | Shum et al. |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,927,922 B2 | 8/2005 | George et al. |
| 6,958,862 B1 | 10/2005 | Joseph |
| 7,015,954 B1 | 3/2006 | Foote et al. |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,408,725 B2 | 8/2008 | Sato |
| 7,425,984 B2 | 9/2008 | Chen |
| 7,606,484 B1 | 10/2009 | Richards et al. |
| 7,633,511 B2 | 12/2009 | Shum et al. |
| 7,639,435 B2 | 12/2009 | Chiang et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,826,153 B2 | 11/2010 | Hong |
| 7,840,067 B2 | 11/2010 | Shen et al. |
| 7,912,673 B2 | 3/2011 | Hébert et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,297 B2 | 1/2012 | Crisan et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,169,486 B2 | 5/2012 | Corcoran et al. |
| 8,180,145 B2 | 5/2012 | Wu et al. |
| 8,189,065 B2 | 5/2012 | Georgiev et al. |
| 8,189,089 B1 | 5/2012 | Georgiev |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,244,058 B1 | 8/2012 | Intwala et al. |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,289,440 B2 | 10/2012 | Pitts et al. |

(56) References Cited

U.S. PATENT DOCUMENTS

| | | |
|---|---|---|
| 8,290,358 B1 | 10/2012 | Georgiev |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 | 3/2013 | Bassi et al. |
| 8,446,492 B2 | 5/2013 | Nakano et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,581,995 B2 | 11/2013 | Lin et al. |
| 8,619,082 B1 | 12/2013 | Ciurea et al. |
| 8,648,918 B2 | 2/2014 | Kauker et al. |
| 8,655,052 B2 | 2/2014 | Spooner et al. |
| 8,682,107 B2 | 3/2014 | Yoon et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,842,201 B2 | 9/2014 | Tajiri |
| 8,854,462 B2 | 10/2014 | Herbin et al. |
| 8,861,089 B2 | 10/2014 | Duparre |
| 8,866,912 B2 | 10/2014 | Mullis |
| 8,866,920 B2 | 10/2014 | Venkataraman et al. |
| 8,866,951 B2 | 10/2014 | Keelan |
| 8,878,950 B2 | 11/2014 | Lelescu et al. |
| 8,885,059 B1 | 11/2014 | Venkataraman et al. |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 8,928,793 B2 | 1/2015 | McMahon |
| 9,019,426 B2 | 4/2015 | Han et al. |
| 9,025,894 B2 | 5/2015 | Venkataraman et al. |
| 9,025,895 B2 | 5/2015 | Venkataraman et al. |
| 9,031,335 B2 | 5/2015 | Venkataraman et al. |
| 9,031,342 B2 | 5/2015 | Venkataraman et al. |
| 9,031,343 B2 | 5/2015 | Venkataraman et al. |
| 9,036,928 B2 | 5/2015 | Venkataraman et al. |
| 9,036,931 B2 | 5/2015 | Venkataraman et al. |
| 9,041,823 B2 | 5/2015 | Venkataraman et al. |
| 9,041,824 B2 | 5/2015 | Lelescu et al. |
| 9,041,829 B2 | 5/2015 | Venkataraman et al. |
| 9,042,667 B2 | 5/2015 | Venkataraman et al. |
| 9,055,233 B2 | 6/2015 | Mullis et al. |
| 9,094,661 B2 | 7/2015 | Venkataraman et al. |
| 9,124,815 B2 | 9/2015 | Venkataraman et al. |
| 9,128,228 B2 | 9/2015 | Duparre |
| 9,188,765 B2 | 11/2015 | Venkataraman et al. |
| 9,191,580 B2 | 11/2015 | Venkataraman et al. |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0025227 A1 | 2/2003 | Daniell |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0211405 A1 | 11/2003 | Venkataraman |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski et al. |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0009313 A1 | 1/2005 | Suzuki et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler et al. |
| 2005/0225654 A1 | 10/2005 | Feldman et al. |
| 2005/0275946 A1 | 12/2005 | Choo et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0034003 A1 | 2/2006 | Zalevsky |
| 2006/0035415 A1 | 2/2006 | Wood |
| 2006/0038891 A1 | 2/2006 | Okutomi et al. |
| 2006/0046204 A1 | 3/2006 | Ono et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam et al. |

(56) References Cited

U.S. PATENT DOCUMENTS

| | | |
|---|---|---|
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0182843 A1 | 8/2007 | Shimamura et al. |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263114 A1 | 11/2007 | Gurevich et al. |
| 2007/0268374 A1 | 11/2007 | Robinson |
| 2007/0296832 A1 | 12/2007 | Ota et al. |
| 2007/0296835 A1 | 12/2007 | Olsen |
| 2007/0296847 A1 | 12/2007 | Chang et al. |
| 2008/0006859 A1 | 1/2008 | Mionetto |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0140131 A1 | 6/2009 | Utagawa |
| 2009/0152664 A1 | 6/2009 | Klem et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0219435 A1 | 9/2009 | Yuan et al. |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone et al. |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0044815 A1 | 2/2010 | Chang et al. |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam |
| 2010/0133230 A1 | 6/2010 | Henriksen et al. |
| 2010/0133418 A1 | 6/2010 | Sargent et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang et al. |
| 2010/0177411 A1 | 7/2010 | Hegde et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265381 A1 | 10/2010 | Yamamoto et al. |
| 2010/0265385 A1 | 10/2010 | Knight |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2010/0321595 A1 | 12/2010 | Chiu et al. |
| 2011/0001037 A1 | 1/2011 | Tewinkle |
| 2011/0018973 A1 | 1/2011 | Takayama |
| 2011/0019243 A1 | 1/2011 | Constant, Jr. et al. |
| 2011/0031381 A1 | 2/2011 | Tay et al. |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1* | 5/2011 | Duparre ............ H01L 27/14621 348/340 |
| 2011/0128393 A1 | 6/2011 | Tavi et al. |
| 2011/0128412 A1 | 6/2011 | Milnes et al. |
| 2011/0149408 A1 | 6/2011 | Hahgholt et al. |

(56) References Cited

U.S. PATENT DOCUMENTS

| | | |
|---|---|---|
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra |
| 2011/0228144 A1 | 9/2011 | Tian et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic |
| 2011/0255592 A1 | 10/2011 | Sung et al. |
| 2011/0255745 A1 | 10/2011 | Hodder et al. |
| 2011/0261993 A1 | 10/2011 | Weiming et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0170134 A1 | 7/2012 | Bolis et al. |
| 2012/0176479 A1 | 7/2012 | Mayhew et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0229628 A1 | 9/2012 | Ishiyama et al. |
| 2012/0249550 A1 | 10/2012 | Akeley et al. |
| 2012/0249836 A1 | 10/2012 | Ali et al. |
| 2012/0262607 A1 | 10/2012 | Shimura et al. |
| 2012/0268574 A1 | 10/2012 | Gidon et al. |
| 2012/0287291 A1 | 11/2012 | McMahon et al. |
| 2012/0293695 A1 | 11/2012 | Tanaka |
| 2012/0307099 A1 | 12/2012 | Yahata et al. |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0016885 A1 | 1/2013 | Tsujimoto et al. |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077880 A1 | 3/2013 | Venkataraman et al. |
| 2013/0077882 A1 | 3/2013 | Venkataraman et al. |
| 2013/0088489 A1 | 4/2013 | Schmeitz et al. |
| 2013/0088637 A1 | 4/2013 | Duparre |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0223759 A1 | 8/2013 | Nishiyama et al. |
| 2013/0229540 A1 | 9/2013 | Farina et al. |
| 2013/0259317 A1 | 10/2013 | Gaddy |
| 2013/0265459 A1 | 10/2013 | Duparre et al. |
| 2013/0274923 A1 | 10/2013 | By et al. |
| 2013/0293760 A1 | 11/2013 | Nisenzon et al. |
| 2014/0009586 A1 | 1/2014 | McNamer et al. |
| 2014/0043507 A1 | 2/2014 | Wang et al. |
| 2014/0076336 A1 | 3/2014 | Clayton et al. |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0132810 A1 | 5/2014 | McMahon |
| 2014/0146201 A1 | 5/2014 | Knight et al. |
| 2014/0176592 A1 | 6/2014 | Wilburn et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |

(56) References Cited

U.S. PATENT DOCUMENTS

| | | |
|---|---|---|
| 2015/0055884 A1 | 2/2015 | Venkataraman et al. |
| 2015/0091900 A1 | 4/2015 | Yang et al. |
| 2015/0122411 A1 | 5/2015 | Rodda et al. |
| 2015/0124113 A1 | 5/2015 | Rodda et al. |
| 2015/0124151 A1 | 5/2015 | Rodda et al. |

FOREIGN PATENT DOCUMENTS

| | | |
|---|---|---|
| EP | 1734766 A2 | 12/2006 |
| EP | 2104334 A1 | 9/2009 |
| EP | 2336816 A2 | 6/2011 |
| JP | 11142609 A | 5/1999 |
| JP | 11223708 A | 8/1999 |
| JP | 2002205310 A | 7/2002 |
| JP | 2003094445 A | 4/2003 |
| JP | 2005116022 A | 4/2005 |
| JP | 2005181460 A | 7/2005 |
| JP | 2006033493 A | 2/2006 |
| JP | 2006047944 A | 2/2006 |
| JP | 2006258930 A | 9/2006 |
| JP | 2007520107 A | 7/2007 |
| JP | 2008055908 A | 3/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| TW | 200939739 A | 9/2009 |
| WO | 2007083579 A1 | 7/2007 |
| WO | 2008108271 A1 | 9/2008 |
| WO | 2008150817 A1 | 12/2008 |
| WO | 2009151903 A2 | 12/2009 |
| WO | 2011008443 A2 | 1/2011 |
| WO | 2011055655 A1 | 5/2011 |
| WO | 2011063347 A2 | 5/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |

OTHER PUBLICATIONS

US 8,964,053, 02/2015, Venkataraman et al. (withdrawn)
US 8,965,058, 02/2015, Venkataraman et al. (withdrawn)
US 9,014,491, 04/2015, Venkataraman et al. (withdrawn)
Deepu Rajan et al; Simultaneous Estimation of Super Resolved Scene and Depth Map from Low Resolution Defocused Observations;IEEE Computer Society, vol. 25, No. 9; Sep. 2003; pp. 1-16.*
International Search Report and Written Opinion for International Application PCT/US2014/064693, Completed Mar. 7, 2015, Mailed Apr. 2, 2015, 15 pgs.
Extended European Search Report for European Application EP12782935.6, report completed Aug. 28, 2014 Mailed Sep. 4, 2014, 6 Pgs.
Extended European Search Report for European Application EP12804266.0, Report Completed Jan. 27, 2015, Mailed Feb. 3, 2015, 6 Pgs.
Extended European Search Report for European Application EP12835041.0, Report Completed Jan. 28, 2015, Mailed Feb. 4, 2015, 6 Pgs.
International Preliminary Report on Patentability for International Application No. PCT/US2012/059813, Completed Apr. 15, 2014, 7 pgs.
International Preliminary Report on Patentability for International Application No. PCT/US2013/059991, Issued Mar. 17, 2015, Mailed Mar. 26, 2015, 8 pgs.
International Preliminary Report on Patentability for International Application PCT/US13/56065, Report Issued Feb. 24, 2015, Mailed Mar. 5, 2015, 4 Pgs.
International Preliminary Report on Patentability for International Application PCT/US13/62720, Issued Mar. 31, 2015, Mailed Apr. 9, 2015, 8 Pgs.
International Preliminary Report on Patentability for International Application PCT/US2013/024987, Mailed Aug. 21, 2014, 13 Pgs.
International Preliminary Report on Patentability for International Application PCT/US2013/027146, Completed Apr. 2, 2013, Issued Aug. 26, 2014, 10 pgs.
International Preliminary Report on Patentability for International Application PCT/US2013/39155, completed Nov. 4, 2014, Mailed Nov. 13, 2014, 10 Pgs.
International Preliminary Report on Patentability for International Application PCT/US2013/046002, issued Dec. 31, 2014, Mailed Jan. 8, 2015, 6 Pgs.
International Preliminary Report on Patentability for International Application PCT/US2013/048772, issued Dec. 31, 2014, Mailed Jan. 8, 2015, 8 Pgs.
International Preliminary Report on Patentability for International Application PCT/US2013/056502, Report Issued Feb. 24, 2015, Mailed Mar. 5, 2015, 7 Pgs.
International Preliminary Report on Patentability for International Application PCT/US2013/069932, issued May 19, 2015, Mailed May 28, 2015, 14 Pgs.
International Preliminary Report on Patentability for International Application PCT/US2014/018116, issued Sep. 15, 2015, Mailed Sep. 24, 2015, 12Pgs.
International Preliminary Report on Patentability for International Application PCT/US2014/023762, issued Mar. 2, 2015, Mailed Mar. 9, 2015, 10 Pgs.
International Preliminary Report on Patentability for International Application PCT/US2014/028447, issued Sep. 15, 2015, Mailed Sep. 24, 2015, 7Pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.

(56) References Cited

OTHER PUBLICATIONS

International Search Report and Written Opinion for International Application No. PCT/US13/59991, Completed Feb. 6, 2014, Mailed Feb. 26, 2014, 8 pgs.
International Search Report and Written Opinion for International Application No. PCT/US2009/044687, completed Jan. 5, 2010, date mailed Jan. 13, 2010, 9 pgs.
International Search Report and Written Opinion for International Application No. PCT/US2011/64921, Completed Feb. 25, 2011, mailed Mar. 6, 2012, 17 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 12 pgs.
International Search Report and Written Opinion for International Application No. PCT/US2013/039155, completed Jul. 1, 2013, Mailed Jul. 11, 2013, 11 Pgs.
International Search Report and Written Opinion for International Application No. PCT/US2013/048772, Completed Oct. 21, 2013, Mailed Nov. 8, 2013, 11 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Mar. 14, 2014, Mailed Apr. 14, 2014, 12 pgs.
International Search Report and Written Opinion for International Application PCT/US11/36349, mailed Aug. 22, 2011, 11 pgs.
International Search Report and Written Opinion for International Application PCT/US13/62720, report Mar. 25, 2014, Mailed Apr. 21, 2014, 9 Pgs.
International Search Report and Written Opinion for International Application PCT/US14/024903 report Jun. 12, 2014, Mailed, Jun. 27, 2014, 13 pgs.
International Search Report and Written Opinion for International Application PCT/US14/17766, report completed May 28, 2014, Mailed Jun. 18, 2014, 9 Pgs.
International Search Report and Written Opinion for International Application PCT/US14/18084, report completed May 23, 2014, Mailed Jun. 10, 2014, 12 Pgs.
International Search Report and Written Opinion for International Application PCT/US14/18116, Report completed May 13, 2014, 12 pgs.
International Search Report and Written Opinion for International Application PCT/US14/22118, report completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, Report completed Dec. 17, 2012, 8 pgs.
International Search Report and Written Opinion for International Application PCT/US2012/37670, Mailed Jul. 18, 2012, Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/024947, Completed Jul. 8, 2014, Mailed Aug 5, 2014, 8 Pgs.
International Search Report and Written Opinion for International Application PCT/US2014/028447, completed Jun. 30, 2014, Mailed Jul. 21, 2014, 8 Pgs.
International Search Report and Written Opinion for International Application PCT/US2014/30692, completed Jul. 28, 2014, Mailed Aug 27, 2014, 7 Pags.
International Search Report and Written Opinion for International Application PCT/US2014/066229, Completed Mar. 6, 2015, Mailed Mar. 19, 2015, 9 Pgs.
International Search Report and Written Opinion for International Application PCT/US2014/067740, Completed Jan 29, 2015, Mailed Mar. 3, 2015, 10 pgs.
International Search Report and Written Opinion for International Application PCT/US2014/23762, Completed May 30, 2014, Mailed Jul. 3, 2014, 6 Pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=1.0.1.1.

(56) References Cited

OTHER PUBLICATIONS 226.2643&rep=rep1 &type=pdf>, Title pg., abstract, table of contents, pp. 1-263 (269 total pages).
Chan et al., "Extending the Depth of Field in a Compound-Eye Imaging.System with Super-Resolution Reconstruction", Proceedings—International.Conference on Pattern Recognition, 2006, vol. 3, pp. 623-626.
Chan et al., "Investigation of Computational Compound-Eye Imaging System with Super-Resolution Reconstruction", IEEE, ISASSP 2006, pp. 1177-1180.
Chan et al., "Super-resolution reconstruction in a computational compound-eye imaging system", Multidim Syst Sign Process, 2007, vol. 18, pp. 83-101.
Chen et al., "Interactive deformation of light fields", In Proceedings of SIGGRAPH 13D 2005, pp. 139-146.
Chen et al., "KNN Matting", IEEE Transactions on Pattern Analysis and Machine Intelligence, Sep. 2013, vol. 35, No. 9, pp. 2175-2188.
Drouin et al., "Fast Multiple-Baseline Stereo with Occlusion", Proceedings of the Fifth International Conference on 3-D Digital Imaging and Modeling, 2005, 8 pgs.
Drouin et al., "Geo-Consistency for Wide Multi-Camera Stereo", Proceedings of the 2005 IEEE Computer Society Conference on Computer Vision and Pattern Recognition, 2005, 8 pgs.
Drouin et al., "Improving Border Localization of Multi-Baseline Stereo Using Border-Cut", International Journal of Computer Vision, Jul. 2009, vol. 83, Issue 3, 8 pgs.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, 2008, vol. 3, pp. 1-6.
Duparre et al., "Artificial compound eyes—different concepts and their application to ultra flat image acquisition sensors", MOEMS and Miniaturized.Systems IV, Proc. SPIE 5346, Jan. 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, 2006, vol. 1, pp. R1-R16.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Appositsion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International.Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi, et al. , "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Lee et al., "Electroactive Polymer Actuator for Lens-Drive Unit in Auto-Focus Compact Camera Module", ETRI Journal, vol. 31, No. 6, Dec. 2009, pp. 695-702.
Lensvector, "How LensVector Autofocus Works", printed Nov. 2, 2012 from http://www.lensvector.com/overview.html, 1 pg.
Levin et al., "A Closed Form Solution to Natural Image Matting", Pattern Analysis and Machine Intelligence, Feb. 2008, vol. 30, 8 pgs.
Levoy, "Light Fields and Computational Imaging", IEEE Computer Society, Aug. 2006, pp. 46-55.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.

(56) References Cited

OTHER PUBLICATIONS

Lo et al., "Stereoscopic 3D Copy & Paste", ACM Transactions on Graphics, vol. 29, No. 6, Article 147, Dec. 2010, pp. 147:1-147:10.
Mitra et al., "Light Field Denoising, Light Field Superresolution and Stereo.Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM SIGGRAPH, 2007, vol. 26, pp. 1-10, [retrieved on Jul. 8, 2015], Retrieved from the Internet <URL:http://doi.acm.org/10.1145/1276377.1276461>.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Pouydebasquea et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Wheeler et al., "Super-Resolution Image Synthesis Using Projections Onto Convex Sets in the Frequency Domain", Proc. SPIE, 2005, 5674, 12 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.

\* cited by examiner

FIG. 4B

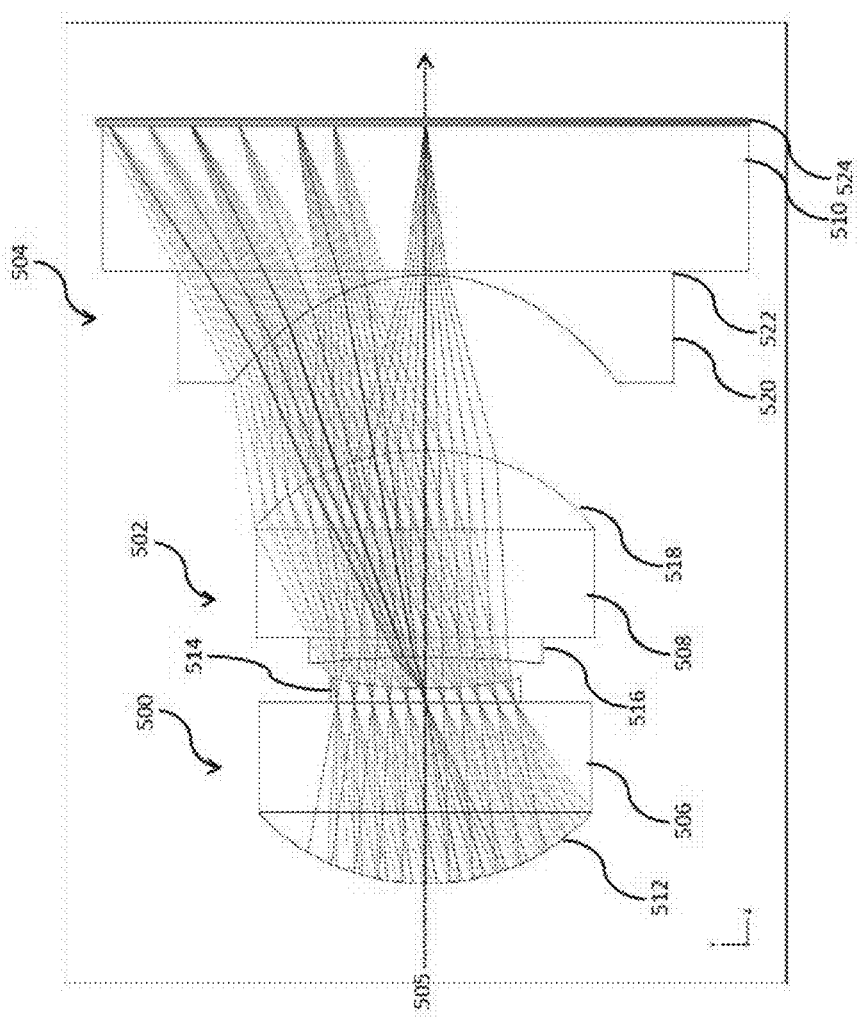
FIG. 5A1

| Surf type | Comment | Radius | Thickness | Glass | Semi-Diameter | Conic | Par 0 (unused) | 2nd Order Term | 4th Order Term | 6th Order Term | 8th Order Term | 10th Order Term |
|---|---|---|---|---|---|---|---|---|---|---|---|---|
| Obj | Standard | Infinity | 400.00 | | 213.425 | 0.000 | | | | | | |
| 1 | Standard | Infinity | 1.000 | | 1.327 | 0.000 | | | | | | |
| 2 | Even ASPH.. | 0.959 | 0.277 | 1.52,53.7 | 0.650 | 0.400 | | 0.000 | 0.000 | -0.081 | 0.219 | 0.000 |
| 3 | Standard | Infinity | 0.424 | 1.52,54.4 | 0.650 | 0.000 | | | | | | |
| STO | Standard | Infinity | 0.056 | 1.61,28.5 | 0.348 | 0.000 | | | | | | |
| 5 | Even ASPH.. | 2.068 | 0.120 | | 0.369 | 19.720 | | 0.000 | 0.000 | 0.533 | -5.047 | 0.000 |
| 6 | Even ASPH.. | -5.397 | 0.073 | 1.61,28.5 | 0.409 | 134.633 | | 0.000 | 0.000 | -1.622 | 7.681 | 0.000 |
| 7 | Standard | Infinity | 0.424 | 1.52,54.4 | 0.452 | 0.000 | | | | | | |
| 8 | Standard | Infinity | 0.304 | 1.52,53.7 | 0.661 | 0.000 | | | | | | |
| 9 | Even ASPH.. | -0.940 | 0.680 | | 0.661 | 0.472 | | 0.000 | 0.000 | 0.060 | -0.144 | 0.000 |
| 10 | Even ASPH.. | -0.765 | 0.014 | 1.52,53.7 | 0.752 | -0.624 | | 0.000 | 0.000 | 0.035 | -0.137 | 0.000 |
| 11 | Standard | Infinity | 0.566 | 1.47,66.7 | 0.963 | 0.000 | | | | | | |
| 12 | Standard | Infinity | 0.014 | 1.47,66.7 | 1.251 | 0.000 | | | | | | |
| IMA | Standard | Infinity | - | 1.47,66.7 | 1.258 | 0.000 | | | | | | |

FIG. 5A2

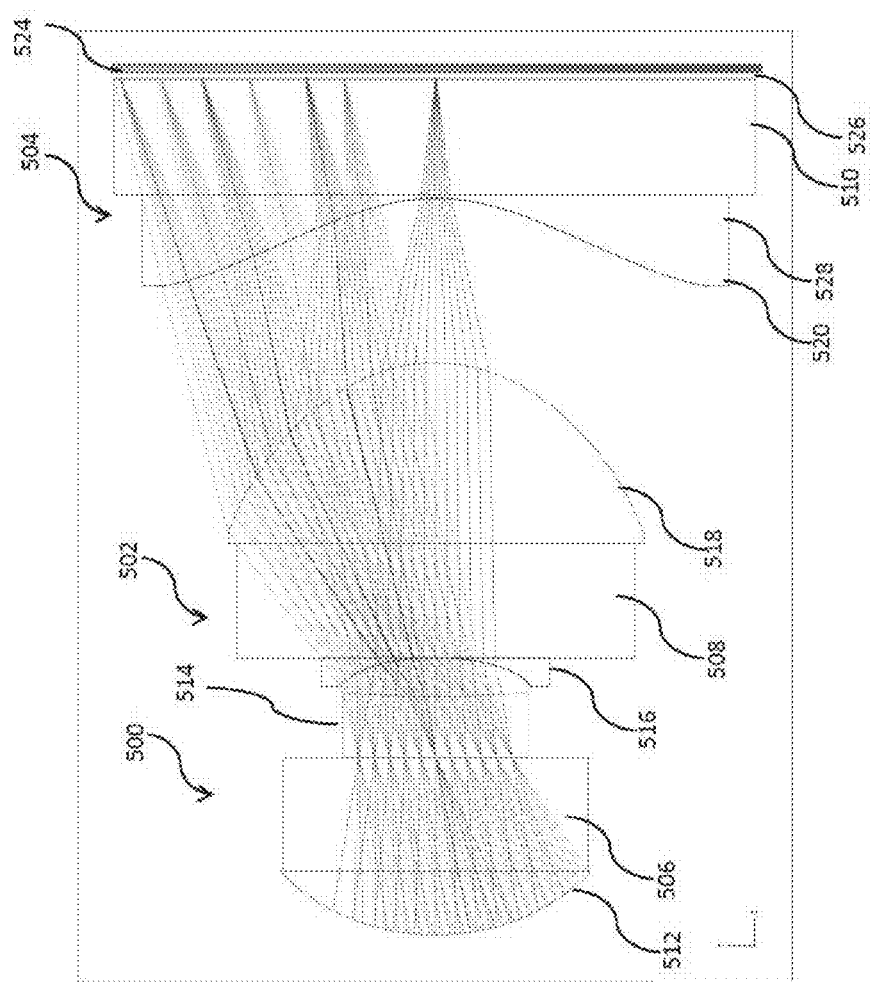
FIG. 5I1

FIG. 512

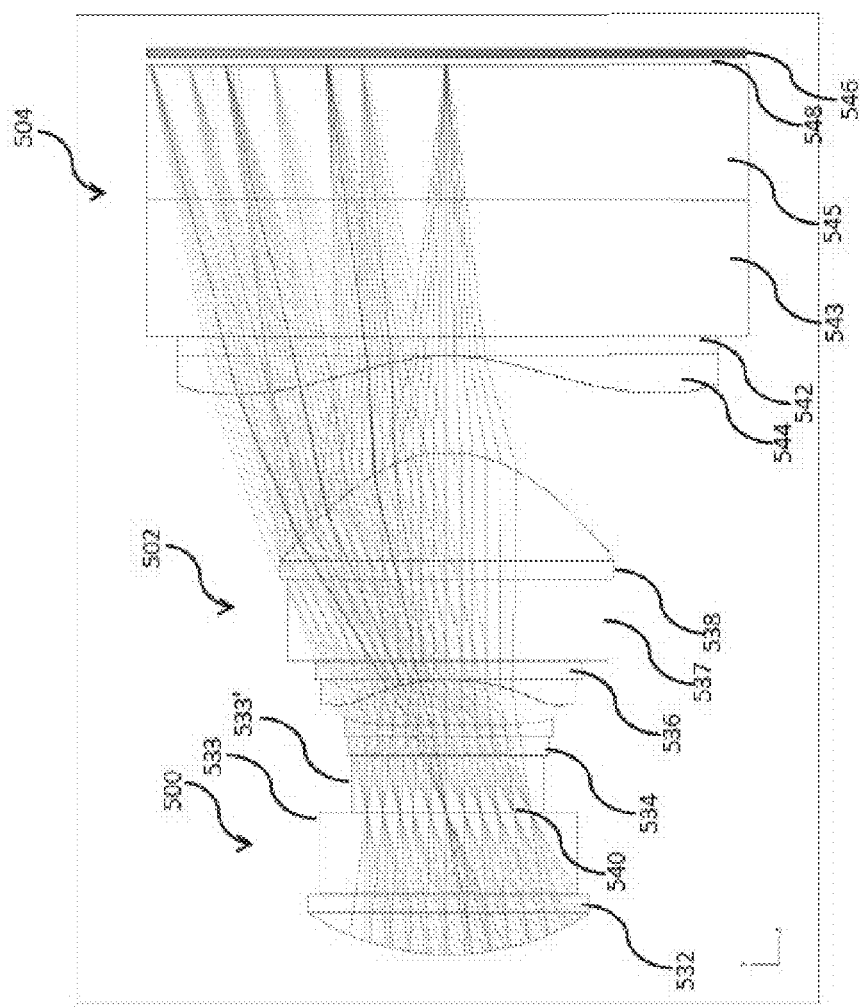
FIG. 5J1

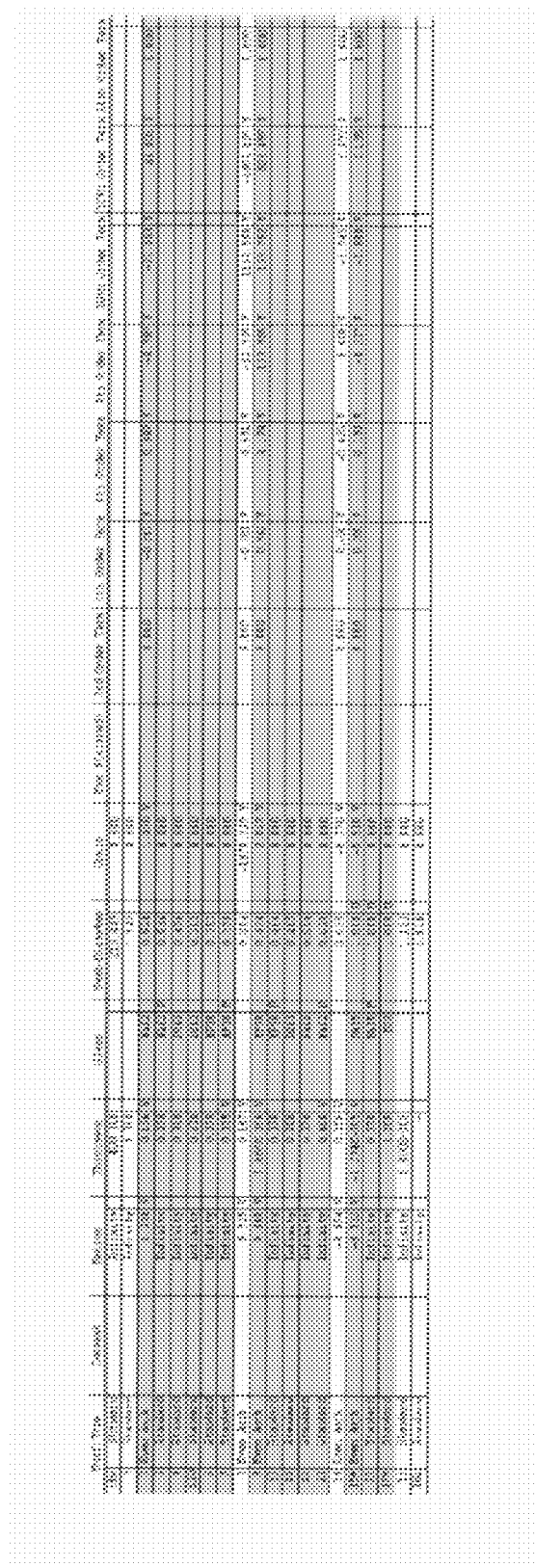
FIG. 5J2

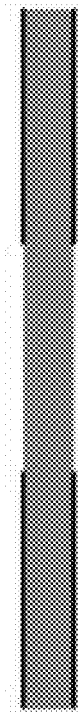 FIG. 6D1
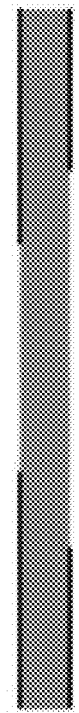 FIG. 6D2
 FIG. 6D3
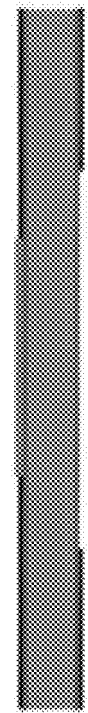 FIG. 6D4
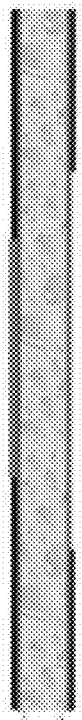 FIG. 6D5
 FIG. 6D6

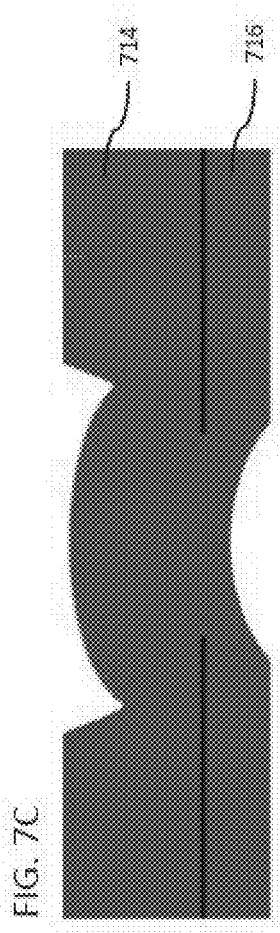
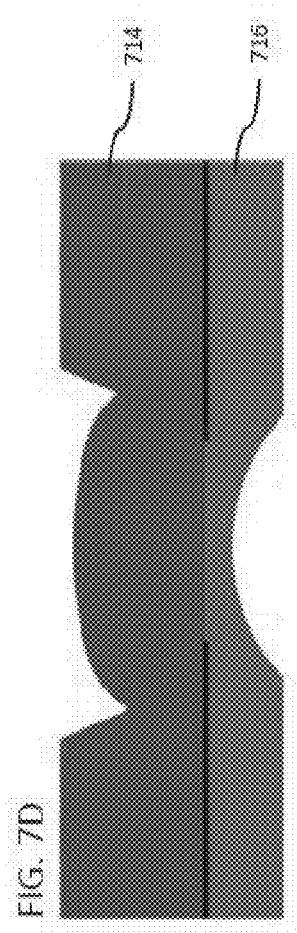

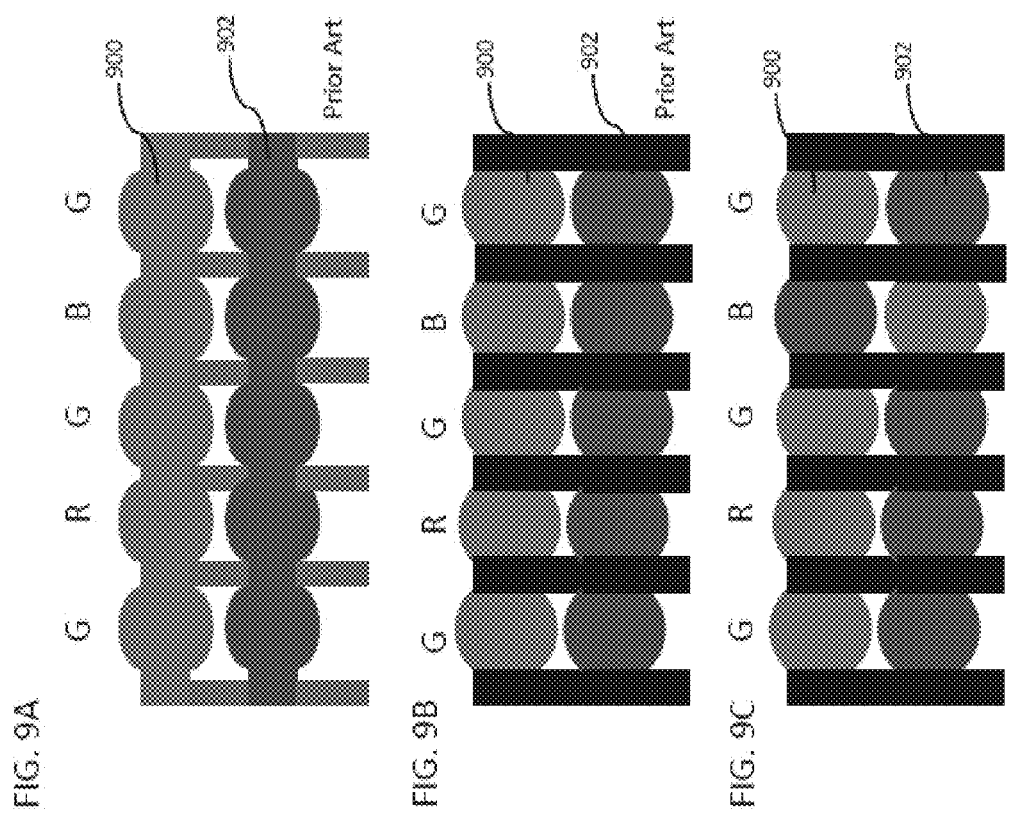

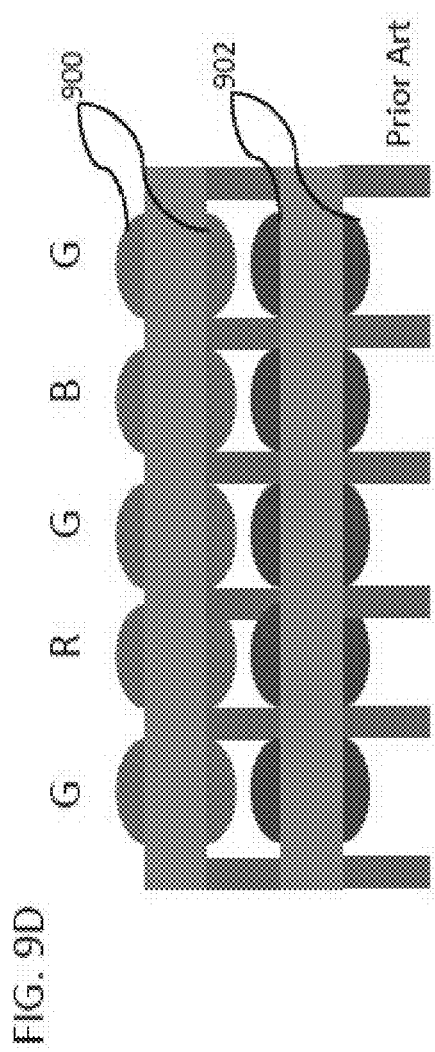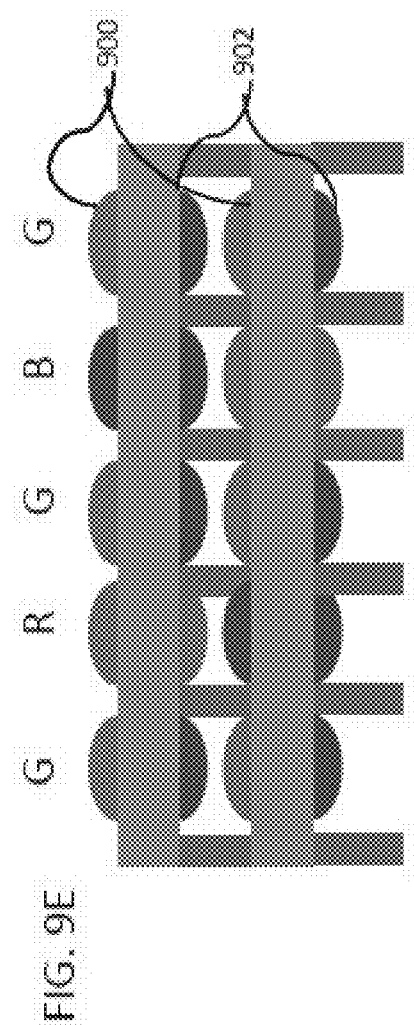

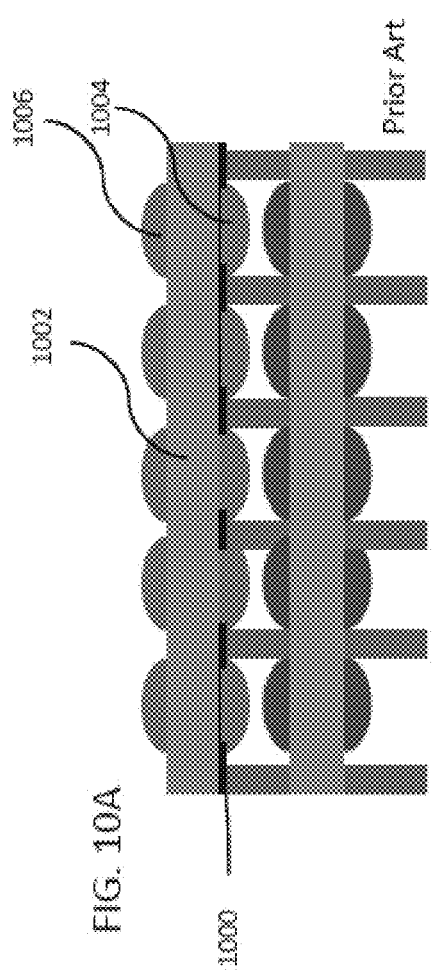
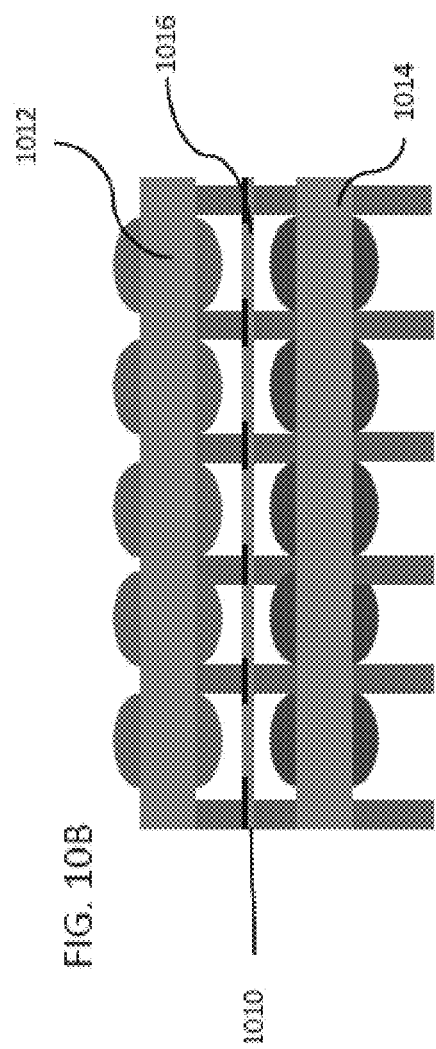
FIG. 10A Prior Art
FIG. 10B

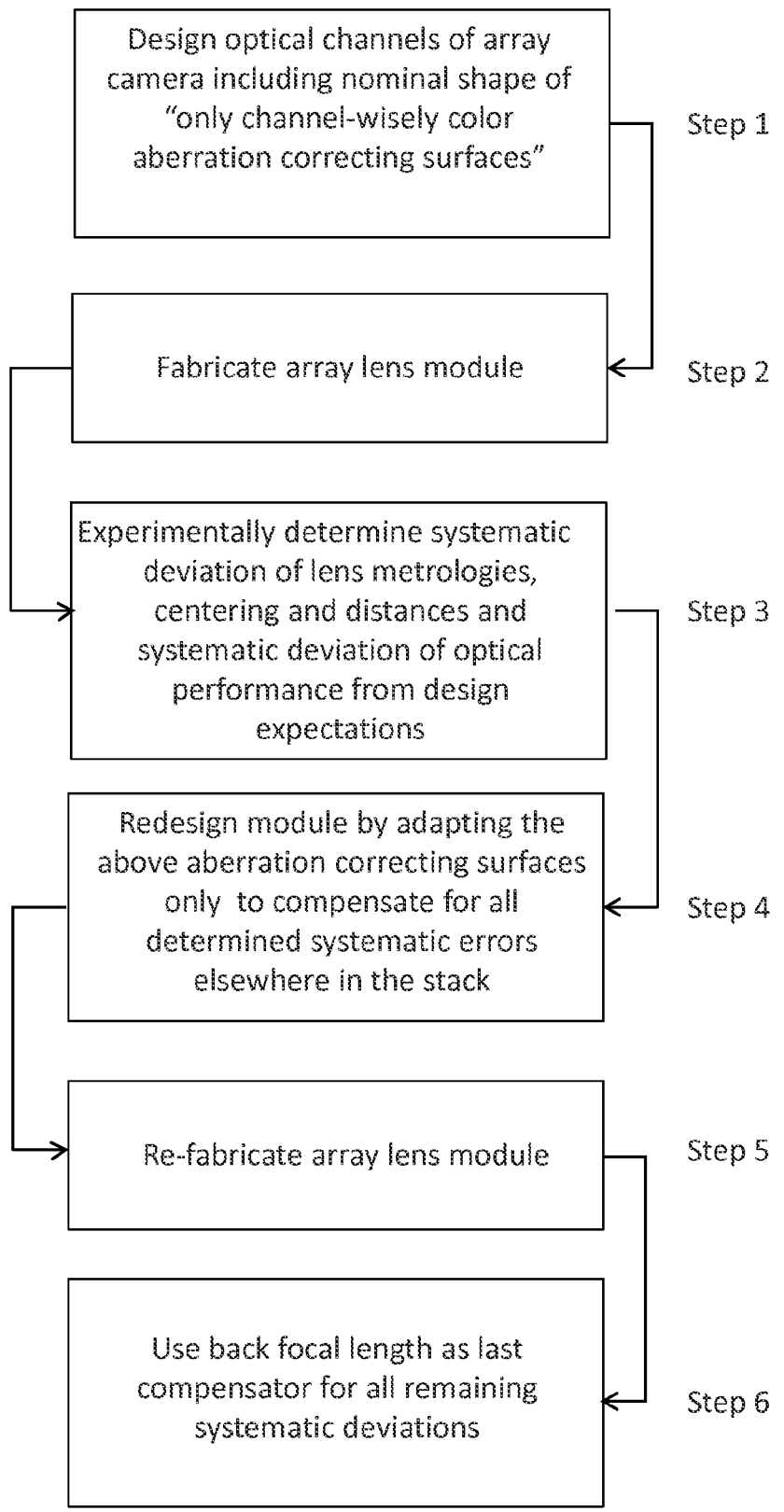

ARRAY CAMERAS INCORPORATING MONOLITHIC ARRAY CAMERA MODULES WITH HIGH MTF LENS STACKS FOR CAPTURE OF IMAGES USED IN SUPER-RESOLUTION PROCESSING

RELATED APPLICATION

This application is a continuation of U.S. Non-Provisional Patent Application No. 13/832,120, entitled "Optical Arrangements for Use with an Array Camera", filed Mar. 15, 2013, which application is a Continuation in part of U.S. Non-Provisional Patent Application No. 13/536,520, entitled "Optical Arrangements for Use with an Array Camera", which issued Jan. 3, 2013 as U.S. Pat. No. 8,804,255, which claims priority to U.S. Provisional Application No. 61/502,158 filed Jun. 28, 2011. The disclosures of these applications are incorporated herein by reference.

FIELD OF THE INVENTION

The present invention is related to novel optical arrangements, designs and elements for use in an array camera, and more specifically to optical arrangements of varying configurations having modulation transfer function (MTF) characteristics capable of implementing super resolution for use with arrays of image sensors.

BACKGROUND OF THE INVENTION

Image sensors are used in cameras and other imaging devices to capture images. In a typical imaging device, light enters at one end of the imaging device and is directed to an image sensor by an optical element such as a lens. In most imaging devices, one or more layers of optical elements are placed before and after the aperture stop to focus light onto the image sensor. Recently array cameras having many imagers and lenses have been developed. In most cases, multiple copies of the optical elements must be formed laterally for use in array cameras.

Conventionally, optical arrays can be formed by molding or embossing from a master lens array, or fabricated by standard lithographic or other means. However, the standard polymer-on-glass WLO and monolithic lens WLO manufacturing techniques have so far not been adapted for the specific high performance requirements of array cameras. In particular, some technical limitations of conventional WLO-processes need to be reduced, such as, for example, minimum substrate thickness requirements, inflexibility of where to place the aperture stop, accuracy, etc. The flexibility of such choices or processes needs to be increased in order to meet the high demands by array cameras otherwise such WLO techniques cannot be used to manufacture array cameras. Accordingly, a need exists for fabrication processes capable of accurately forming these arrays and for optical arrangements that give an increased flexibility in manufacturing so that the image processing software of these new types of array-type cameras can take advantage to deliver superior image quality at the system level.

The optical transfer function (OTF) of an imaging system (camera, video system, microscope etc.) is considered the true measure of an imaging system's performance, i.e., the resolution (minimum feature size or maximum spatial frequency that can be imaged with sufficient contrast) or image sharpness (the contrast at a given spatial frequency) obtainable by an imaging system. While optical resolution, as commonly used with reference to camera systems, describes only the number of pixels in an image, and hence the potential to show fine detail, the transfer function describes the ability of adjacent pixels to change from black to white in response to patterns of varying spatial frequency, and hence the actual capability to show fine detail, whether with full or reduced contrast. The optical transfer Function (OTF) consists of two components: the modular transfer function (MTF), which is the magnitude of the OTF, and the phase transfer function (PTF), which is the phase component.

In cameras, the MTF is the most relevant measurement of performance, and is generally taken as an objective measurement of the ability of an optical system to transfer various levels of detail from an object to an image. The MTF is measured in terms of contrast (degrees of gray), or of modulation, produced from a perfect source of that detail level (thus it is the ratio of contrast between the object and the image). The amount of detail in an image is given by the resolution of the optical system, and is customarily specified in line pairs per millimeter (lp/mm). A line pair is one cycle of a light bar and dark bar of equal width and has a contrast of unity. Contrast is defined as the ratio of the difference in maximum intensity ($I_{max}$) and minimum intensity ($I_{min}$) over the sum of $I_{max}$ and $I_{min}$, where $I_{max}$ is the maximum intensity produced by an image (white) and $I_{min}$ is the minimum intensity (black). The MTF then is the plot of contrast, measured in percent, against spatial frequency measured in lp/mm. This graph is customarily normalized to a value of 1 at zero spatial frequency (all white or black).

SUMMARY

The current invention is directed to optical arrangements for use with an array of cameras where the MTF of each of the optical arrangements or stacks for each camera of the array of cameras is at least as high as the desired MTF of the super resolution image synthesized from the combined images of the of cameras of the camera array.

In many embodiments, the camera array includes a plurality of cameras, where each camera includes a separate optics, and a plurality of light sensing elements, and each camera is configured to independently capture an image of a scene;

wherein the optics of each camera are configured so that each camera has a field of view that is shifted with respect to the field-of-views of the other cameras so that each shift includes a sub-pixel shifted view of the scene;

wherein the light sensing elements have a pixel pitch defining a Nyquist frequency, and where the optics of each camera have a modular transfer function (MTF) such that the optics optically resolve, with sufficient contrast, spatial frequencies larger than the Nyquist frequency (Ny);

wherein the camera array is a monolithic integrated module comprising a single semiconductor substrate on which all of the sensor elements are formed, and optics including a plurality of lens elements, where each lens element forms part of the separate optics for one of the cameras;

wherein each of the cameras includes one of a plurality of different types of filer; and wherein cameras having the same type of filter are uniformly distributed about the geometric center of the camera array.

In other embodiments the camera array, includes:

a plurality of cameras, where each camera includes a separate optics, and a plurality of light sensing elements each having a pixel pitch defining a Nyquist frequency (Ny), and each camera is configured to independently capture a low resolution image of a scene;

a processor configured to synthesize a higher resolution image from the plurality of lower resolution images, the high resolution image has a characteristic MTF;

wherein the optics of each camera are configured so that each camera has a field of view that is shifted with respect to the field-of-views of the other cameras so that each shift includes a sub-pixel shifted view of the scene;

wherein the optics of each camera have a modular transfer function (MTF) at least as large of the desired MTF of the high resolution image;

wherein the camera array is a monolithic integrated module comprising a single semiconductor substrate on which all of the sensor elements are formed, and optics including a plurality of lens elements, where each lens element forms part of the separate optics for one of the cameras;

wherein each of the cameras includes one of a plurality of different types of filer; and wherein cameras having the same type of filter are uniformly distributed about the geometric center of the camera array.

In still other embodiments, the cut-off MTF of the optics is at least 1.5 times the Ny, at least 2 times the Ny, or at least 3 times the Ny.

In yet other embodiments the optics of each camera include a three-surface optical arrangement includes:
 a first lens element having a first convex proximal surface and a first concave distal surface, wherein the diameter of the first convex surface is larger than the diameter of the first concave surface;
 a second lens element having a substantially flat second proximal surface and a second convex distal surface, wherein the diameter of the flat second proximal surface is smaller than the diameter of the second convex surface, and wherein the diameter of the second convex surface is intermediate between the diameters of the first convex surface and the first concave surface; and
 wherein the first and second lens elements are arranged sequentially in optical alignment with an imager positioned at the distal end thereof.

In still yet other embodiments the optics of each camera include a five-surface optical arrangement including:
 a first lens element having a first convex proximal surface and a first concave distal surface, wherein the diameter of the first convex surface is larger than the diameter of the first concave surface;
 a second lens element having a second concave proximal surface and a second convex distal surface, wherein the diameter of the second concave proximal surface is smaller than the diameter of the second convex surface;
 a third lens element having a third concave proximal surface and a third planar distal surface, wherein the diameter of the third concave proximal surface is larger than the diameters of any of the surfaces of the first and second lens elements; and
 wherein the first, second and thirds lens elements are arranged sequentially in optical alignment with an imager positioned at the distal end thereof.

In still yet other embodiments the optics of each camera include a substrate embedded hybrid lens optical arrangement including:
 a substrate having proximal and distal sides;
 a first monolithic lens element having first proximal and distal surfaces disposed on the proximal side of said substrate;
 a second monolithic lens element having second proximal and distal surfaces disposed on the distal side of said substrate;
 at least one aperture disposed on said substrate in optical alignment with said first and second lens elements; and
 wherein the first and second lens elements are arranged sequentially in optical alignment with an imager positioned at the distal end thereof.

In still yet other embodiments the optics of each camera include a monolithic lens optical arrangement including:
 at least one lens element comprising:
 a first monolithic lens having first proximal and distal surfaces, wherein the first proximal surface of the first monolithic lens has one of either a concave or convex profile, and wherein the first distal surface of the first monolithic lens has a plano profile;
 at least one aperture disposed on the first distal surface of the first monolithic lens and in optical alignment therewith;
 a second monolithic lens having second proximal and distal surfaces, wherein the second proximal surface of the second monolithic lens has a plano profile, and wherein the second distal surface of the second monolithic lens has one of either a concave or convex profile, and wherein the second monolithic lens is arranged in optical alignment with said aperture; and
 wherein the first monolithic lens element is in direct contact with the aperture and the second monolithic lens.

In still yet other embodiments, the optics of each camera include a three-element monolithic lens optical arrangement including:
 a first lens element having a first convex proximal surface and a first plano distal surface;
 a second lens element having a second concave proximal surface and a second convex distal surface;
 a third menisci lens element having a third concave proximal surface and a third convex distal surface;
 at least one aperture disposed on the first plano distal surface; and
 wherein the first, second and third lens elements are arranged sequentially in optical alignment with the aperture stop and an imager.

In one embodiment, the invention is directed to a three-surface optical arrangement for an array camera. In such an embodiment, the optical arrangement includes:
 a first lens element having a first convex proximal surface and a first concave distal surface, where the diameter of the first convex surface is larger than the diameter of the first concave surface,
 a second lens element having a substantially flat second proximal surface and a second convex distal surface, where the diameter of the flat second proximal surface is smaller than the diameter of the second convex surface, and where the diameter of the second convex surface is intermediate between the diameters of the first convex surface and the first concave surface; and
 wherein the first and second lens elements are arranged sequentially in optical alignment with an imager positioned at the distal end thereof.

In one embodiment of the three-surface optical arrangement, the surfaces of the first element are separated by a first substrate, and the surfaces of the second element are separated by a second substrate. In another such embodiment, the flat second proximal surface is formed by the second substrate. In still another such embodiment, an aperture stop is disposed on the flat second proximal surface. In yet another such embodiment, at least one aperture is disposed on at least one of the first or second substrates. In still yet another such embodiment, an aperture structure is disposed between said first and second lens elements, comprising at least one aperture substrate having at least one aperture disposed thereon. In still yet another such embodiment, the first and second lens elements and the second lens element and the imager are separated by spacers. In still yet another such embodiment, a filter is disposed on at least one of the first or second substrates. In still yet another such embodiment, at least two of the surfaces of the lens elements are formed from materials having different Abbe-numbers. In still yet another such embodiment, the convex surfaces are formed from crown-like materials, and the concave surfaces are formed from flint-like materials.

In another embodiment of the three-surface optical arrangement, an array of such arrangements are described, where the array is designed to image a selected wavelength band, and where the profile of at least one of the lens surfaces within each optical arrangement is adapted to optimally image only a narrow-band portion of the selected wavelength band such that in combination the plurality of arrangements within the array image the entirety of the selected wavelength band.

In another embodiment, the invention is directed to a five-surface optical arrangement for an array camera. In such an embodiment, the optical arrangement includes:
  a first lens element having a first convex proximal surface and a first concave distal surface, where the diameter of the first convex surface is larger than the diameter of the first concave surface;
  a second lens element having a second concave proximal surface and a second convex distal surface, where the diameter of the second concave proximal surface is smaller than the diameter of the second convex surface;
  a third lens element having a third concave proximal surface and a third planar distal surface, where the diameter of the third concave proximal surface is larger than the diameters of any of the surfaces of the first and second lens elements; and
  where the first, second and thirds lens elements are arranged sequentially in optical alignment with an imager positioned at the distal end thereof.

In one such embodiment of the five-surface optical arrangement the surfaces of the first element are separated by a first substrate, and the surfaces of the second element are separated by a second substrate. In another such embodiment, the third planar distal surface is in contact with one of either the image sensor or a cover glass disposed over the image sensor. In still another such embodiment, an aperture stop is disposed on the first concave distal surface. In yet another such embodiment, an aperture stop is disposed on the first substrate adjacent to the first concave distal surface. In yet another such embodiment, at least one aperture is disposed within the first lens element. In still yet another such embodiment, an aperture structure is disposed between at least two of said lens elements, the aperture structure comprising at least one aperture substrate having at least one aperture disposed thereon. In still yet another such embodiment, the first and second lens elements, and the second and thirds lens elements are separated by spacers. In still yet another such embodiment, a filter is disposed within at least one of the first and second lens elements. In still yet another such embodiment, at least two of the surfaces of the lens elements are formed from materials having different Abbe-numbers. In still yet another such embodiment, the convex surfaces are formed from crown-like materials, and the concave surfaces are formed from flint-like materials. In still yet another such embodiment, an air-gap is positioned between the third lens element and the image sensor. In still yet another such embodiment, at least one substrate is disposed between the surfaces of at least one of the lens elements. In still yet another such embodiment, a substrate is disposed between the third lens element and the imager. In still yet another such embodiment, at least one aperture is disposed on at least one substrate within the lens elements. In still yet another such embodiment, at least one aperture is embedded within the first lens element.

In another embodiment of the five-surface optical arrangement, a plurality of the five-surface optical arrangements is provided in an array. In such embodiment, the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In another embodiment, the invention is directed to a substrate embedded hybrid lens optical arrangement for an array camera. In such an embodiment, the optical arrangement includes:
  a substrate having proximal and distal sides;
  a first monolithic lens element having first proximal and distal surfaces disposed on the proximal side of the substrate;
  a second monolithic lens element having second proximal and distal surfaces disposed on the distal side of the substrate;
  at least one aperture disposed on said substrate in optical alignment with the first and second lens elements; and
  wherein the first and second lens elements are arranged sequentially in optical alignment with an imager positioned at the distal end thereof.

In another embodiment of the substrate embedded hybrid lens optical arrangement at least two axially aligned apertures are disposed on said substrate. In another such embodiment, the at least two axially aligned apertures are one of either the same or different sizes. In still another such embodiment, at least one coating is disposed on said substrate in optical alignment with said at least one aperture. In yet another such embodiment, the at least one coating is selected from the group consisting of a polarization filter, a color filter, an IRCF filter, and a NIR-pass filter. In still yet another such embodiment, the substrate is formed from a material that acts as a filter selected from the group consisting of a polarization filter, a color filter, an IRCF filter, and a NIR-pass filter. In still yet another such embodiment, the substrate further comprises an adaptive optical element. In still yet another such embodiment, at least two of the lens elements are formed from materials having different Abbe-numbers.

In still another embodiment of the substrate embedded hybrid lens optical arrangement, such an arrangement is part of a wafer stack comprising a plurality of the substrate embedded hybrid lens optical arrangements including:
  a plurality of wafer surfaces formed from the elements of the arrangements; and
  at least two alignment marks formed in relation to each wafer surface, each of said alignment marks being cooperative with an alignment mark on an adjacent wafer surface such that said alignment marks when cooperatively aligned aide in the lateral and rotational alignment of the lens surfaces with the corresponding apertures.

In yet another embodiment of the substrate embedded hybrid lens optical arrangement, the arrangement is part of an array comprising a plurality of the substrate embedded hybrid lens optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In still another embodiment, the invention is directed to a monolithic lens optical arrangement for an array camera. In such an embodiment, the optical arrangement includes:
at least one lens element itself comprising:
a first monolithic lens having first proximal and distal surfaces, where the first proximal surface of the first monolithic lens has one of either a concave or convex profile, and where the first distal surface of the first monolithic lens has a plano profile;
at least one aperture disposed on the first distal surface of the first monolithic lens and in optical alignment therewith;
a second monolithic lens having second proximal and distal surfaces, where the second proximal surface of the second monolithic lens has a plano profile, and where the second distal surface of the second monolithic lens has one of either a concave or convex profile, and where the second monolithic lens is arranged in optical alignment with said aperture; and
where the first monolithic lens element is in direct contact with the aperture and the second monolithic lens.

In another embodiment the monolithic optical arrangement includes at least one filter disposed on said plano surface in optical alignment with said at least one aperture. In still another such embodiment, the monolithic lenses are formed from materials having different Abbe-numbers. In yet another such embodiment, at least two lens elements are formed.

In still another embodiment the monolithic lens optical arrangement is part of an array comprising a plurality of the monolithic optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In yet another embodiment of the monolithic lens optical arrangement, such an arrangement is part of a wafer stack comprising:
a plurality of wafer surfaces formed from the elements of the arrangements; and
at least two alignment marks formed in relation to each wafer surface, each of the alignment marks being cooperative with an alignment mark on an adjacent wafer surface such that the alignment marks when cooperatively aligned aide in the lateral and rotational alignment of the lens surfaces with the corresponding apertures.

In yet another embodiment, the invention is directed to a three-element monolithic lens optical arrangement for an array camera. In such an embodiment, the optical arrangement includes:
a first lens element having a first convex proximal surface and a first plano distal surface;
a second lens element having a second concave proximal surface and a second convex distal surface;
a third menisci lens element having a third concave proximal surface and a third convex distal surface;
at least one aperture disposed on the first plano distal surface; and
wherein the first, second and third lens elements are arranged sequentially in optical alignment with the aperture stop and an imager.

In another embodiment the three-element monolithic optical arrangement includes first and second lens elements that are formed from low dispersion materials and the third lens element is formed from a high dispersion material. In still another such embodiment, at least one filter is disposed on the first plano distal surface in optical alignment with the first lens element. In yet another such embodiment, the first lens element further comprises a substrate disposed on the distal surface thereof. In still yet another such embodiment, at least one aperture is disposed on the distal surface of said substrate. In still yet another such embodiment, at least one filter is disposed on the distal surface of said substrate. In still yet another such embodiment, the second lens element further comprises a substrate disposed between the proximal and distal surfaces thereof.

In still another embodiment the three-element monolithic lens optical arrangement is part of an array comprising a plurality of the three-element monolithic optical arrangements, where the array is designed to image a selected wavelength band, and wherein the profile of at least one of the lens surfaces within each optical arrangement is adapted to optimally image only a narrow-band portion of the selected wavelength such that in combination the plurality of arrangements within the array image the entirety of the selected wavelength band.

In still yet another embodiment, the invention is directed to a plurality of optical arrangements for an array camera including:
a lens element array stack formed from a plurality of lens element arrays, each of the lens element arrays being in optical alignment with each other and a corresponding imager; and
where each of the individual lens elements of each of the lens element stacks is formed from one of either a high or low Abbe number material, and where the sequence in which one of either a high or low Abbe number material is used in any individual lens element stack depends upon the spectral band being detected by the imager related thereto.

In still yet another embodiment, the invention is directed to a plurality of optical arrangements for an array camera including:
a lens element array stack formed from a plurality of lens element arrays, each of said lens element arrays being formed of a plurality of lens elements;
a plurality of structural features integrated into each of the lens element arrays;
where the structural features ensure alignment of the lens element arrays in relation to each other within the lens element array stack in at least one dimension.

In one such embodiment of a plurality of optical arrangements the structural features are selected from the group consisting of lateral and rotational alignment features, spacers and stand-offs.

In still yet another embodiment, the invention is directed to a method of compensation for systematic fabrication errors in an array having a plurality of optical channels comprising:
preparing a design incorporating a nominal shape of one of either a waveplate or a multilevel diffractive phase element used for only channel-wise color aberration correction of the optical channels of the array;

fabricating an array lens module based on the design;

experimentally determining the systematic deviation of the lens module from the design based on at least one parameter selected from the group consisting of lens metrologies, centering, distance and optical performance;

redesigning only the channel-wise color aberration correcting surfaces of the lens module based on the results of the experiment;

refabricating the lens module based on the redesign; and compensating for any of the systematic deviations remaining using a back focal length of the lens module.

In still yet another embodiment, the invention is directed to an optical arrangement comprising a plurality of optical channels, each optical channel including at least one optical element, comprising at least two optical surfaces, wherein one of the optical surfaces of each of the plurality of optical channels is a channel specific surface having a wavefront deformation sufficient solely to adapt the optical channel to a selected waveband of light. In one such embodiment, the channel specific surface is selected from the group consisting of waveplates, kinoforms, and radial symmetric multi-level diffractive phase elements.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

These and other features and advantages of the present invention will be better understood by reference to the following detailed description when considered in conjunction with the accompanying data and figures, wherein:

FIG. 4B is a table of exemplary lenses in accordance with one embodiment of the optical arrangement of FIG. 4A.

FIG. 5A1 is a schematic of a five surface three-lens optical arrangement according to one embodiment of the invention.

FIG. 5A2 is a table of exemplary lenses in accordance with one embodiment of the optical arrangement of FIG. 5A1.

FIG. 5I1 is a schematic of a five surface three-lens optical arrangement according to one embodiment of the invention.

FIG. 5I2 is a table of exemplary lenses in accordance with one embodiment of the optical arrangement of FIG. 5I1.

FIG. 5J1 is a schematic of a five surface three-lens optical arrangement according to one embodiment of the invention.

FIG. 5J2 is a table of exemplary lenses in accordance with one embodiment of the optical arrangement of FIG. 5J1.

FIGS. 6D1 to 6D6 are schematics of monolithic optical arrangements according to various embodiments of the invention.

FIGS. 7B to 7D are schematics of monolithic optical arrangements according to various embodiments of the invention.

FIGS. 9A and 9B are schematics of conventional injection molded optical arrangement formed of two materials.

FIG. 9C is a schematic of an injection molded optical arrangement formed of two materials according to one embodiment of the invention.

FIGS. 9D is a schematic of a conventional polymer on glass wafer level optical arrangement formed of two materials.

FIG. 9E is a schematic of a polymer on glass wafer level optical arrangement formed of two materials according to one embodiment of the invention.

FIG. 10A is a schematic of a conventional polymer on glass wafer level optical arrangement having an integrated aperture stop.

FIG. 10B is a schematic of a polymer on glass wafer level optical arrangement having an integrated aperture stop according to one embodiment of the invention.

FIG. 12 is a flowchart of a process for manufacturing an optical arrangement according to one embodiment of the invention.

DETAILED DESCRIPTION

Figure 1:
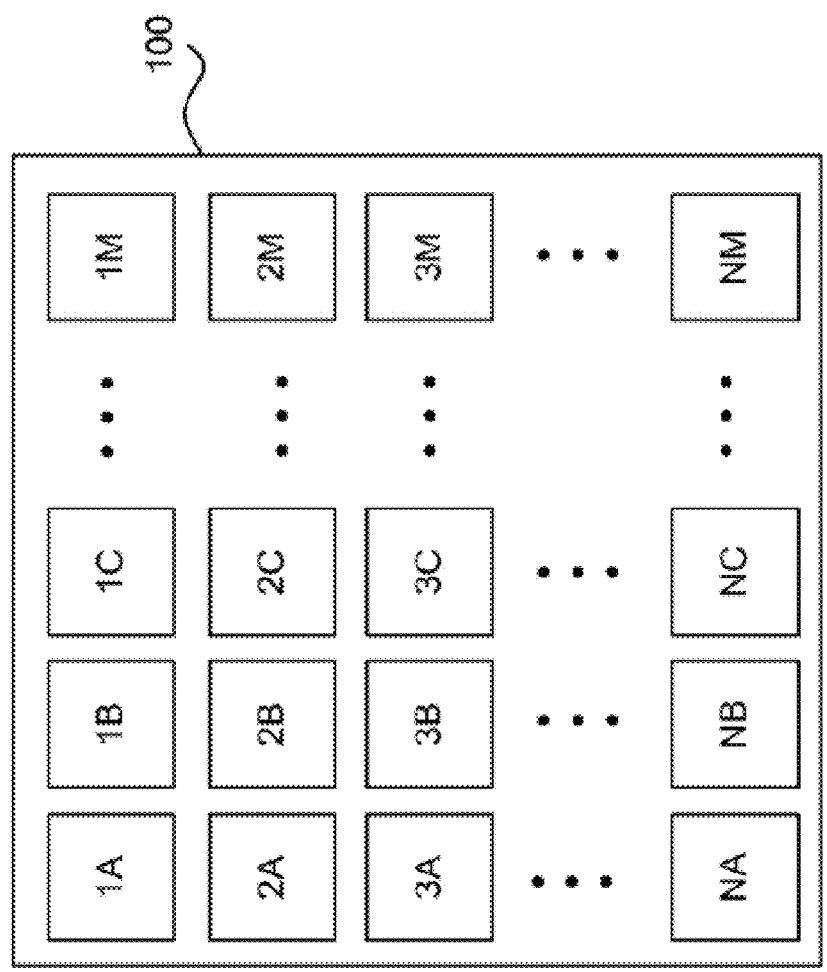
FIG. 1 is a plan view of a conventional camera array with a plurality of imagers.

Turning now to the drawings, novel optical arrangements for use in an array camera that captures images using a distributed approach using a plurality of imagers (cameras) of different imaging characteristics are illustrated. In many embodiments, each imager (camera) of such a camera array may be combined with separate optics (lens stacks) with different filters and operate with different operating parameters (e.g., exposure time). As will be described, in some embodiments these distinct optical elements may be fabricated using any suitable technique, including, for example, injection molding, precision glass molding, polymer-on-glass wafer level optics (WLO), or monolithic-lens WLO technologies (polymer or glass). In other embodiments, the various lens stacks of the individual cameras and camera array are implemented such that the MTF characteristics of the optics include contrast at a spatial frequency that is at least as large as the resolution of the high resolution images to be synthesized by the array camera from the low resolution images formed from the individual cameras, and significantly greater than the Nyquist frequency of the pixels in the focal plane.

Array cameras including camera modules that can be utilized to capture image data from different viewpoints (i.e. light field images) are disclosed in U.S. patent application Ser. No. 12/935,504 entitled "Capturing and Processing of Images using Monolithic Camera Array with Heterogeneous Imagers" to Venkataraman et al. In many instances, fusion and super-resolution processes such as those described in U.S. patent application Ser. No. 12/967,807 entitled "Systems and Methods for Synthesizing High Resolution Images Using Super-Resolution Processes" to Lelescu et al., can be utilized to synthesize a higher resolution 2D image or a stereo pair of higher resolution 2D images from the lower resolution images in the light field captured by an array camera. The terms high or higher resolution and low or lower resolution are used here in a relative sense and not to indicate the specific resolutions of the images captured by the array camera. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the cameras in the array camera. Due to the different viewpoint of each of the cameras, parallax results in variations in the position of foreground objects within the images of the scene. Processes such as those disclosed in U.S. Provisional Patent Application No. 61/691,666 entitled "Systems and Methods for Parallax Detection and Correction in Imaged Captured Using Array Cameras" to Venkataraman et al. can be utilized to provide an accurate account of the pixel disparity as a result of parallax between the different cameras in an array. The disclosure of U.S. Patent Application Ser. No. 61/691, 666 is hereby incorporated by reference in its entirety. Array cameras can use disparity between pixels in images within a light field to generate a depth map from a reference viewpoint. A depth map indicates the distance of the surfaces of scene objects from the reference viewpoint and can be utilized to determine scene dependent geometric corrections to apply to the pixels from each of the images within a captured light field to eliminate disparity when performing fusion and/or super-resolution processing.

Figure 3B:
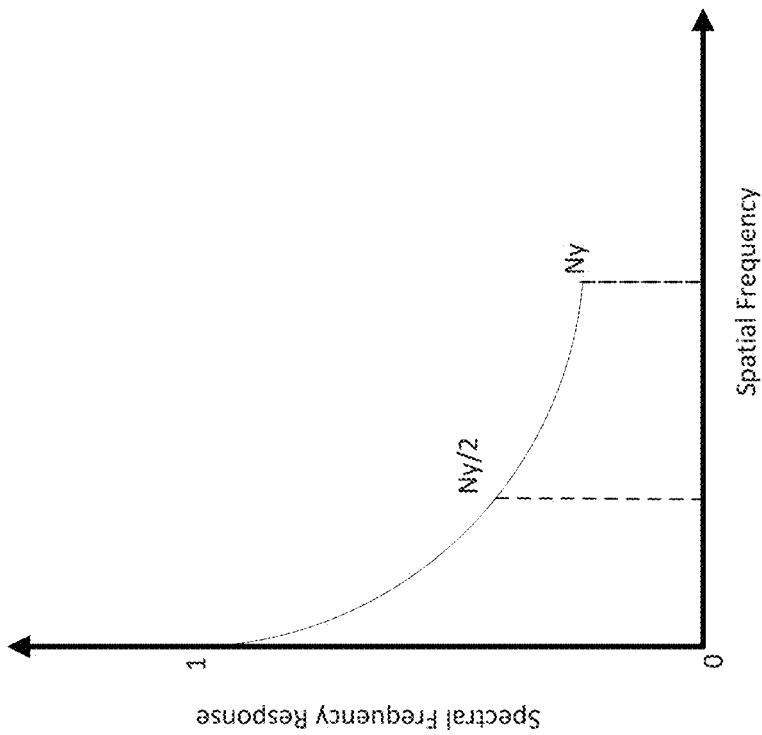
FIG. 3B illustrates a plot of MTF of the optics for a camera array having bandlimited optical channels at the Nyquist frequency.
Figure 3A:
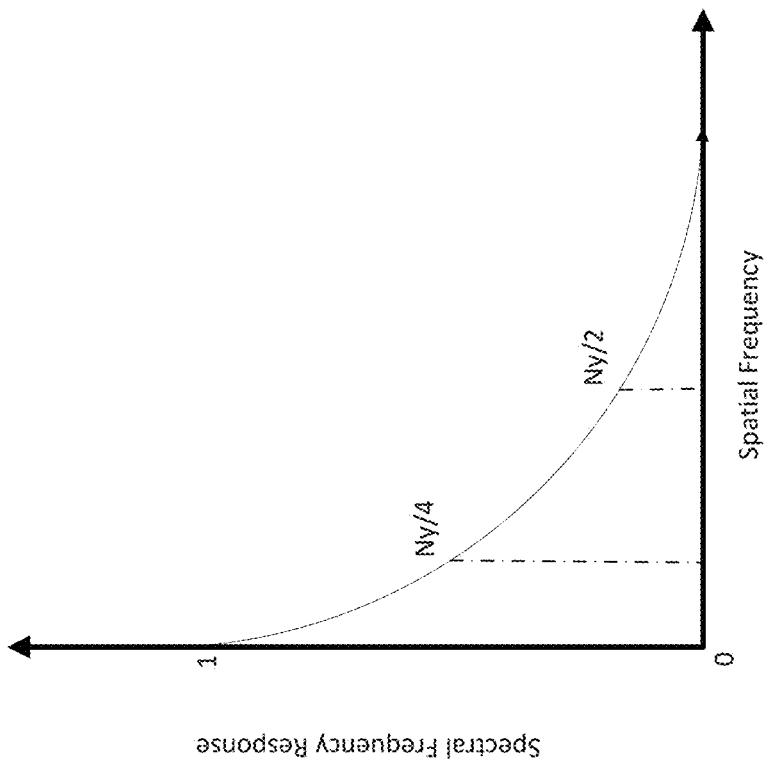
FIG. 3A illustrates a typical plot of the MTF of the optics for a legacy camera cutting-off below the corresponding image sensor's Ny spatial frequency.

The ultimate spatial resolution limit of a camera is inversely proportional to the pixel size or pitch of the imaging sensor of the camera and is defined as the Nyquist frequency limit. The Nyquist frequency states that the maximum resolution, R, of a system is equal to the inverse of two times the pixel pitch, x, ($R=1/(2*x)$). For a legacy camera very little contrast is desired at spatial frequencies larger than the sensor's Ny, in order to avoid aliasing in the final output image. Accordingly, in a legacy camera the pixel pitch determines the spatial sampling rate, and the corresponding Nyquist frequency (Ny), which is simply one half of the reciprocal of the center-to-center pixel spacing. As such, in a mobile imaging legacy camera, the required MTF for the optics arrangement is usually specified at Ny/4, Ny/2, or Ny, as illustrated in the plot of FIG. 3A, i.e., to be at least optically limited by the pixel pitch.

The challenge in implementing optics for array cameras results from the requirements necessary to achieve the super-resolution processes described above. Of importance is that super resolution should be able to recover a higher resolution final output image than the intrinsic resolution in the input component images from the individual cameras. Generally this requires that the camera optically resolve, with sufficient contrast, spatial frequencies that are actually larger than the Nyquist frequency of the individual sensors. The spatial resolution of a lens may be specified in terms of the modulation transfer function (MTF) curve over a range of spatial frequencies. As previously described, the MTF is a spatial frequency response (SFR) of output signal contrast with input spatial frequency. Performance is measured in terms of contrast or modulation at a particular spatial frequency which is customarily specified in line pairs per millimeter. At low line frequencies, the imaging system typically passes the signal unattenuated, which implies a contrast of 100%. At higher line frequencies, the signal is attenuated and the degree of attenuation in the output signal is expressed as a percentage with respect to that of the input signal, normalized to unity (or 100%) contrast at zero spatial frequency. In other words, the MTF is a measure of the ability of an optical system to transfer various levels of detail from object to image. Accordingly, embodiments of array cameras have more stringent MTF requirements than for legacy cameras, and in particular use optics having MTF characteristics that exceed the spatial resolution (Nyquist frequency) of the pixel pitch of the pixels on a focal plane.

Figure 3C:
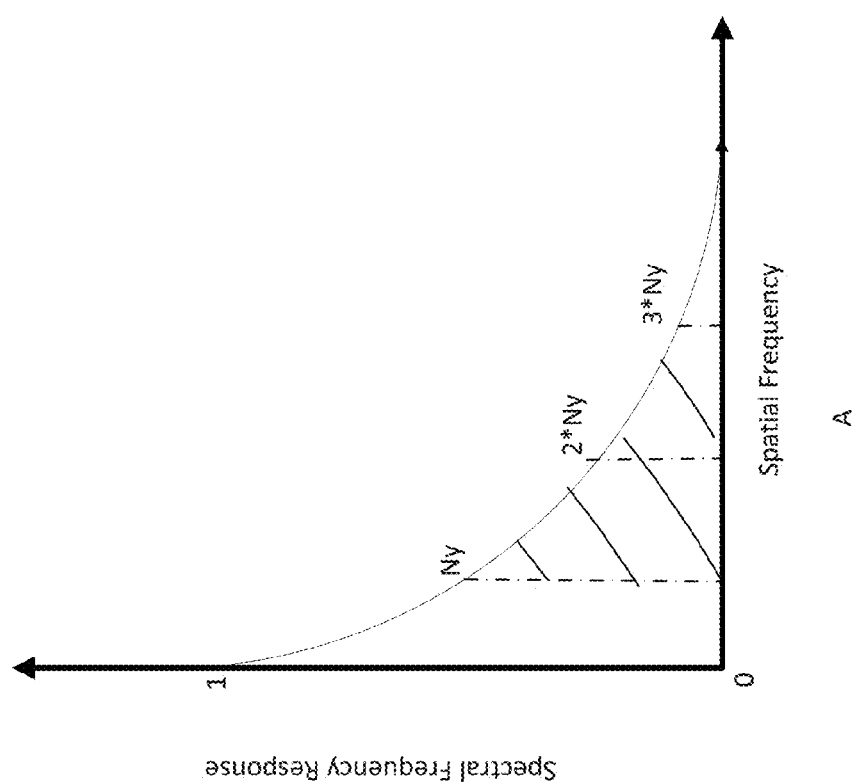
FIG. 3C illustrates a plot of MTF of the optics for a camera array in accordance with embodiments of the invention.

In particular, when multiple copies of an aliased signal are present, as in embodiments of a camera array, it is possible to use the information that is inherently present in the aliasing to reconstruct a higher resolution signal. However, there are slight differences between the aliasing patterns in the different camera images due to the array's sampling diversity. This sampling diversity is the result of slightly different viewing directions of the different cameras within the array, which are either intentionally introduced or result from (positional) manufacturing tolerances. Typically, filters would be introduced to create a bandlimited signal having an MTF near the Ny of the sensor as illustrated in FIG. 3B. However, in embodiments of a camera array aliasing to create a super resolution image is necessary. Accordingly, to provide sufficient contrast in the aliased LR images, the lens MTF needs to be as high as the desired high resolution output MTF from the super resolution processing. As illustrated in FIG. 3C, this requires that the cameras capture content above Ny such that the super-resolution process can then recover the higher resolution information. To address this optics challenge, in many embodiments, the MTF characteristics of the optics in camera arrays are implemented such that images formed include contrast at a spatial frequency that is at least as great as the resolution of the high resolution images synthesized by the array camera, and significantly greater than the Nyquist frequency of the pixel pitch of the pixels on the focal plane (e.g., in some embodiments from 1.5 to 3 times Ny). In many embodiments, the specific MTF requirement of the optics of the camera array may be determined by the ratio of the resolution of the high resolution image and Nyquist resolution of the individual camera. In other words, in some embodiments optics lens are implemented having a contrast of at least 10%, in some embodiments at least 20%, and in other embodiments at least 30% at a spatial frequency given by the ratio of the number of line-pairs resolved in the final synthesized high resolution image, and the physical size of the low resolution camera image in the same dimension, where the physical size of the low resolution image is a function of the size and number of pixels in the individual camera along the relevant dimension.

Definitions

A sensor element or pixel refers to an individual light-sensing element in a camera array. The sensor element or pixel includes, among others, traditional CIS (CMOS Image Sensor), CCD (charge-coupled device), quantum dot films, high dynamic range pixel, multispectral pixel and various alternatives thereof. The pixel pitch of these sensor elements defines the Nyquist frequency.

An imager refers to a focal plane formed from a two dimensional array of pixels associate with a lens stack formed from a set of optical elements. The sensor elements or pixels of each imager or focal plane have similar physical properties and receive light through the same set of optical components or lens stack. Further, the sensor elements in the each imager/focal plane may be associated with the same color filter.

An imager or camera array refers to a collection of imagers/cameras designed to function as a unitary component. The imager or camera array may be fabricated on a single chip for mounting or installing in various devices.

A lens stack refers to an axial arrangement of several optical components/lens elements.

An optical channel refers to the combination of a lens stack and an imager or focal plane.

A lens or optical array refers to a lateral arrangement of individual lens elements stacks.

An optics or lens stack array refers to a lateral array of lens stacks, or an axial arrangement of multiple lens arrays.

A camera array module refers to the combination of an optics array and an imager array, and can also be defined as an array of optical channels.

Image characteristics of an imager refer to any characteristics or parameters of the imager associated with capturing of images. The imaging characteristics may include, among others, the size of the imager, the type of pixels included in the imager, the shape of the imager, filters associated with the imager, the exposure time of the imager, aperture size of the optics associated with the imager, the configuration of the optical element associated with the imager, gain of the imager, the resolution of the imager, and operational timing of the imager. The characteristics of the optics of a camera refer to at least the field of view (FOV), F-number (F/#), resolution (MTF), effective focal length or magnification, color or waveband, distortion, and relative illumination.

These defined aspects of the embodiments will be described in greater detail below.

Structure of Array Camera

Array cameras in accordance with embodiments of the invention can include a camera module and a processor. FIG. 1 is a plan view of a generic array camera 100, which includes a camera module (110 with an array of cameras orimagers 1A through NM. As shown, a camera module of the type shown is fabricated to include a plurality or array of cameras 1A through NM. In turn, each of the cameras 1A through NM may include a plurality of focal planes and light sensing pixels (e.g., 0.32 Mega pixels). Although the imagers 1A through NM are shown as arranged into a grid format, it should be understood that they may be arranged in any suitable configuration. For example, in other embodiments, the imagers may be arranged in a non-grid format, such as in a circular pattern, zigzagged pattern or scattered pattern.

These array cameras may be designed as a drop-in replacement for existing camera image sensors used in cell phones and other mobile devices. For this purpose, the camera array may be designed to be physically compatible with conventional camera modules of approximately the same resolution although the achieved resolution of the camera array may exceed conventional image sensors in many photographic situations. Taking advantage of the increased performance, the array camera of the embodiment may include an imager with fewer pixels to obtain equal or better quality images compared to conventional image sensors. Alternatively, the size of the pixels in the imager may be reduced compared to pixels in conventional image sensors while achieving comparable results. In some embodiments, the array camera replaces a conventional image sensor of M megapixels. The array camera has (N×N) individual imagers or cameras, each camera including pixels of $M/N^2$. Each camera in the camera array may also have the same aspect ratio as the conventional image sensor being replaced.

Array Camera Modules

Figure 2A:
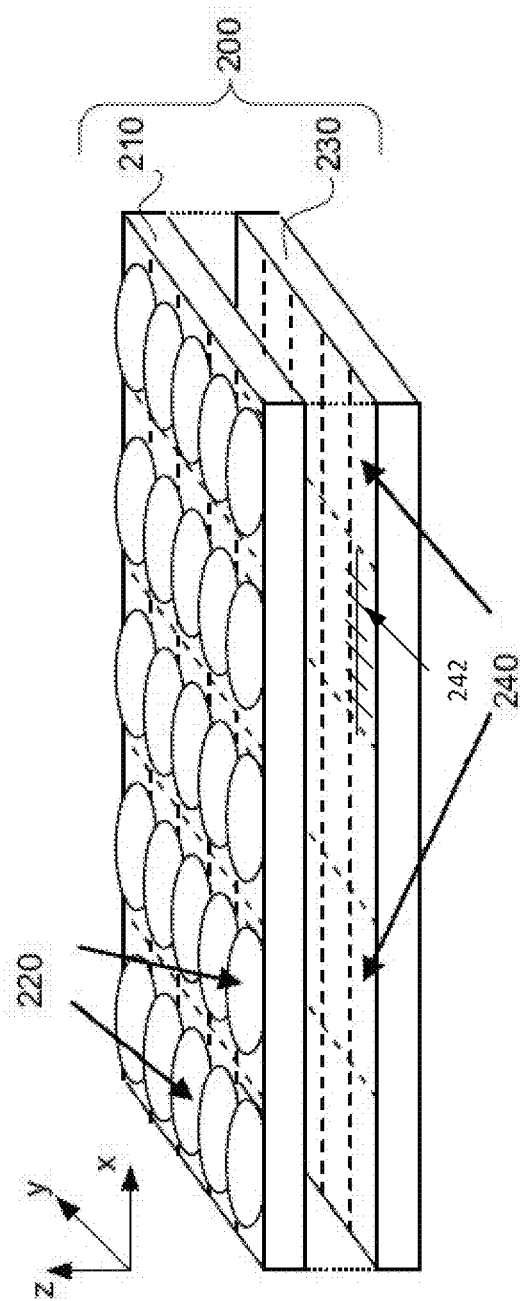
FIG. 2A is a perspective view of a camera module in accordance with embodiments of the invention.
Figure 2B:
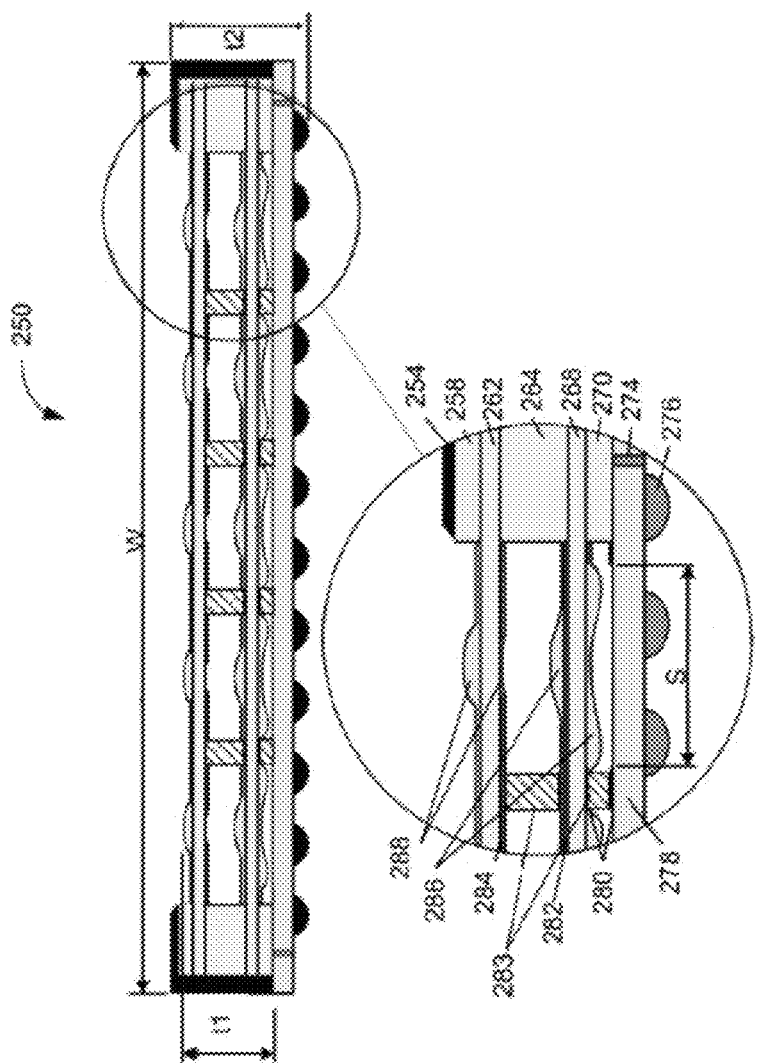
FIG. 2B is a cross-sectional view of a conventional module in accordance with embodiments of the invention.

Camera modules in accordance with embodiments of the invention can be constructed from an imager array and an optic array. Camera modules in accordance with embodiments of the invention are illustrated in FIGS. 2A and 2B. The camera module 200 includes an imager array 230 including an array of focal planes 240 along with a corresponding optic array 210 including an array of lens stacks 220. Within the array of lens stacks, each lens stack 220 creates an optical channel that forms an image of the scene on an array of light sensitive pixels 242 within a corresponding focal plane 240. As is described further below, the light sensitive pixels 242 can be formed from quantum films. Each pairing of a lens stack 220 and focal plane 240 forms a single camera 104 within the camera module. Each pixel within a focal plane 240 of a camera 104 generates image data that can be sent from the camera 104 to the processor 108. In many embodiments, the lens stack within each optical channel is configured so that pixels of each focal plane 240 sample the same object space or region within the scene. In several embodiments, the lens stacks are configured so that the pixels that sample the same object space do so with sub-pixel offsets to provide sampling diversity that can be utilized to recover increased resolution through the use of super-resolution processes. The camera module may be fabricated on a single chip for mounting or installing in various devices.

In several embodiments, an array camera generates image data from multiple focal planes and uses a processor to synthesize one or more images of a scene. In certain embodiments, the image data captured by a single focal plane in the sensor array can constitute a low resolution image (the term low resolution here is used only to contrast with higher resolution images), which the processor can use in combination with other low resolution image data captured by the camera module to construct a higher resolution image through Super Resolution processing, as previously described. Where super resolution is performed then multiple copies of an aliased signal are present, such as in multiple images from the focal planes 240, and the information inherently present in the aliasing may be used to reconstruct the higher resolution signal. One skilled in the art will note that the aliasing patterns from the different focal planes 240 will have slight differences due to the sampling diversity of the focal planes. These slight differences result from the slightly different viewing directions of the cameras used to capture the low resolution images that are either intentionally introduced or result from positional manufacturing tolerances of the individual focal planes. Thus, in accordance with some embodiments of this invention, the MTFs of the lens stacks 220 need to be at least as high as the desired high resolution output MTF to provide sufficient contrast. Accordingly, in many embodiments of an array camera, optics in the lens stack are implemented that have an MTF at least as high as the desired MTF of the super resolution image, i.e., an MTF at which the individual optic channels of the camera array are capable of resolving spatial frequencies above the Nyquist frequency of the pixels on the focal plane. In many such embodiments, the optics have an MTF at which they are capable of resolving spatial frequencies at least 1.5, 2 and/or 3 times the Nyquist frequency of the pixels to allow the super-resolution process to recover higher resolution information unavailable from the individual low resolution images captured at the individual cameras.

Imager Arrays

Imager arrays in accordance with embodiments of the invention can be constructed from an array of focal planes formed of arrays of light sensitive pixels. As discussed above in relation to FIG. 2A, in many embodiments the imager array 230 is composed of multiple focal planes 240, each of which have a corresponding lens stack 220 that directs light from the scene through optical channel and onto a plurality of light sensing elements (the pixel pitch of which define Ny) formed on the focal plane 240. In many embodiments the light sensing elements are formed on a CMOS device using photodiodes formed in the silicon where the depleted areas used for photon to electron conversion are disposed at specific depths within the bulk of the silicon. In some embodiments, a focal plane of an array of light sensitive pixels formed from a quantum film sensor may be implemented. The formation, composition, performance and function of various quantum films, and their use in optical detection in association with semiconductor integrated circuits are described in U.S. Patent Publication US/2009/0152664, entitled "Materials, Systems and Methods for Optoelectronic Devices", published Jun. 18, 2009, the disclosure of which is incorporated by reference herein in its entirety.

A focal plane 240 in accordance with an embodiment of the invention includes a focal plane array core that includes an array of light sensitive pixels 242 disposed at the focal plane of the lens stack 220 of a camera on a semiconducting integrated circuit substrate 230, such as a CMOS or CCD. The focal plane can also include all analog signal processing, pixel level control logic, signaling, and analog-to-digital conversion (ADC) circuitry used in the readout of pixels. The lens stack 220 of the camera directs light from the scene and onto the light sensitive pixels 242. The formation, architecture and operation of imager arrays and light sensitive pixel arrays, and their use in optical detection in association with array cameras are described in U.S. patent application Ser. No. 13/106,797, entitled "Architectures for Imager Arrays and Array Cameras", filed May 12, 2011, the disclosure of which is incorporated by reference herein in its entirety.

Imager arrays of this design may include two or more types of heterogeneous imagers, each imager or camera including two or more sensor elements or pixels. Each one of the imagers may have different imaging characteristics. Alternatively, there may be two or more different types of imagers where the same type of imagers shares the same imaging characteristics. For example, each imager 1A through NM in FIG. 1 may be associated with its own filter and/or optical element (e.g., lens). Specifically, each of the imagers 1A through NM or a group of imagers may be associated with spectral color filters to receive certain wavelengths of light. Example filters include a traditional filter used in the Bayer pattern (R, G, B), an IR-cut filter, a near-IR filter, a polarizing filter, and a custom filter to suit the needs of hyper-spectral imaging. In addition, some imagers may have no filter to allow reception of both the entire visible spectra and near-IR, which increases the imager's signal-to-noise ratio. The number of distinct filters may be as large as the number of cameras in the camera array. Embodiments where filter groups are formed is further discussed in U.S. Provisional Patent Application No. 61/641,165 entitled "Camera Modules Patterned with pi Filter Groups" filed May 1, 2012, the disclosure of which is incorporated by reference herein in its entirety. These cameras can be used to capture data with respect to different colors, or a specific portion of the spectrum. In other words, instead of applying color filters at the pixel level of the camera, color filters in many embodiments of the invention are included in the lens stack of the camera. For example, a green color camera can include a lens stack with a green light filter that allows green light to pass through the optical channel. In many embodiments, the pixels in each focal plane are the same and the light information captured by the pixels is differentiated by the color filters in the corresponding lens stack for each filter.

It will be understood that such imager arrays may include other related circuitry. The other circuitry may include, among others, circuitry to control imaging parameters and sensors to sense physical parameters. The control circuitry may control imaging parameters such as exposure times, gain, and black level offset. The sensor may include dark pixels to estimate dark current at the operating temperature. The dark current may be measured for on-the-fly compensation for any thermal creep that the substrate may suffer from.

Optic Arrays

To provide lenses and other optical elements for implementation in the lens stacks of the optical arrays any suitable optical technology may be employed capable of forming a lens stack with a suitable MTF, i.e., an optic MTF at least as high as the MTF of the high resolution image to be obtained via super resolution. To determine the suitability of optical elements and lens stacks, each lens stack 220 may be specified in terms of its MTF curve over a range of spatial frequencies. As the MTF is a Spatial Frequency Response (SFR) of the output signal contrast with the input spatial frequency, it is possible to determine the frequencies that can be optically resolved with sufficient frequency by the individual optical elements and lens stacks.

One skilled in the art will understand that any lens system will demonstrate a number of MTF curves depending on the operating conditions of the camera (such as aperture size) and the spatial frequency being resolved. The MTF might also be impacted by the type of scene being imaged (for example, there is often a spread in the MTF curve between a lenses ability to resolve meridional and sagittal lines). Finally, a lens system may demonstrate various levels of spatial resolution as you proceed from the center of image outward. In many embodiments of an array camera, optics are selected such that the individual cameras of the camera array are able to spatially resolve at frequencies above the Nyquist frequency of the pixels across all imaging conditions and locations on the lens to allow the super-resolution process to recover higher resolution information under all conditions and camera settings. In other embodiments, however, lens stacks and optical elements are contemplated that demonstrate an MTF sufficiently high to allow for the camera to spatially resolve at frequencies above the Nyquist frequency of the pixels across only some imaging conditions and camera settings. A detailed description of various optical elements for use in camera arrays is provided below.

FIG. 2A illustrates a perspective view of one array camera assembly 200 that incorporates an optics array 210 with an imager array 230. As shown, the optics array 210 generally includes a plurality of lens stacks 220 (which furthermore may consist of several axially aligned lens elements), each lens stack 220 covering (in the shown example) one of twenty-five imagers 240 in the imager array 230.

FIG. 2B illustrates a sectional view of a camera array assembly 250. As shown, in such a design the camera assembly 250 would comprise an optics array including a top lens wafer 262 and a bottom lens wafer 268, and an imager array including a substrate 278 with multiple sensors and associated light sensing elements formed thereon. Spacers 258, 264 and 270 are also included to provide proper positioning to the various elements. In this embodiment the camera array assembly 250 is also packaged within an encapsulation 254. Finally, an optional top spacer 258 may be placed between the encapsulation 254 and the top lens wafer 262 of the imager array; however, it is not essential to the construction of the camera assembly 250. Within the imager array, individual lens elements 288 are formed on the top lens wafer 262. Although these lens elements 288 are shown as being identical in FIG. 2B, it should be understood that within the same camera array different types, sizes, and shapes of elements may be used. Another set of lens elements 286 is formed on the bottom lens wafer 268. The combination of the lens elements on the top lens wafer and bottom lens wafer form the lens stacks 220 shown in FIG. 2A.

In these types of camera arrays, through-silicon vias 274 may also be provided to paths for transmitting signal from the imagers. The top lens wafer 262 may be partially coated with light blocking materials 284 (e.g., chromium, oxidized ("black") chromium, opaque photoresist) to block of light. In such embodiment, the portions of the top lens wafer 262 of the optics array not coated with the blocking materials 284 serve as apertures through which light passes to the bottom lens wafer 268 and the imager array. Although only a single aperture is shown in the embodiment provided in FIG. 2B, it should be understood that, in these types of camera arrays, additional apertures may be formed from opaque layers disposed on any and all of the substrate faces in the camera assembly to improve stray light performance and reduced optical crosstalk. In the example shown in FIG. 2B, filters 282 are formed on the bottom lens wafer 268 of the optics array. Light blocking materials 280 may also be coated on the bottom lens wafer 268 of the optics array to function as an optical isolator. A light blocking material 280 may also be coated on the substrate 278 of the imager array to protect the sensor electronics from incident radiation. Spacers 283 can also be placed between the bottom lens wafer 268 of the optics array and the substrate 278 of the imager array, and between the lens wafers 262 and 268 of the optics array. In such array cameras, each layer of spacers may be implemented using a single plate.

Although not illustrated in FIG. 2B, many such camera arrays also include spacers between each optical channel located on top of the top lens wafer 262 of the optics array that are similar to, or implemented in single layer with, the spacer 258 shown at the edge of the lens stack array. As is discussed further below the spacers can be constructed from and/or coated in light blocking materials to isolate the optical channels formed by the wafer level optics. Suitable light blocking materials may include any opaque material, such as, for example, a metal material like Ti and Cr, or an oxide of these materials like black chromium (chrome and chrome oxide), or dark silicon, or a black particle filled photoresist like a black matrix polymer (PSK2000 from Brewer Science).

There are a number of advantages that can be realized by using smaller lens elements with these array cameras. First, the smaller lens elements occupy much less space compared to a single large lens covering the entire camera array 230. In addition, some of the natural consequences of using these smaller lens elements include, improved optical properties by reduced aberrations, in particular chromatic aberrations, reduced cost, reduced amount of materials needed, and the reduction in the manufacturing steps. A full discussion of these advantages may be found in U.S. Patent Publication No. US-2011-0080487-A1, the disclosure of which is incorporated herein by reference.

Because of the distributed approach of the array camera, and the resultant relaxed total track length requirement (since the array camera by its nature is much shorter than a comparable classical objective), it is possible to adopt novel optical design approaches for the lens channels of an array camera rather than just using arrays of conventional optical designs. In particular, many embodiments are directed to optic arrangements capable of MTF characteristics such that images formed on a focal plane include contrast at a spatial frequency that is at least greater than the resolution of high resolution images synthesized by the array camera during super resolution, and significantly greater than the Nyquist frequency of the pixel pitch of the pixels on the focal plane, and in some cases as much as 1.5 to 3 times the Nyquist frequency. These novel arrangements will be described in detail below, however, it should be understood that other optical arrangements that incorporate the improvements set forth herein may be used with the camera arrays described herein.

Embodiment 1: Three-Surface WLO Design

Traditional wafer level optics (WLO) is a technology where polymer lenses are molded on glass wafers, potentially on both sides, stacked with further such lens wafers by spacer wafers, and diced into lens modules (this is called "polymer on glass WLO") followed by packaging of the optics directly with the imager into a monolithic integrated module. As will be described in greater detail below, the WLO procedure may involve, among other procedures, using a wafer level mold to create the polymer lens elements on a glass substrate. Usually this involves incorporating apertures, and in particular the aperture stop by providing openings centered with the later lens channels in an otherwise opaque layer onto the substrate before lens molding.

Figure 4A:
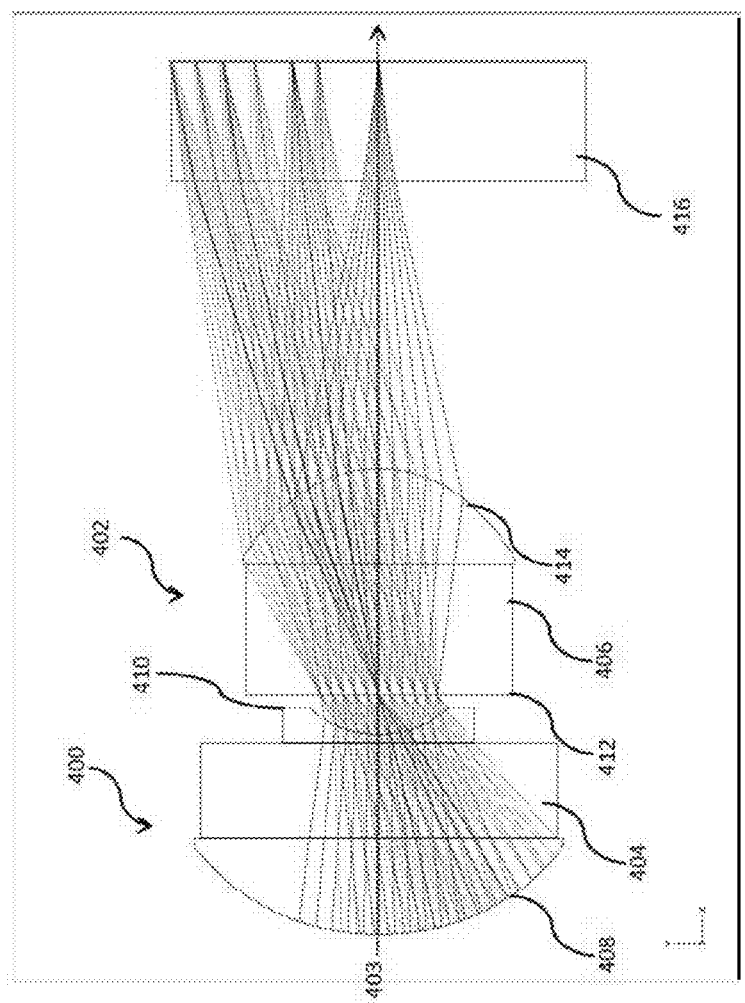
FIG. 4A is a schematic of a three surface two-lens optical arrangement according to one embodiment of the invention.

In a first embodiment, a three-surface optical arrangement suitable for the fabrication by wafer level optics technology, and, in particular, to be used for the optics (as one of the multiple channels) of an array camera is described in reference to FIG. 4A. More specifically, in a standard two-element lens, as shown in FIGS. 2 and 3, there are typically four lens surfaces (front and back for the top and the bottom lenses). In contrast, in this total-track-length-relaxed but MTF-performance optimized design, the third surface (first side of second element) has very low refractive power. As a result, it is possible to omit it from the design entirely. The result is a three surface design, which leads to a less expensive lens, due to less required process steps, and improved yield because of less contributors to the yield multiplication. In addition, since only lenses that have shapes which appear close to spherical- or parabolic profiles (monotonous profiles, no wings) are applied in a specific axial arrangement, centered around the aperture stop, only weak ray bending occurs at all the refractions on air-lens or lens-air interfaces. The result of this arrangement is a relaxed sensitivity with respect to centering-, thickness-, distance-, or lens shape form error tolerances. As shown in FIG. 4A, the rays for the different field heights more or less transmit perpendicularly, and are thus not strongly refracted through the lens surfaces. However, in such an arrangement it is very important to find an optimum position where the angle of incidence (AOI) on the glass substrate is minimal so that the shift of the band edges due to the AOI is minimized for any dielectric filter system (e.g. for IR cut-off), which is applied on substrates within the lens stack.

As shown FIG. 4A, the three-surface optical arrangement is identified by first 400 and second lens elements 402, which are arranged sequentially along a single optical path 403. It should be understood that for construction purposes, each lens element may optionally be associated with a corresponding supporting substrate 404 and 406, made from example of glass, upon which the polymer lens surfaces are formed. In addition, spacer elements (not shown) that can serve to mechanically connect the lens elements to each other and/or to the image sensor may also be included in the construction. Although any suitable material may be used, in one embodiment the lens surfaces are made from a (UV- or thermally curable) polymer.

Turning to the construction of the lens elements themselves, in the first lens element 400, there is a convex surface 408 of a first diameter on the first side of the first element and a concave surface 410 of a second diameter on the second side of the first element. Preferably the diameter of the first side is larger than the diameter of the second side of the first lens element. In the second element 402, there is a shallow or flat surface 412 on the first side of the second element, and a convex surface 414 on the second side of the second element. Preferably, the diameter of the first side of the second element is smaller than the diameter of the second surface of the second element, and that the diameter of the second side of the second element is intermediate between the diameters of the first and second sides of the first element. In addition, the system aperture or stop (not shown) is preferably disposed on the first side of the second element.

Figure 4B:
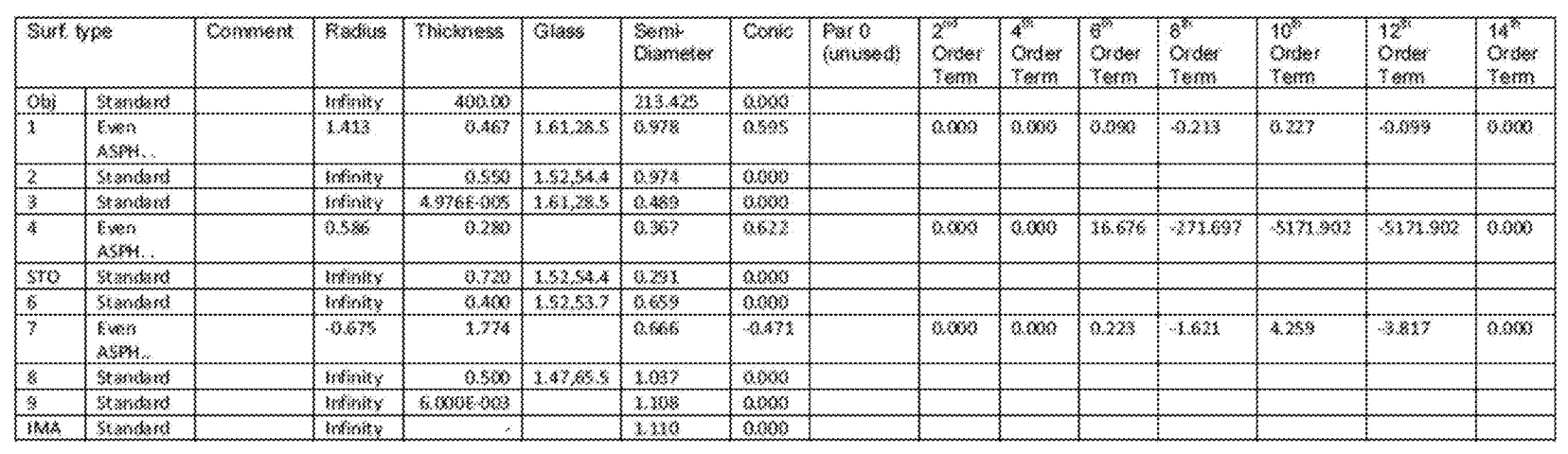

Although not shown in the diagram, a (thin) first spacing structure (not shown) is placed in between the two lens elements, which can be either incorporated into the respective lens surfaces ("stand-offs"), or can be an additional element. Likewise, a (thick) second spacing structure connecting the second side of the second lens element with the cover glass or package 416 of the image sensor 417 may also be provided. Both spacing structures are preferably opaque, or have opaque surfaces, at least at the inner side-walls, and provide partial optical isolation between adjacent optical channels. FIG. 4B provides a lens table for an exemplary embodiment of the three-surface optical arrangement in accordance with the current invention.

Although the basic construction of the three-side optical arrangement is described above, it should be understood that other features and structures may be incorporated into the lens elements to provide additional or enhanced functionality, including:

- The inclusion of additional apertures within the lens stack (in particular on the glass substrates underneath the polymer lenses).
- Channel specific filters, such as, for example, organic color filter arrays "CFA" and/or structured dielectric filters, such as, for example, IR cut-off, NIR-pass, interference color filters. These filters may be arranged within the stack of the first and the second lens element, preferably in a surface close to the system aperture.
- Partial achromatization of the individual narrow-spectral-band-channels may be accomplished by combining different Abbe-number materials for the different lens surfaces, such as, for example, "crown-like" materials for the two convex surfaces on the outsides of the optical arrangement, and "flint-like" materials for the potentially two (concave) surfaces on the inner sides of the two lens elements (as is further described in Embodiment 6, below).
- Optimization of different color channels to their specific narrow spectral band may be accomplished by adapting (at least) one lens surface profile within the optical arrangement to that color to correct for chromatic aberrations. (For a full discussion see, e.g., U.S. patent application Ser. No. 13/050,429, the disclosure of which is incorporated herein by reference.)

There are several features of this novel three-surface optical arrangement that render it particularly suitable for use in array cameras. First, the optical arrangement is designed in such a way that very high contrast at the image sensor's Nyquist spatial frequency is achieved, which at the same time (for gradual fall-off of contrast with increasing spatial frequency) provides sufficient contrast at 1.5× or 2× the sensor's Nyquist frequency to allow the super-resolution image information recovery to work effectively. Second, the optical arrangement is optimized for allowing a small lateral distance between adjacent optical channels in order to economically exploit the die real-estate area, consequently the lens diameters should be small, as should the wall-thickness of the (opaque) spacer structures. Third, optical channels within one array dedicated to imaging different "colors" (parts of the overall wavelength spectrum to be captured) may differ with regard to the particular surface profile of at least one lens surface. The differences in the surface profiles of those lenses in one array can be minor, but are very effective in keeping the back focal length ("BFL") color-independent, and consequently allowing (almost) equally sharp images for the different colors without the costly need for wide-spectral-band achromatization. Moreover, after computational color-fusion a high-resolution polychromatic image can be achieved. In particular, preferably the last surface in the lens stack (here—second surface of second element) is specifically optimized for the narrow spectral band of the respective color channel. Fourth, the above design approaches result in a (partial—as far it can be the case for the given non-symmetry between object- and image space) symmetry of the lens system around the aperture stop, which helps to reduce certain types of aberrations, including, distortion, coma and lateral color.

The benefits of this array-dedicated design of the single channels of the array camera include:

- The ability to provide high resolution with as few as two elements, and with only three surfaces of refractive power within the two elements,
- Increased simplicity of the lens shapes,
- Reduced fabrication tolerance sensitivity due to reduced ray bending.
- Low CRA, due to relaxed total track length requirement.

Low color cross-talk, due to color filters differentiating the different optical channels rather than having a Bayer pattern on the pixel level performing this task.

Low pixel cross-talk, due to the smaller pixel stack height.

Reduced color inhomogeneity, due to the color filters being farther from the image plane.

Low inter-channel cross-talk, because of the long back focal length, which allows a thick opaque second spacer compared to thin transparent substrate.

Fewer monochromatic aberrations, as a result of the smaller lenses, because many of these aberrations scale with lens size ^2-^4.

Separate color channels that only need to be optimized for their respective spectral bands, resulting in higher overall polychromatic resolution while minimizing the achromatization requirements within the individual channels, again resulting in simpler overall aberration balancing or correction processes and simpler lenses, and/or better MTF, and/or lower F/#. In many embodiments the MTF characteristics of the three-surface optical arrangement allow for contrast at spatial frequencies that are at least as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

Higher yield during manufacture, because the smaller lenses mean smaller sag (i.e., vertex height) of the lenses, which leads to less shrinkage and the ability to use less complex replication technology.

Embodiment 2: Five-Surface WLO Design

In a second embodiment, a five-surface optical arrangement suitable for the fabrication by wafer level optics technology, and, in particular, to be used for the optics (as one of the multiple channels) of an array camera is described in reference to FIGS. 5A to 5J. More specifically, this embodiment is directed to a five-surface high-resolution wafer level lens/objective having a field-flattening element close to the image plane. Again, in a standard two-element lens, as shown in FIGS. 2 and 3, there are typically four lens surfaces (front and back for the top and the bottom lenses). However, these optical arrangements are non-ideal for use in high resolution array cameras. Ideally, there would be a reduced requirement on small maximum CRA of the optics by the image sensor (allowing much larger angles of incidence on the same), for example, by using BSI or quantum film sensors (quantum film having the additional advantage of an increased fill factor not requiring microlenses, which otherwise require an air gap in front of the image sensor in order for the microlenses to provide refractive power). Finally, regular lens designs have stronger small total track length requirements, which would render the overall camera length shorter than necessary for an array camera, since the array camera is much shorter than a comparable classical objective by concept. In contrast, in this design five surfaces are used. The large number of degrees of freedom in the five-surface design allows for achromatization for the full visible spectral band (or other band of interest), so that channel-specific lens profiles are not necessarily required. However, even though the back focal length may be kept constant over the spectral band of interest, the effective focal length and with it the magnification may vary.

As shown in FIG. 5A, in one embodiment the five-surface optical arrangement is identified by first 500, second 502, and third 504 lens elements arranged sequentially along a single optical path 505. It should be understood that for construction purposes, each lens element may optionally be associated with a corresponding supporting substrate 506, 508 & 510, made from example of glass, upon which the polymer lens surfaces are formed. In addition, spacer elements (not shown) that can serve to mechanically connects the lens elements to each other and/or to the image sensor may also be included in the construction. Although any suitable material may be used, in one embodiment the lens surfaces, i.e., the volume between the surface of the lens and the underlying substrate, are made from a (UV- or thermally curable) polymer.

Turning to the construction of the lens elements themselves, the first lens element 500 has a convex surface 512 having a first diameter, and a concave surface 514 having a second diameter. Preferably the diameter of the convex surface is greater than the diameter of the concave surface on this lens element. The second lens element 502 has a concave surface 516 on the first side of the second lens element, and a convex surface 518 on the second side of the second element. In this second lens element, preferably the convex surface thereof is of a larger diameter when compared to the concave surface thereof. The third lens element 504 has a concave surface 520 on the first side of the third lens element, and a second planar side 522 that is adjoined to the substrate that serves as the image sensor cover 510. Typically, the diameter of the concave surface of the third lens element is larger than the diameters of any of the surfaces of the first and second lens elements.

In terms of arrangement, a first spacing structure (not shown) is disposed in between the first 500 and the second 502 lens elements. Likewise, a second spacing structure (not shown) is disposed in between the second 502 and the third 504 lens elements. Either of these spacers may be either incorporated (also split) into the respective lens surfaces ("stand-offs" in which the lenses then can be glued directly together), or can be an additional element. In addition, both of these spacing structures are preferably opaque (or have opaque surfaces, at least at the (inner) side-walls), and provide (partial) optical isolation between adjacent optical channels. The third lens element 504 is disposed comparatively close to the image surface 524, and the second side of the third lens element is preferably connected with the image sensor or image sensor cover glass by a transparent areal bond or a local bond (e.g. UV- and/or thermally curing adhesive), or even a (–n opaque) spacing structure with transparent openings as described above.

In summary, FIG. 5A1, discussed above, demonstrates a five-surface optical arrangement disposed on a large-sag field flattener on a regular-thickness image sensor cover glass. In particular, there is no air gap between the field flattener 504 (or its substrate, or the sensor cover glass, respectively) and the image sensor 524. In front of the field flattener is the actual focusing objective comprised of first 500 and second 502 lens elements, ideally containing two concave surfaces close to the system aperture more or less symmetrically surrounded by two convex surfaces. An exemplary lens table associated with this design is provided in FIG. 5A2.

Figure 5B:
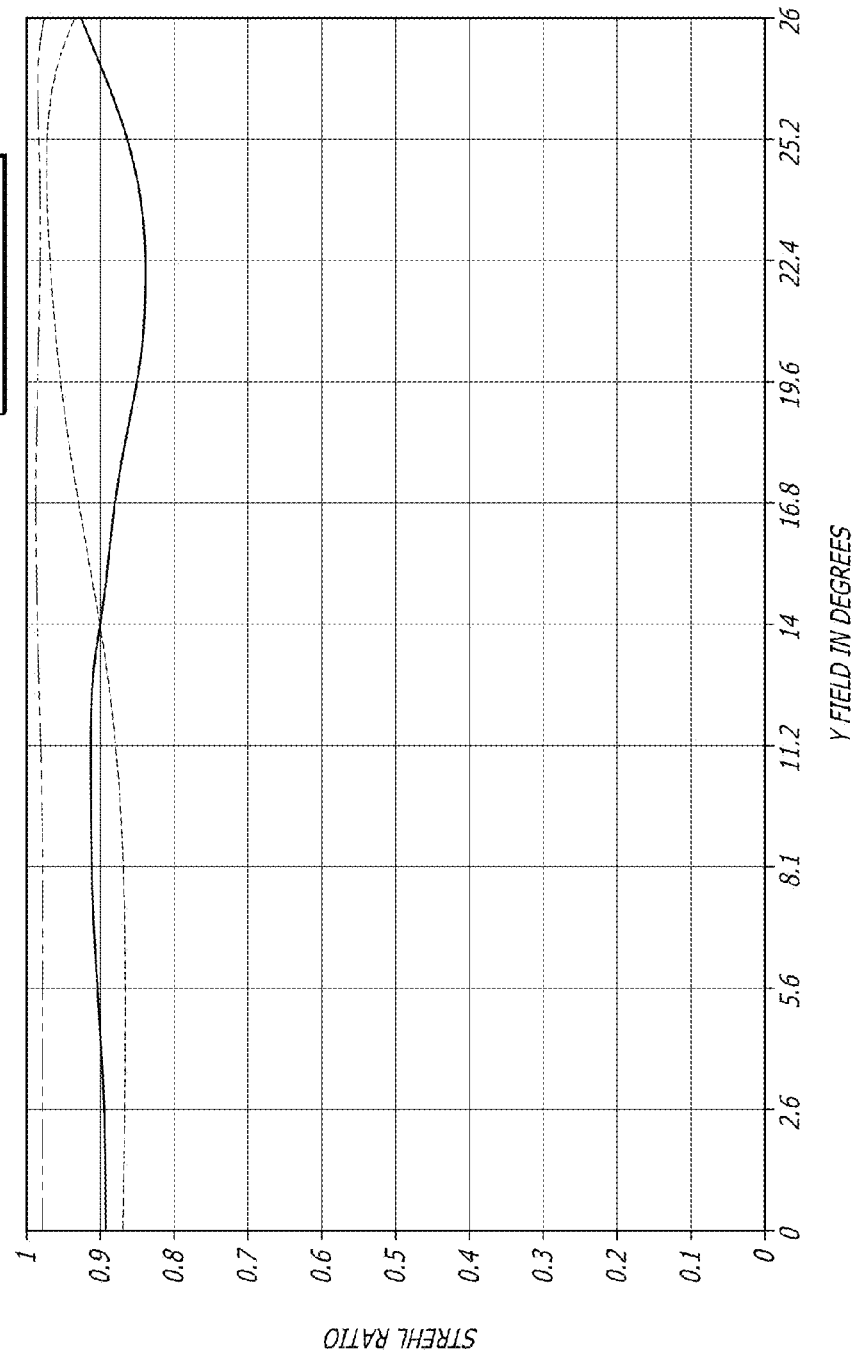
FIGS. 5B to 5H are data plots presenting characteristic performance indicators of the optical arrangement of FIG. 5A1.
Figure 5C:
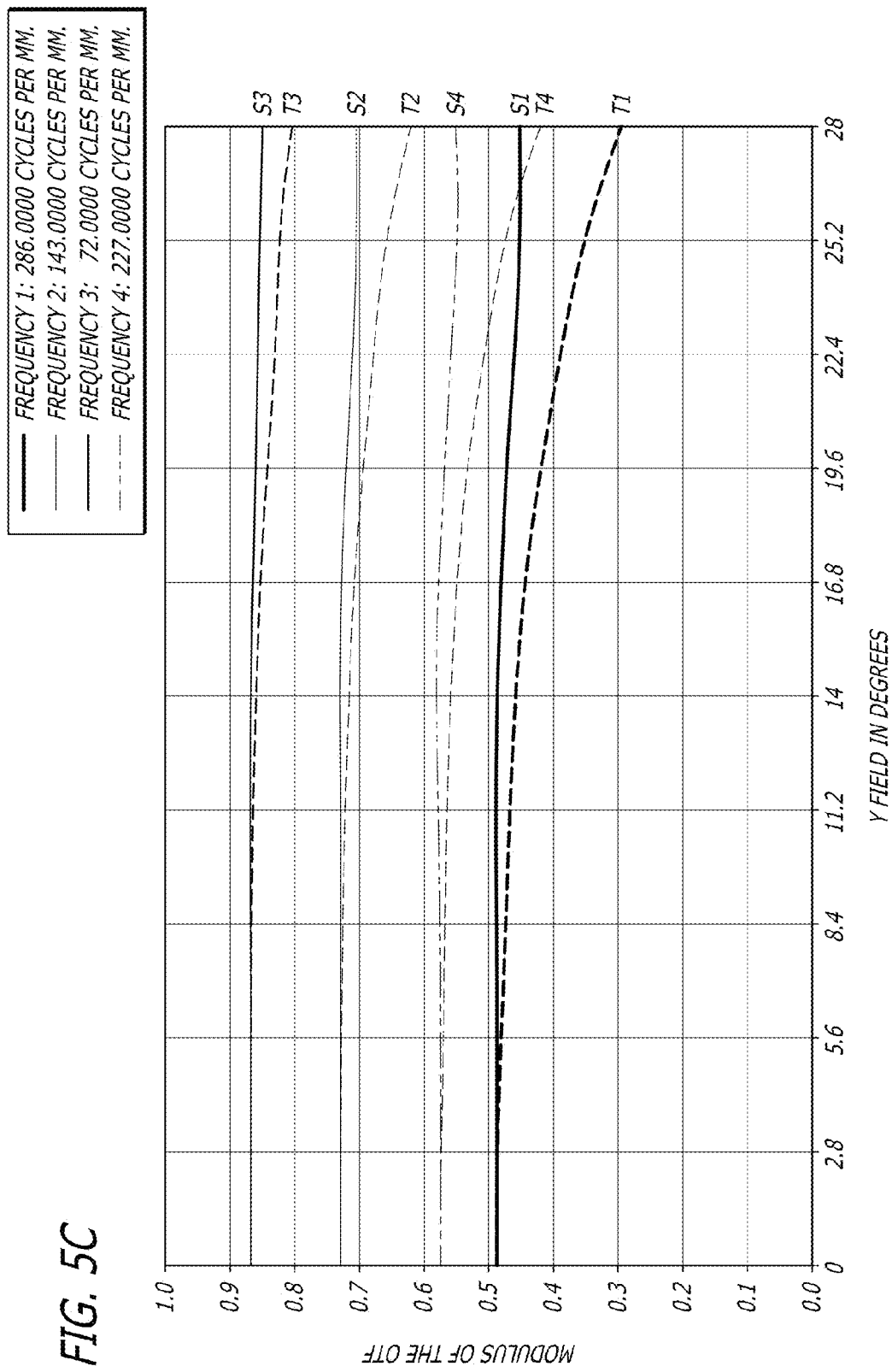
Figure 5D:
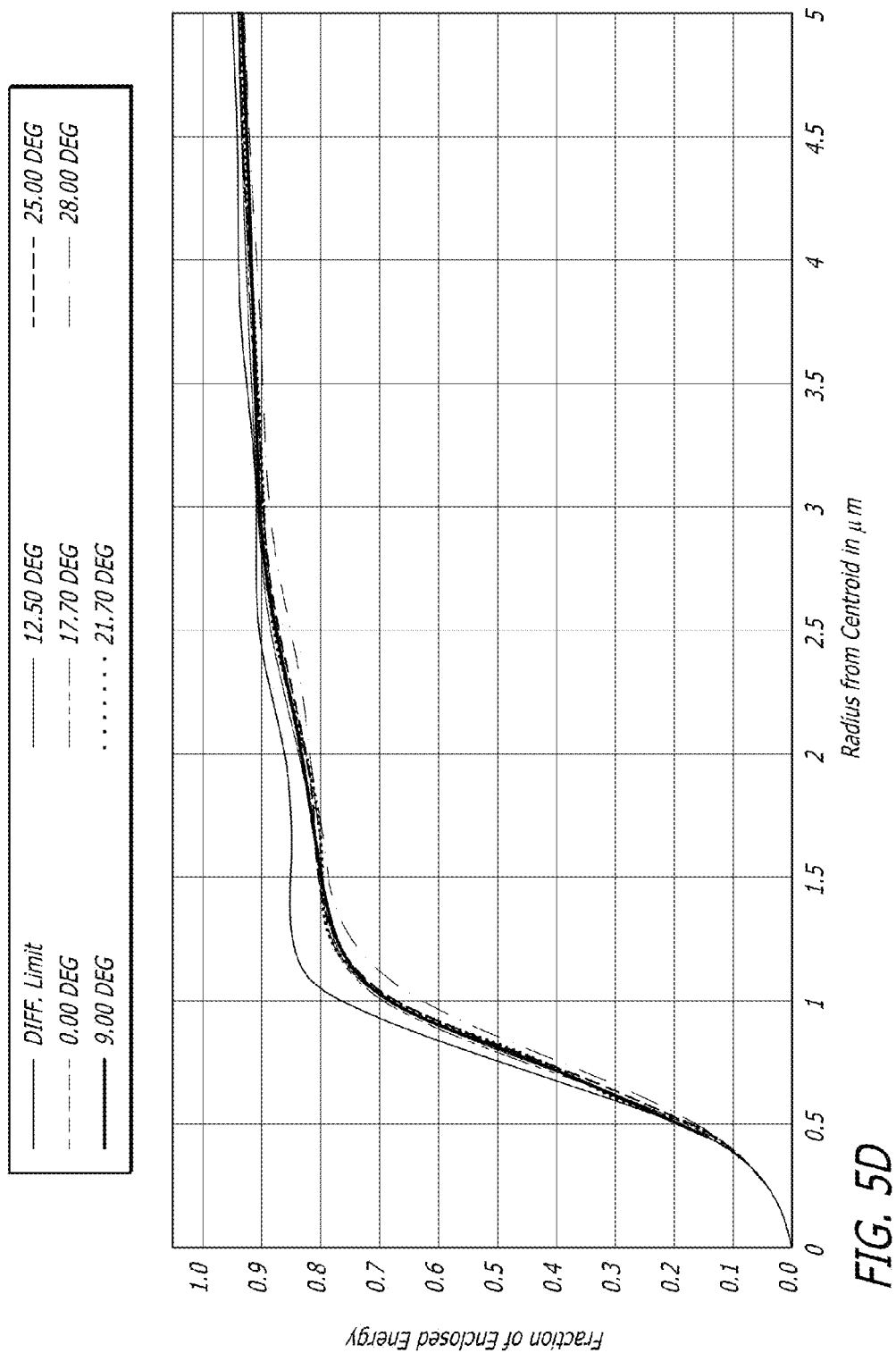
Figure 5E:
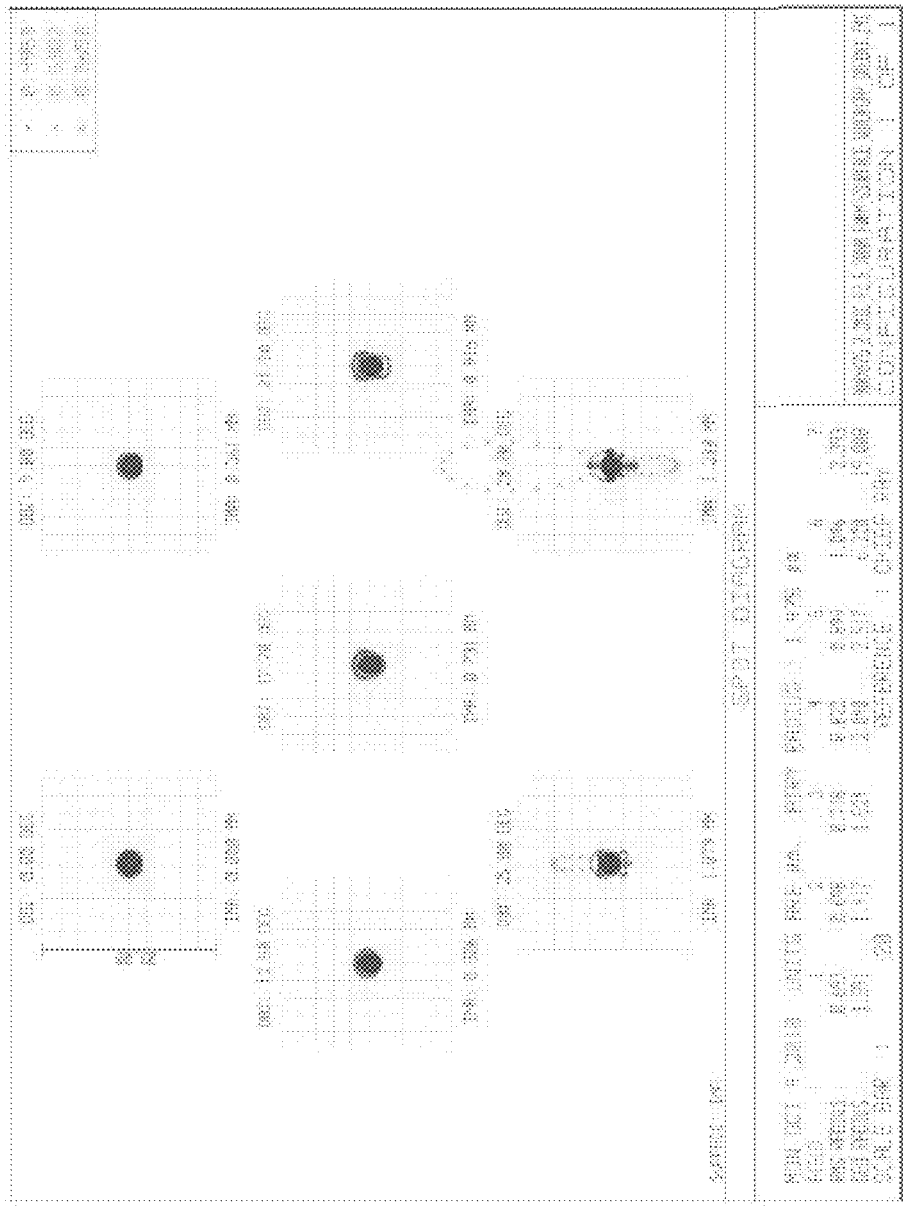
Figure 5F:
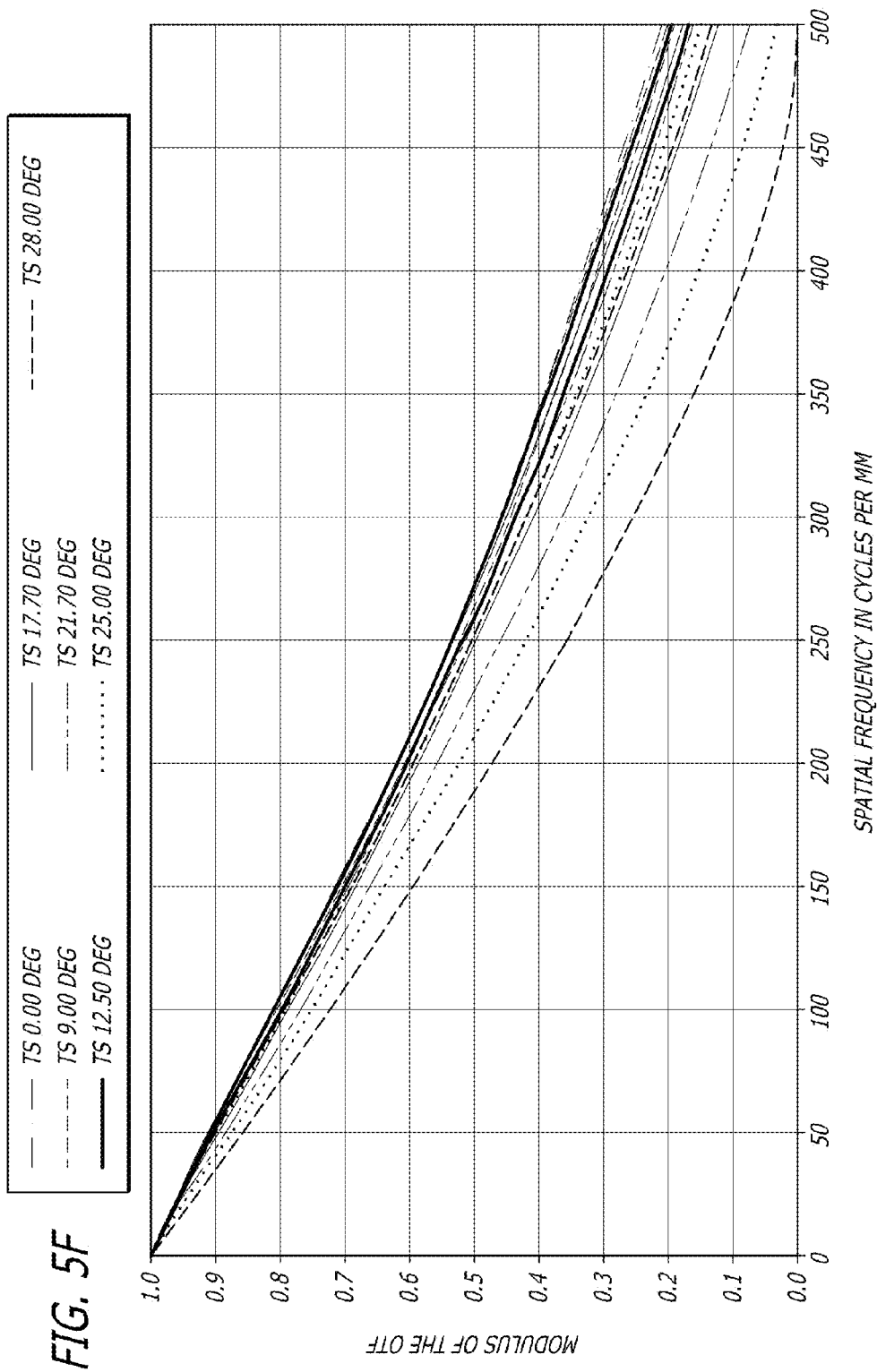
Figure 5G:
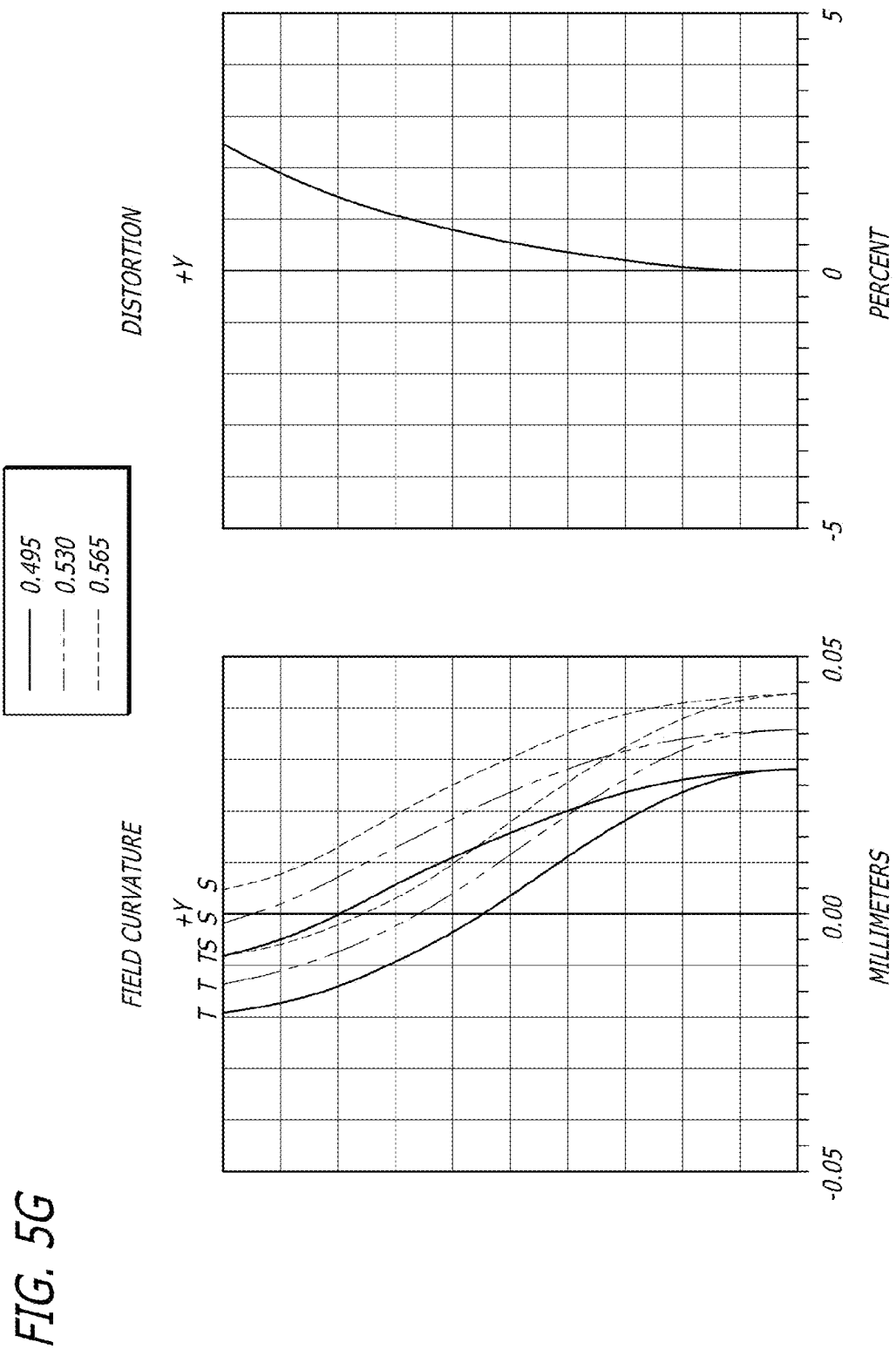
Figure 5H:
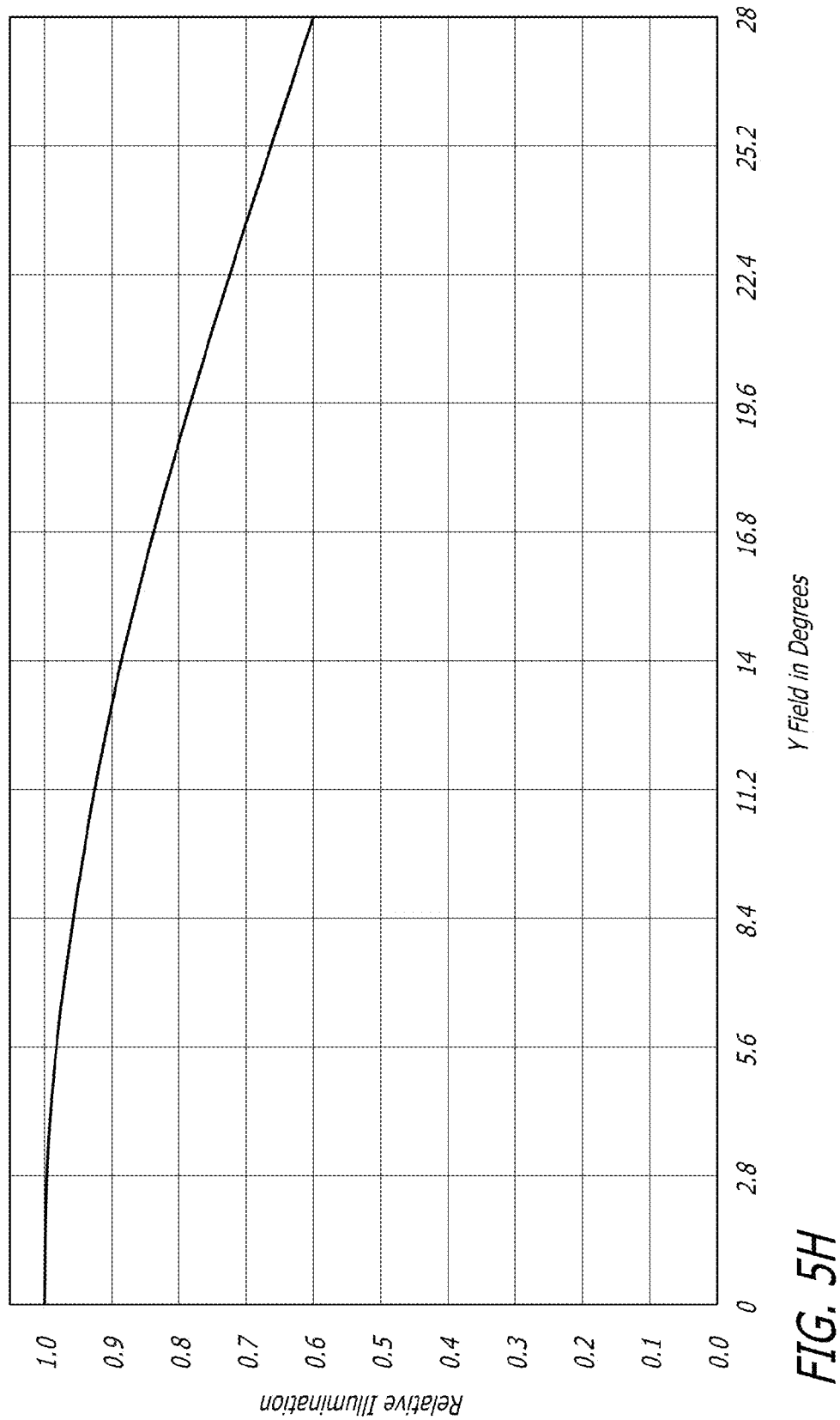

FIGS. 5B-H present some characteristic performance indicators of the five-surface optical arrangement shown in FIG. 5A1. In particular, FIG. 5B provides a data graph of the Strehl ratio showing that the lens is diffraction limited over the full field height (@ F/2.4 and diagonal full FOV of 56°). FIG. 5C provides a data graph showing that in a comparison of MTF vs. field there is virtually no loss of performance with increasing field height. FIG. 5D provides a data graph of the polychromatic diffraction encircled energy, and demonstrates that most of the focused light energy is within the Airy disk. FIG. 5E provides a spot diagram demonstrating that the lens almost appears to be isoplanatic where there is little change of spot size and shape with field height. FIG. 5F provides a data graph of MTF vs. spatial frequency, and shows that for small and intermediate field heights there is still 15-20% contrast even at 500 LP/mm. FIG. 5G provides data graphs showing that the lens design demonstrates acceptable and monotonous distortion. Finally, FIG. 5H provides a relative illumination plot, demonstrating that the optical arrangement shows the usual vignetting behavior.

These data results show that for this particular design family, due to the strong degree of achromatization, there is very little performance loss using the green channel for red and blue spectra. In other words, the system is already well achromatized for the full visible spectrum. Accordingly, there is not much benefit when optimizing the green and red channels specifically rather than just using the green one. Explicit full visible optimization is very promising as well, i.e., no differences between the channels are required. Furthermore, from these results it is possible to recognize that optimizing a lens for the full visible spectrum, but using only the red, green and blue bands separately will improve performance even beyond what is seen from the visible-polychromatic MTF, Strehl-ratio and Encircled energy plots. This is because fewer wavelengths contribute to each color channel's polychromatic blur. Moreover, this effect becomes more significant the more lateral color dominates the polychromatic blur over axial color, since then the difference between colors is mostly reflected in a difference of magnification or focal length as described above rather than different blur sizes. In short, the largest benefit of these features is that all channels could be the same, simplifying the array mastering considerably.

Although the above discussion has focused on an embodiment of a five-surface optical arrangement with no air gap between the field flattener and the imager, it should be understood that alternative embodiments incorporating air gaps may be made in accordance with this invention. These embodiments are advantageous because they may be combined with regular image sensors which can have fill factor enhancing microlenses and a limited maximum CRA of around 30°. For Example, FIGS. 5I1 and J1 provide diagrams of two such embodiments, which will be described below.

The embodiment shown in FIG. 5I1 is a five-surface optical arrangement that allows for an air gap 526 between the sensor cover glass 510 (on which the field flattener 528 is positioned) and the image sensor 524. This is usually required when fill factor enhancing plenses are applied on top of the image sensor 524. As a result of the presence of the air gap, the chief ray angle needs to be reduced over the embodiment shown in FIG. 5A1. Although there are no constraints made on lens vertex heights and minimum glass thicknesses, lens TTL increases and image performance reduces due to the requirement of a reduced maximum CRA. However, ray calculations indicate that even in this embodiment the CRA of the inventive optical arrangement meets regular sensor specifications (in the order of magnitude of 27-28° in air). An exemplary lens table associated with this design is provided in FIG. 5I2.

FIG. 5J1 provides a schematic of an embodiment of a five-surface optical arrangement optimized for best possible manufacturability. In particular, in this embodiment the lens sags are decreased, and lens material planar base layers 532, 534, 536, 538 and 542 having suitable thicknesses are provided. It should be understood that for construction purposes, each lens element may optionally be associated with a corresponding supporting substrate 533 & 533', 537 & 543 made from example of glass, upon which the polymer lens surfaces and base layers may be formed. In addition, spacer elements (not shown) that can serve to mechanically connect the lens elements to each other and/or to the image sensor may also be included in the construction.

In addition, the system aperture 540 is sandwiched (or "embedded") between two glass substrates 533 and 533' in order to decrease the necessary polymer thickness of the adjacent lens surfaces. Finally, a glass substrate 543 is provided between the field flattener lens surface 544 and the imager package, including the image sensor glass cover 545 and the image sensor 546 (with air gap 548). Although an even split of 50/50 is shown in FIG. 5J1, the thickness between the glass substrate 543 and the image sensor cover glass 545 may be shared by any reasonable ratio (which allows sufficient thickness for both). Cover glass as needed for the imager may also be provided. All of these elements may then be immersed and bonded together by a suitable adhesive during manufacture. Again, in this embodiment the CRA meets regular sensor specifications (in the order of magnitude of 27-28° in air). An exemplary lens table associated with this design is provided in FIG. 5J2.

Although the basic construction of the five-surface optical arrangement is described above, it should be understood that other features and structures may be incorporated into the lens elements to provide additional or enhanced functionality (references are to FIG. 5A1), including:

The system aperture (Stop) may be disposed either on the second side of the first element 500, or on the corresponding side of the respective glass substrate, or embedded within the first lens element 500 (e.g. sandwiched between two thinner glass substrates that have been structured with an aperture array on the inner side, then glued together). In such an embodiment, the lenses of the element would be replicated on this aperture sandwich.

As discussed above, other implementations of this general design may have either no air gap or a thin air gap between the third lens element 504 and the photosensitive surface (or interface thereto) of the image sensor 524. Such a design allows this optical arrangement to operate with regular image sensors, specifically those with fill factor-enhancing microlenses, and image sensors with conventional CRA. However, this results in longer TTL and only moderate image quality compared to versions without the discussed air gap. In particular, the CRA needs to be moderate when there is an air gap at this location, because otherwise there can be (partly) total internal reflection at the interface between the higher refractive index third lens element 504 and the air gap, or such a strong refraction outwards that strong aberrations occur, i.e., rays may be fanned out rather than focused.

Several additional apertures may also be disposed within the stack, and, in particular, on the glass substrates underneath the polymer lenses where applicable.

Channel specific filters may also be arranged within the stack of the first 500 and the second 502 lens element, preferably in a surface close to the system aperture. Such filters may include, for example, organic color filter array "CFA" and/or structured dielectric filters, such as, IR cut-off or NIR-pass interference color filters.

Partial achromatization of the individual narrow-spectral-band-channels may be accomplished by combining different Abbe-number materials for the different lens surfaces. Preferably "crown-like" materials would be used for the two convex surfaces on the outsides of the two first lens elements and "flint-like" materials for the two concave surfaces on the inner sides of the two first lens elements (See Embodiment 6).

Optimization of the different color channels to their specific narrow spectral band may also be accomplished by adapting at least one lens surface profile within the optical arrangement to that color to correct for chromatic aberrations. (For a full discussion see, e.g., U.S. patent application Ser. No. 13/050,429, the disclosure of which is incorporated herein by reference.)

There are several features of this novel five-surface optical arrangement that render it particularly suitable for use in array cameras. First, the optical arrangement is designed in such a way that very high contrast at the used image sensor's Nyquist spatial frequency is achieved, which at the same time (for gradual fall-off of contrast with increasing spatial frequency) provides sufficient contrast at 1.5× or 2× the sensor's Nyquist frequency to allow the super-resolution image information recovery to work effectively. Second, the optical arrangement is optimized for allowing a small lateral distance between adjacent optical channels in order to economically exploit the die real-estate area, consequently the lens diameters and the wall-thickness of (opaque) spacer structures may be reduced. However, for the field flattening structure itself this is sometimes difficult to achieve. The reason for this is that the proximity of this lens surface to the image sensor requires a lens having a diameter on the order of magnitude of the image circle (scaled by the distance between the two). In order to relax this requirement the field flattener can be designed and implemented in a non-rotational-symmetric way. This results in a rectangular rather than circular footprint of this lens surface. Thus the lens would have a large lateral extension along the corners (=image sensor diagonal), thereby allowing multiple lens surfaces within one array to be situated much closer together in x-y and thus allowing an overall smaller pitch between the channels. Third, optical channels within one array dedicated to imaging different "colors" (parts of the overall wavelength spectrum to be captured) may differ in the particular surface profile of at least one lens surface. The differences in the surface profiles of those lenses in one array can be minor, but are very effective in order to keep the back focal length ("BFL") color-independent, and consequently allow (almost) equally sharp images for the different colors without the costly need for wide-spectral-band achromatization. Moreover, after computational color-fusion a high-resolution polychromatic image can still be achieved. Here, preferably the first surface of the first lens element would be specifically optimized for the narrow spectral band of the respective color channel.

The benefits of this array-dedicated design of the single channels of the array camera include:
Extremely high image quality, both in terms of resolution and contrast, and image quality homogeneity over the field of view (close to diffraction limited performance and close to isoplanatically);
A reduced TTL;
A reduced fabrication tolerance sensitivity due to reduced ray bending;
Low color cross-talk, due to color filters now being differentiating the different optical channels rather than having a Bayer pattern on the pixel level;
Low pixel cross-talk, due to smaller pixel stack height); and
Reduced color inhomogeneity, due to the color filters being far from the image plane.

Finally, of particular note in this design is the fact that the separate color channels only need to be optimized for their respective spectral bands. This results in overall higher polychromatic resolution, while minimizing the need for achromatization correction within the individual channels. This in turn leads to the ability to implement simpler overall aberration balancing or correction process, and therefore have simpler lenses and lens manufacturing processes, and/or better MTF, and/or lower F/#. In many embodiments the MTF characteristics of the five-surface optical arrangement allow for contrast at spatial frequencies that are at east as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

Embodiment 3: Monolithic Lens Design with Embedded Substrate

The embodiments previously discussed dealt with lenses made in accordance with a polymer on glass WLO process. In the following embodiment optical arrangements and designs using a monolithic lens WLO process are provided. In particular, in a first embodiment a monolithic lens stacked with planar substrates for use in forming apertures and filters is described.

Figure 6A:
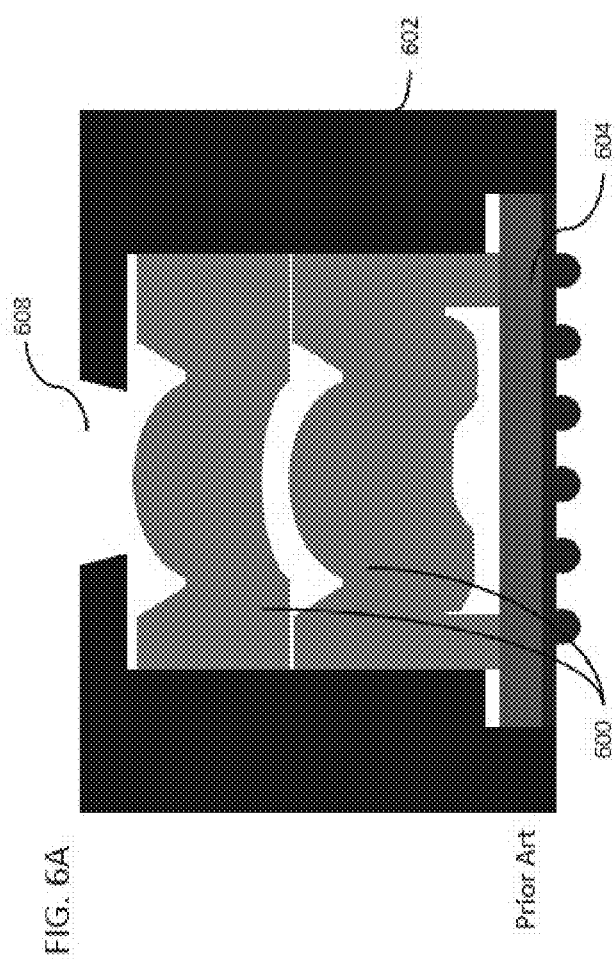
FIGS. 6A and 6B are schematics of conventional monolithic lens and aperture arrangements.
Figure 6B:
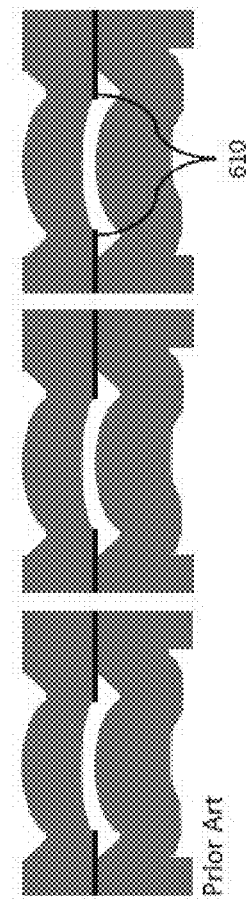

FIG. 6A shows the current state of the art of monolithic lens systems. More or less the same conceptual approach is taken as in creating injection-molded lenses and their packaging. In the state of the art of monolithic lens WLO, many lenses are fabricated on a wafer scale. These replicated lenses 600 are stacked with other previously replicated lens wafers of different topology, the sandwich is diced, and the lens cubes are packaged into an opaque housing 602 with the image sensor 604, which contains the aperture stop 606 at the front as shown in FIG. 6A. This very much limits the degrees of freedom available for the optical design of the objective. In addition, it makes it difficult to accurately replicate and align the lenses with respect to each other, particularly as it is difficult to determine precisely the placement of the aperture stop. Moreover, from the standpoint of optical design it is very desirable to have the aperture stop between the two lens elements, not in front of the first lens element as shown in FIG. 6A. Currently, as shown in FIG. 6B, the only method for forming apertures of this type on monolithic lenses is to use a highly imprecise screen-printing method in which apertures 608 in opaque resins are printed onto the flat portions of the lens interfaces. The lateral accuracy of those apertures is unsuitable for their use as a system stop, which must be precisely aligned with the lenses.

In short, although monolithic lens WLO is potentially an attractive means to manufacture cheap miniaturized optics for array cameras, the current monolithic systems are directly adapted from the methods used to form lenses by injection molding. As a result, many of the techniques used in conventional polymer-on-glass WLO to ensure proper alignment are not applied, leading to alignment accuracy problems as well as to a limited lens design space. The current embodiment is directed to a novel method of forming monolithic lenses that combines the monolithic WLO lenses with substrates that hold apertures and additional structures in precise alignment, thereby reducing the limitations of conventional monolithic lens WLO.

Figure 6C:
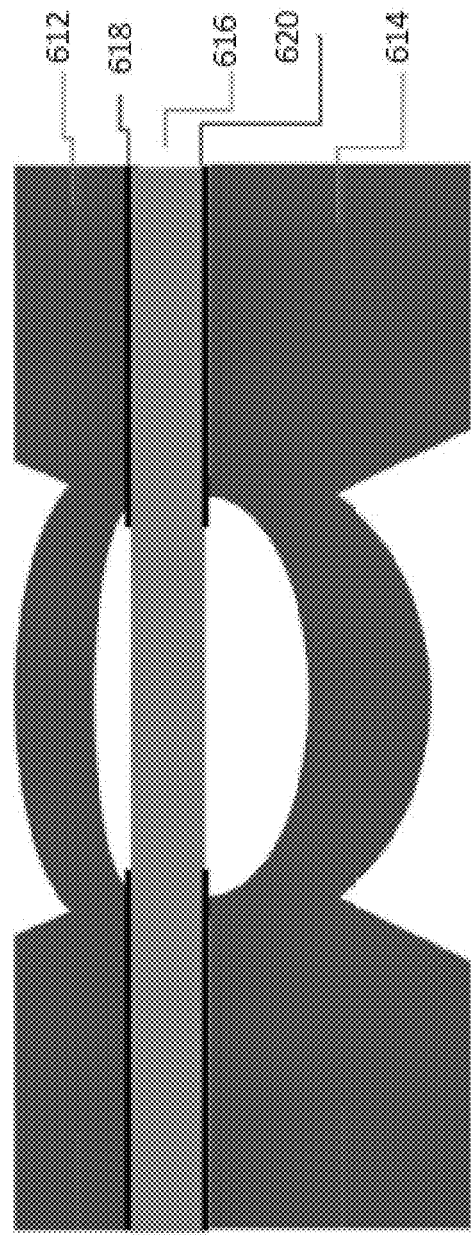
FIG. 6C is a schematic of a monolithic optical arrangement according to one embodiment of the invention.

An exemplary embodiment of the method of monolithic lenses formed in accordance with the invention is shown in FIG. 6C. As shown, in this embodiment, monolithic lenses 612 & 614, fabricated by an independent replication process, are stacked with a substrate or sheet 616 that holds apertures 618 & 620. (As discussed previously, it will be understood that the monolithic lenses may be formed of glass or polymer.) Because the apertures can be formed on the substrate with lithographic precision, it is possible to align the elements with sufficient lateral precision to function as the aperture stop. In addition, although not shown in FIG. 6C, the accuracy of the alignment in such a system is increased by cooperative alignment marks, which are disposed in the opaque layer(s) where the transparent openings for the apertures are structured, to provide a guide for the precision alignment of the lenses and apertures. In particular, in a wafer stack formed from a series of wafer surfaces, themselves formed from the elements of a number of optical arrangements, alignment marks would be formed in relation to each wafer surface. Each of the alignment marks would be cooperative with an alignment mark on an adjacent wafer surface such that when cooperatively aligned the alignment marks would aide in the lateral and rotational alignment of the lens surfaces with the corresponding apertures. Using these alignment marks results in a very high lateral alignment accuracy (on the order of a few µm) compared to having the aperture stop in the external housing, which results in an accuracy of several 10-20 µm.

In addition to apertures, the current method of providing a substrate embedded into monolithic lenses provides a base onto which any number of different structures, coatings, kinds of substrates or sheets can be applied in order to achieve a desired optical functionality. A number of these possibilities are shown in FIG. 6D, these include where there are two apertures on the front and back of the substrate that are the same size (6D1) or different sizes (6D2); where an additional IRCF coating, such as a homogenous IR cut-off filter made by a dielectric interference coating, is applied on either one or both sides of the substrate (6D3); where an additional color filter array material coating is applied to the substrate (6D4); where the sheet or substrate contains an adaptive refractive optical element allowing for the adjustment of the optical power of the element by changing an applied voltage, which can allow for the focusing of the whole lens stack, accounting for fabrication tolerances (such as BFL variations)(6D5); or where the sheet or substrate is made from an opaque material (6D6).

Other alternative designs that may be incorporated into the substrates and monolithic lenses of the instant invention, but that are not shown in the figures may include:
- A substrate that is made of a material that is itself an absorptive IRCF (or combined with a dielectric coating);
- A structured dielectric IRCF complemented by a structured dielectric NIR-pass filter for extended color camera modules;
- A polarization filter disposed on the surface of the substrate or that is preformed into the sheet;
- A thin diffractive lens applied to the surface of the thin substrate by replication of an additional thin polymer layer, or also by etching the diffractive structure into the glass, front and/or backside of the substrate surface (See Embodiment 9); and/or
- Standoffs or spacing structures integrated into the monolithic lenses in addition to the actual lens surfaces in order to provide the correct positioning between the lens surfaces and the system aperture on the thin substrate (See Embodiment 8).

Although the above has focused on specific substrate structures and additional optical elements that the substrate embedded monolithic lenses of the instant inventions can incorporate, it should be understood that there are other features unique to the embedded substrates of the invention. For example, unlike conventional polymer on glass WLO where substrates or sheets must be sufficiently thick to allow replication of lenses thereon, the embedded substrates or sheets of the instant invention can be thin in comparison to wafer level optics standards since there is no need to replicate lenses on them. As a result, the mechanical stability and stress applied to the substrate is not an issue. In contrast, the independently replicated monolithic lenses can themselves serve to stabilize the glass substrate. Moreover, this holds true even for a singlet lens construct (i.e., one monolithic lens and one thin substrate).

Finally, while individual modifications to the basic embedded substrate monolithic lens optical array are described above, it should be understood that all or some of these features may be applied in various combinations to the substrates to obtain the desired functionality of the optical arrangement. In particular, these structures may allow for the implementation of optical arrangements that allow for contrast at spatial frequencies that are at least as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

Embodiment 4: Monolithic Lens Design with Embedded Aperture Stop

This embodiment of the invention provides yet another alternative for aperture and filter placement within the lens stack of polymer or glass WLO monolithic lenses. As described above with respect to Embodiment 3, the current state of the art for producing monolithic lens optical arrays is to stack the independently replicated monolithic lens wafers, dice the sandwich and package the lens cubes into an opaque housing which contains the aperture stop as an integral part at the front of the array. This methodology limits the degrees of freedom for the optical design of the objective, as well as making it extremely difficult to accurately align the lenses with respect to of the aperture stop.

Embodiment 3 of the invention described a polymer or glass monolithic lens stacked with substrates for the placement of apertures and filters. In that embodiment of the invention, a substrate, such as glass, having aperture and/or filters thereon is disposed between separately fabricated monolithic lenses. This novel optical arrangement provides addition degrees of freedom for the optical design, and increases the lateral precision of the lens-aperture-alignment. The invention described in this embodiment embeds apertures and filters directly within a monolithic lens (See FIGS. 7A to 7G), providing even more and different degrees of freedom for the optical design, while maintaining a high lithographic precision for the lateral aperture placement.

As discussed with respect to Embodiments 1 to 3, lithographic procedures for producing apertures and/or filters are well known for polymer on glass WLO, e.g., spin on photoresist, expose desired areas through a correspondingly structured photomask, develop unexposed or exposed—depending on whether a positive or negative photoresist is used—areas away; either the photoresist itself is the opaque layer the apertures are structured in, or the (CFA) filter; or the photoresist is a protective layer for a previously applied metal or dielectric coating, which prevents the etching away of that material at the desired areas when the wafer is placed into an etchant. However, for a monolithic lens typically the monolithic lenses are replicated as double-sided lenses. As a result of the unusual topography, these WLO techniques cannot be applied since a plano surface is needed for lithography.

The current invention is directed to an optical arrangement and process for producing such monolithic lenses formed of either polymer or glass with embedded apertures and filters. One embodiment of the invention is shown schematically in FIG. 7A. As shown, in this embodiment, first the thick front-side of the lens 702 is replicated as a plano-convex or plano-concave element. Preferably, the front-side stamp, which also holds the lens profiles, additionally contains alignment marks (as described above in Embodiment 3) that are further used in the other manufacturing steps to aide in the precise alignment of the various elements to the overall optical arrangement. Because the backside 704 stamp in this initial step may be simply a highly flat and/or highly polished plate, no precise lateral alignment of the two stamps is required, only wedge error compensation as well as the correct thickness needs to be ensured. These modest requirements simplify this initial process step considerably.

Once the first lens element of the arrangement is complete, apertures 706 and filters 707 are applied on the plano back-side 704 of this lens element. As these apertures must be precisely aligned, it is preferable if the front-side of the lens element is provided with alignment features (not shown) that can be used during manufacture to assist in positioning the apertures with respect to the lens by aligning the alignment marks in the photomask of the apertures and/or filters to the complementary alignment marks within the first lens layer. Alignment marks, which may be of any suitable design, provide the benefit of allowing much higher lateral alignment accuracy (few μm) compared to having the aperture stop in the external housing, which has a typical lateral alignment precision of several 10-20 μm.

Once the apertures/filters 706/707 are positioned on the back-side 704 of the first lens surface, the second lens surface 708 is replicated on the plano back-side 704, of the first lens surface 700. This second lens surface can be aligned either based on the alignment features in the first lens front-side 702, or based on alignment features within the aperture layer. However, it should be understood that aligning the second lens surface to the front-side of the first lens surface is preferred since the precision is expected to be better due to reduced error propagation when referring to this initial surface.

Figure 7A:
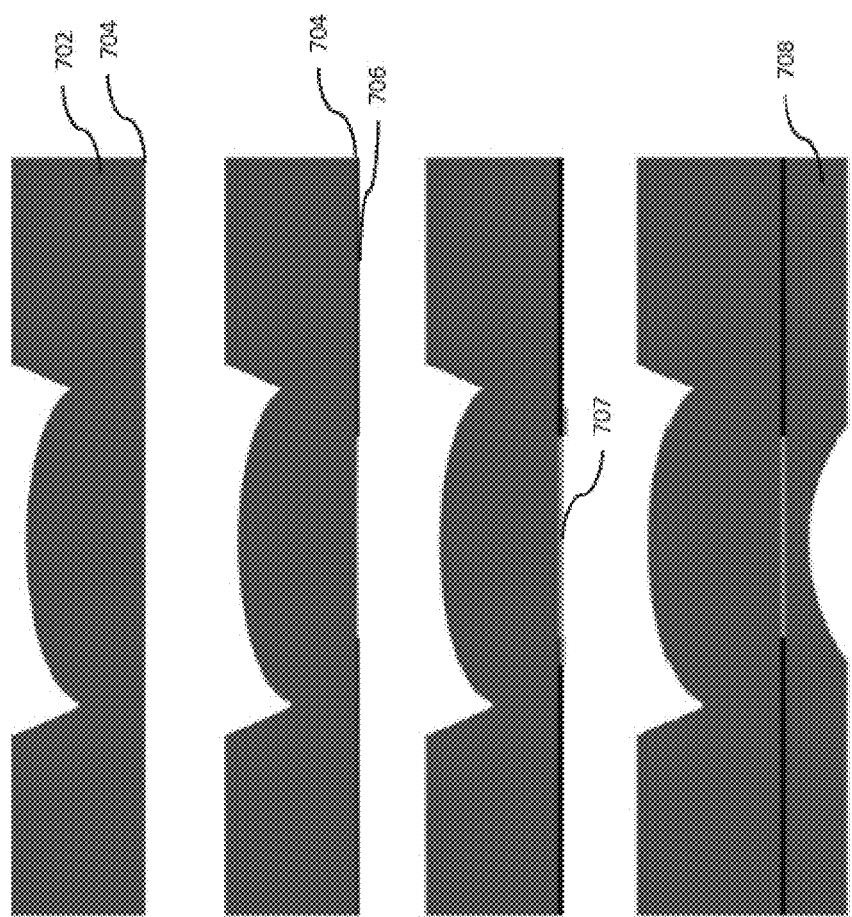
FIGS. 7A is a schematic of a process flow for manufacturing a monolithic optical arrangement according to one embodiment of the invention.
Figure 7B:
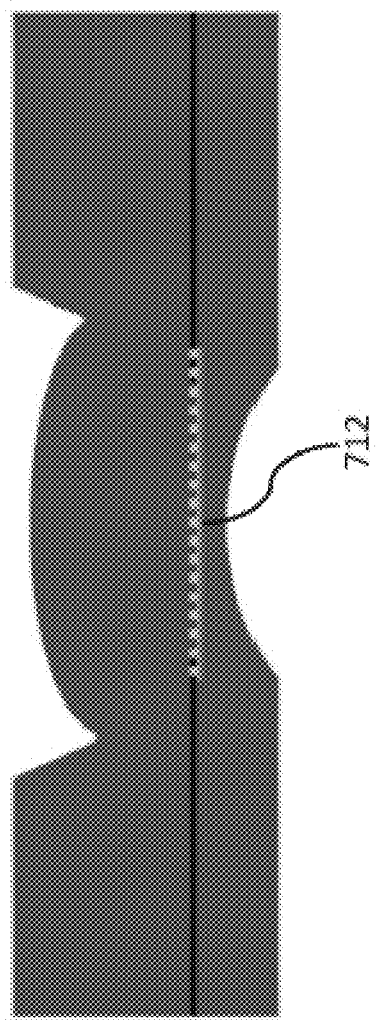

Although FIG. 7A provides an embodiment of a desired lens element with an embedded aperture in accordance with the current invention, a number of modifications or additional elements may be incorporated into the invention. For example, multiple filters 712, even having different physical natures, can be stacked on each other as shown in FIG. 7B. It should be understood that any desired filter may be applied in this manner, including, for example, a CFA filter or a structured IRCF filter.

In addition, although the materials used in forming the first 714 and second lens 716 surfaces have not been specified, it should be understood that the different replications may be formed from any suitable material, and that the material may be the same for both replications (as shown in FIG. 7C) or two different materials (as shown in FIG. 7D). If the same lens materials are used for the first and second replication, the inside lens surface optically vanishes (in other words: it is not visible to the light and thus provides no refraction and consequently is free of any Fresnel reflection losses). However, making the two replications from two different materials provides yet another degree of freedom in manufacturing the optical arrangements, especially for achromatization correction if the Abbe numbers of the two materials are different (See Embodiment 6).

Figure 7E:
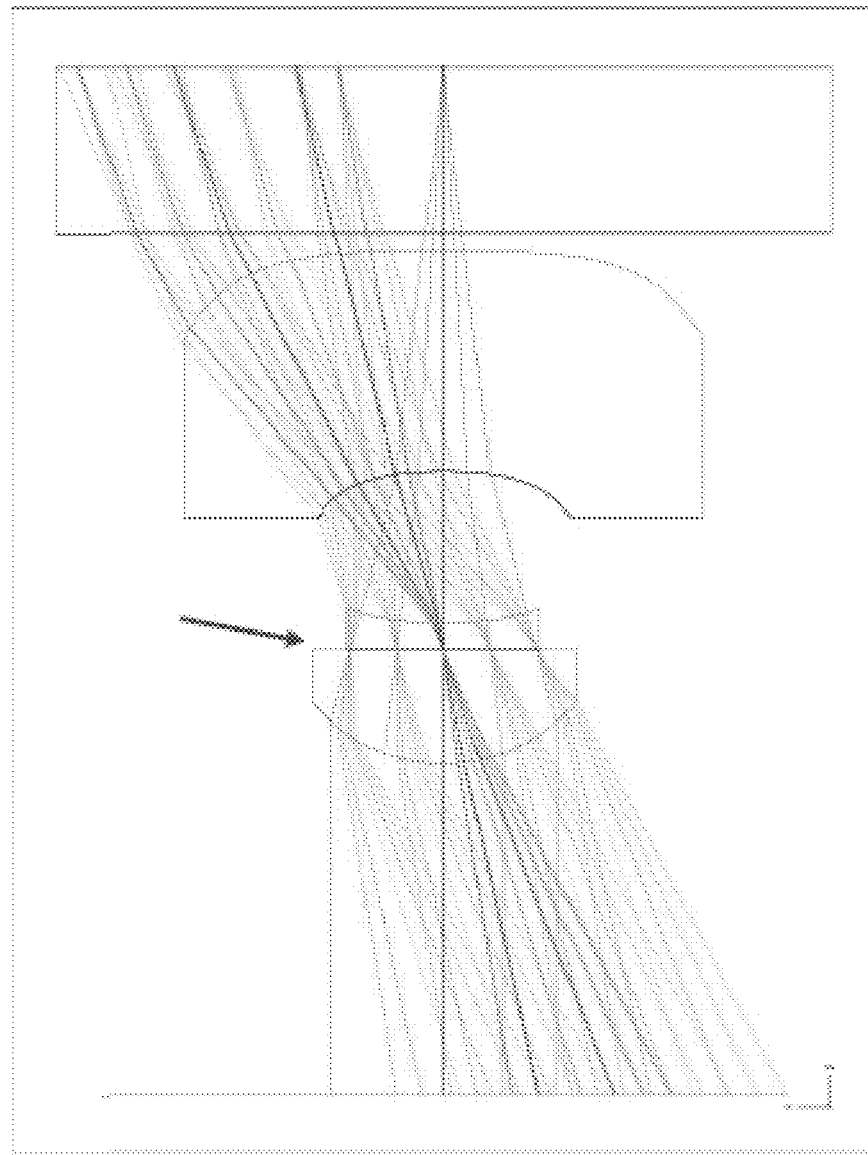
FIGS. 7E to 7G are schematics of optical arrangements which incorporate monolithic lens elements according to the embodiments of the invention shown in FIGS. 7B to 7D.
Figure 7F:
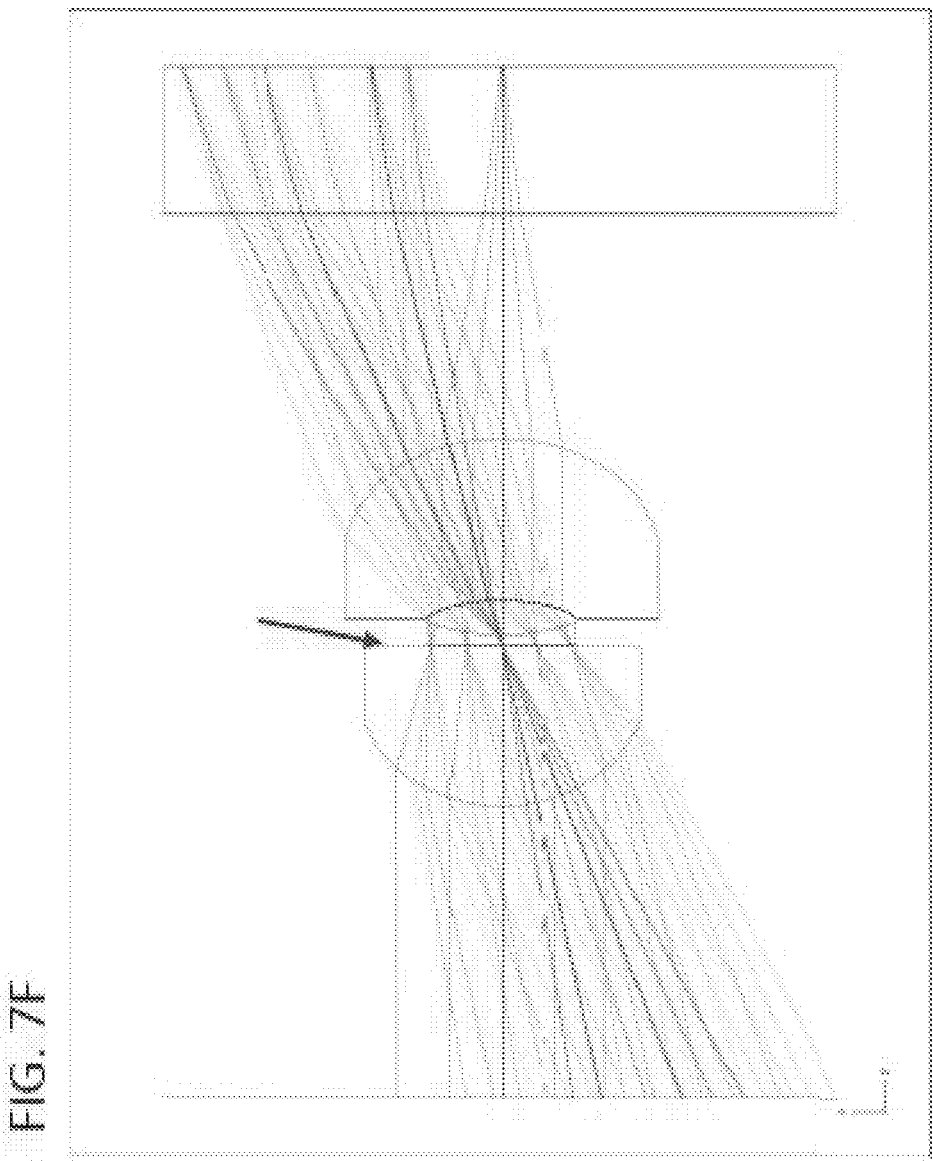
Figure 7G:
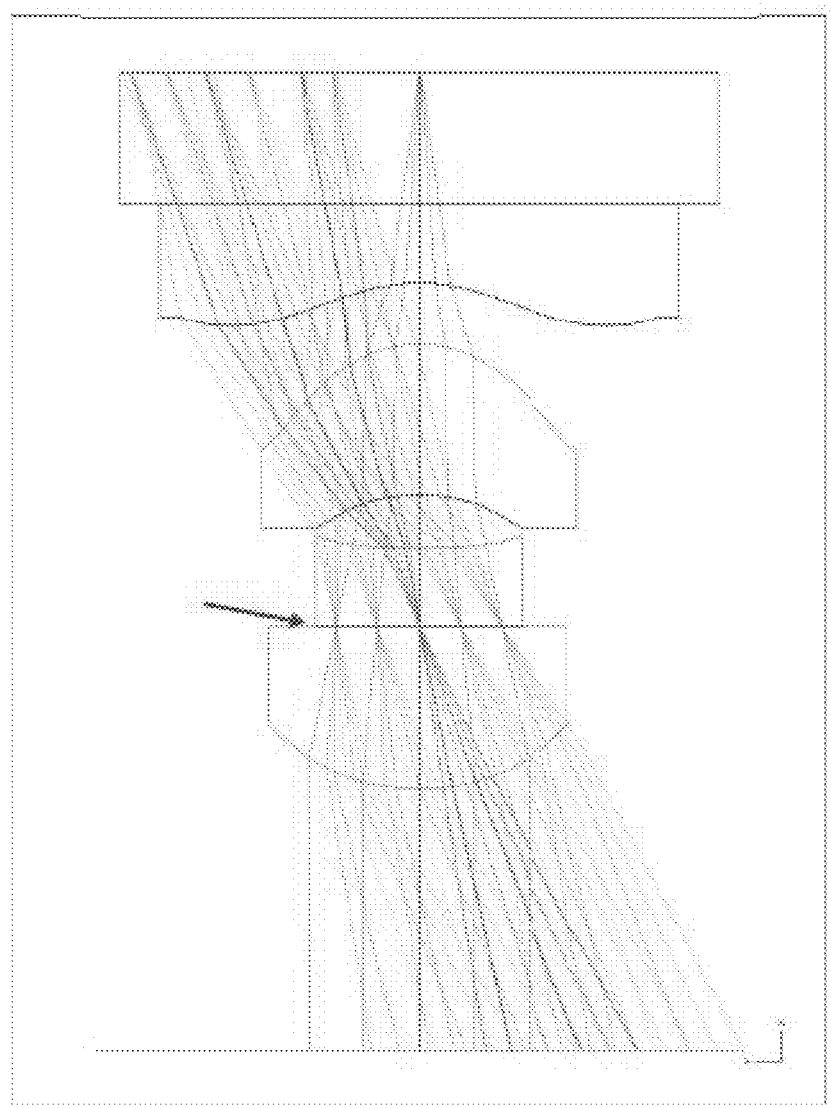

Although only a single lens element of a single lens channel of a potential array camera or wafer arrangement is shown, it should be understood that the monolithic lenses (polymer or glass) formed in accordance with the current invention may be duplicated as necessary to form the plurality of lens stacks needed for the array camera, and that the monolithic lenses may be combined with other lens elements to realize an optical arrangement having the desired characteristics. For example, FIGS. 7E, F and G provide schematic diagrams for monolithic lens arrangements suitable for array camera architectures. FIGS. 7E and 7F show two different monolithic doublet designs, while FIG. 7G shows a triplet design. The arrows in the diagrams indicate where an embedded system aperture or "stop" has been disposed between the monolithic lenses on one of the planar surfaces of the monolithic lenses.

In summary, while there is no doubt that monolithic lens WLO is very attractive for manufacturing optics for cheap miniaturized cameras, current methods are adapted directly from techniques used for injection molded lenses. As a result, several benefits of polymer-on-glass WLO are not used, leading to alignment accuracy problems as well as to limited lens design degrees of freedom. The combination of monolithic lenses and lithographic technologies described in the current embodiment allows for the manufacture of precise apertures and additional structures for monolithic lenses and their alignment to the monolithic lenses. This, in turn, allows for greater flexibility in the choice of the z-position for aperture stop and filters, increased lateral accuracy of the lens-aperture alignment when compared to conventional stops that are integrated into the lens housing, and the plano intermediate surface of the monolithic lens allows application of lithographic technologies for structuring the apertures while maintaining the benefits of the monolithic lens over the polymer on glass WLO. In particular, these structures may allow for the implementation of optical arrangements that allow for contrast at spatial frequencies that are at least as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

Embodiment 5: Three-Element Monolithic Lens Design

This embodiment of the invention provides yet another alternative for aperture and filter placement within the lens stack of polymer or glass WLO monolithic lenses. As described above with respect to Embodiments 3 and 4, the current state of the art for producing monolithic lens optical arrays is to stack the independently replicated monolithic lens wafers, dice the sandwich, and package the lens cubes into an opaque housing which contains the aperture stop as an integral part at the front of the array. This methodology limits the degrees of freedom for the optical design of the objective, as well as making it extremely difficult to accurately align the lenses with respect to the aperture stop.

As described in both Embodiment 3 and 4, a major problem of the monolithic lens process is that there is no suitable method to provide a precise system aperture (array) as well as (color- or IR cut-off-) filters within the lens stack of WLO monolithic lenses. The current embodiment provides another alternative to bring a lithographically fabricated aperture (stop), as well as filters into a polymer or glass WLO monolithic lens stack. In particular, this embodiment builds on the design introduced in Embodiment 4, in which one element of the lens design is forced to have a plano surface where the aperture and filters can be lithographically structured. As described above, in such an embodiment the plane side of the either plano-convex or plano-concave element can be used as substrate for the subsequent lithography step. The current embodiment provides a three-element optical arrangement using this plano-element monolithic design.

Figure 8A:
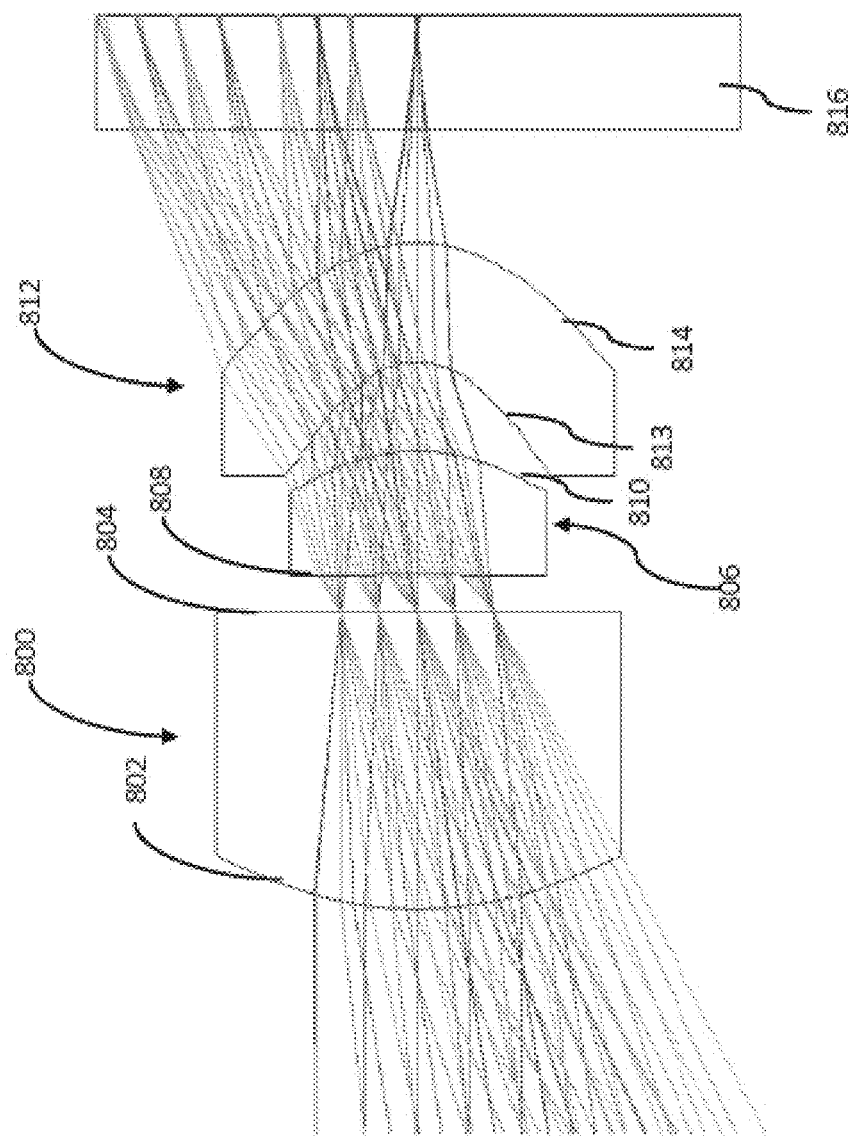
FIGS. 8A to 8D are schematics of three element monolithic optical arrangements according to various embodiments of the invention.

As shown schematically in FIG. 8A, the basic three-element design of the instant embodiment is characterized by the following properties:

A first plano-convex lens element 800 that has a convex first surface 802 as well as a plane second side 804 carrying the system aperture stop as well as required filter structures. Preferably, this first element is made from a first (low dispersion, low refractive index) lens material.

A second concave-convex lens element 806 that has a concave first surface 808, bent towards the object side and a convex second surface 810, where the concave first surface 808 is very shallow and this concave surface is very close to the plane (second) surface 804 of the first element 800. Again, preferably this lens element is made from a first (low dispersion, low refractive index) lens material. In addition, in a preferred embodiment, the surface profile of this shallow concave surface 808 close to the system aperture stop 804 is the one optimized/adapted to the specific narrow spectral band of the different color channels of an array camera.

A third menisc-lens element 812 that has a concave first surface 813 and a convex second surface 814, both bent towards the object side. This lens is preferably a strongly bent concave-convex lens that is made from a second (high dispersion, high refractive index) lens material. This third lens element is disposed adjacent to the image sensor cover glass 816, which itself is placed in above the image sensor 817.

This design has two significant advantages, first, a plane, substrate-interface-like, surface (e.g., surface 804 in FIG. 8A) is introduced in the lens stack. This plane, substrate-interface-like-surface can be used to apply a highly accurate (sub- or few-micron centering tolerance) aperture stop by photolithography. This is a major improvement in precision as the current state-of-the-art (screen printing)) has a centering tolerance of around 20 μm, which is insufficient for high image quality array cameras. In addition, color filters (CFA) and/or dielectric filters (IRCF) or other structures, which need a planar substrate, can be applied to this planer surface.

Second, the design provides a surface which is very close to the aperture stop (first surface of the second element) whose surface profile can be optimally adapted to the specific narrow spectral band of the different color channels of an array camera, as will be described in greater detail below with reference to the data-plots in FIGS. 8E to 8J, below.

Figure 8B:
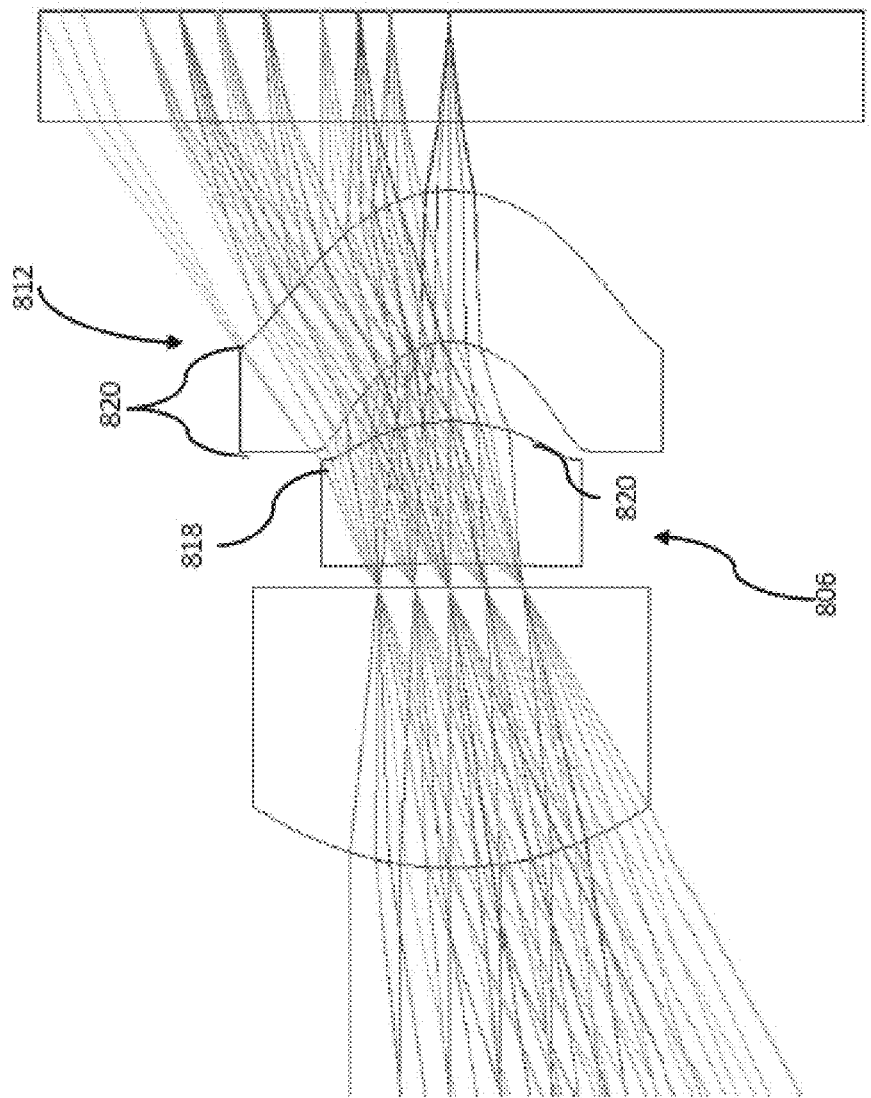
Figure 8C:
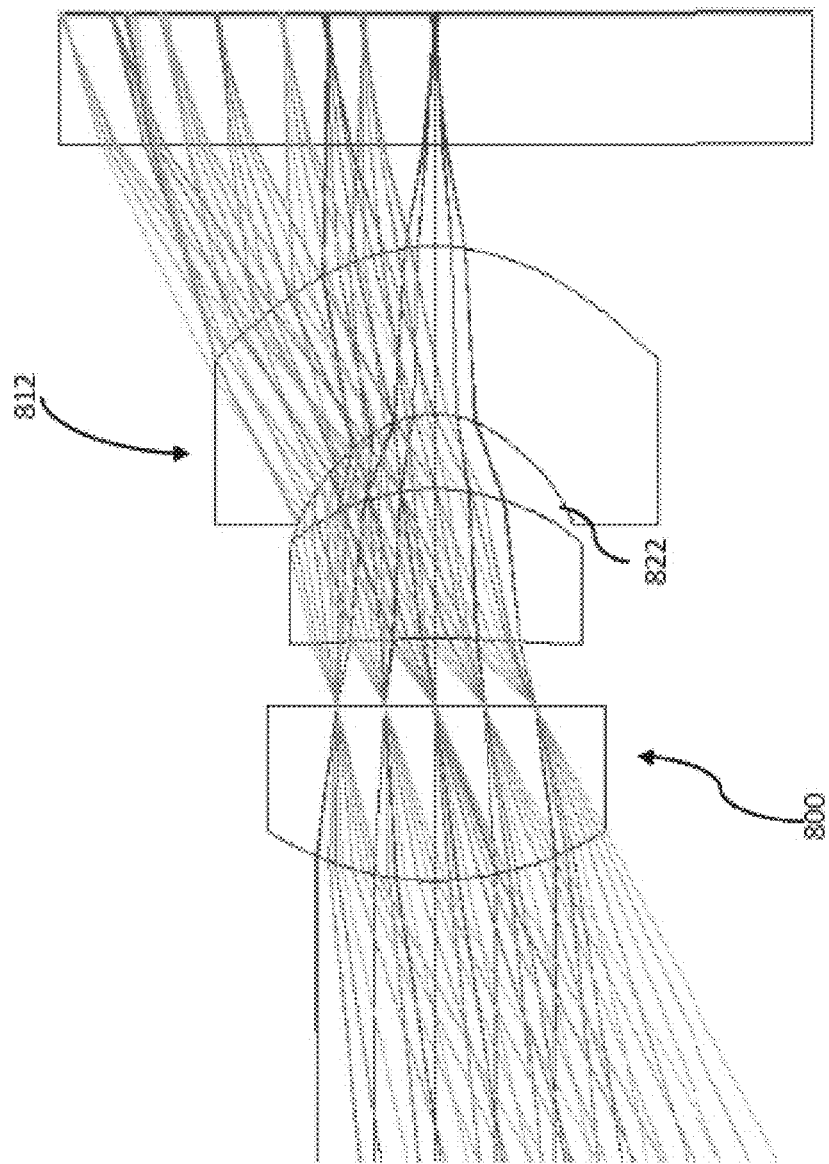
Figure 8D:
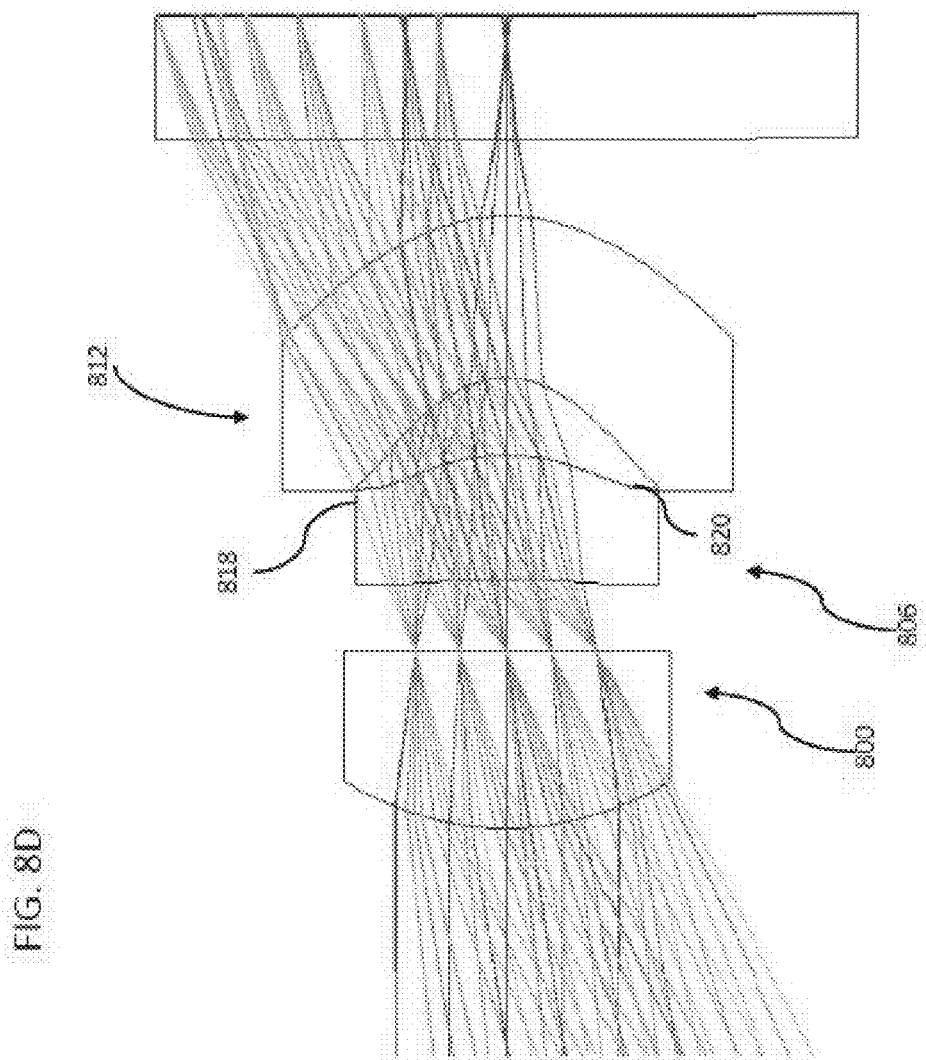
Figure 8E:
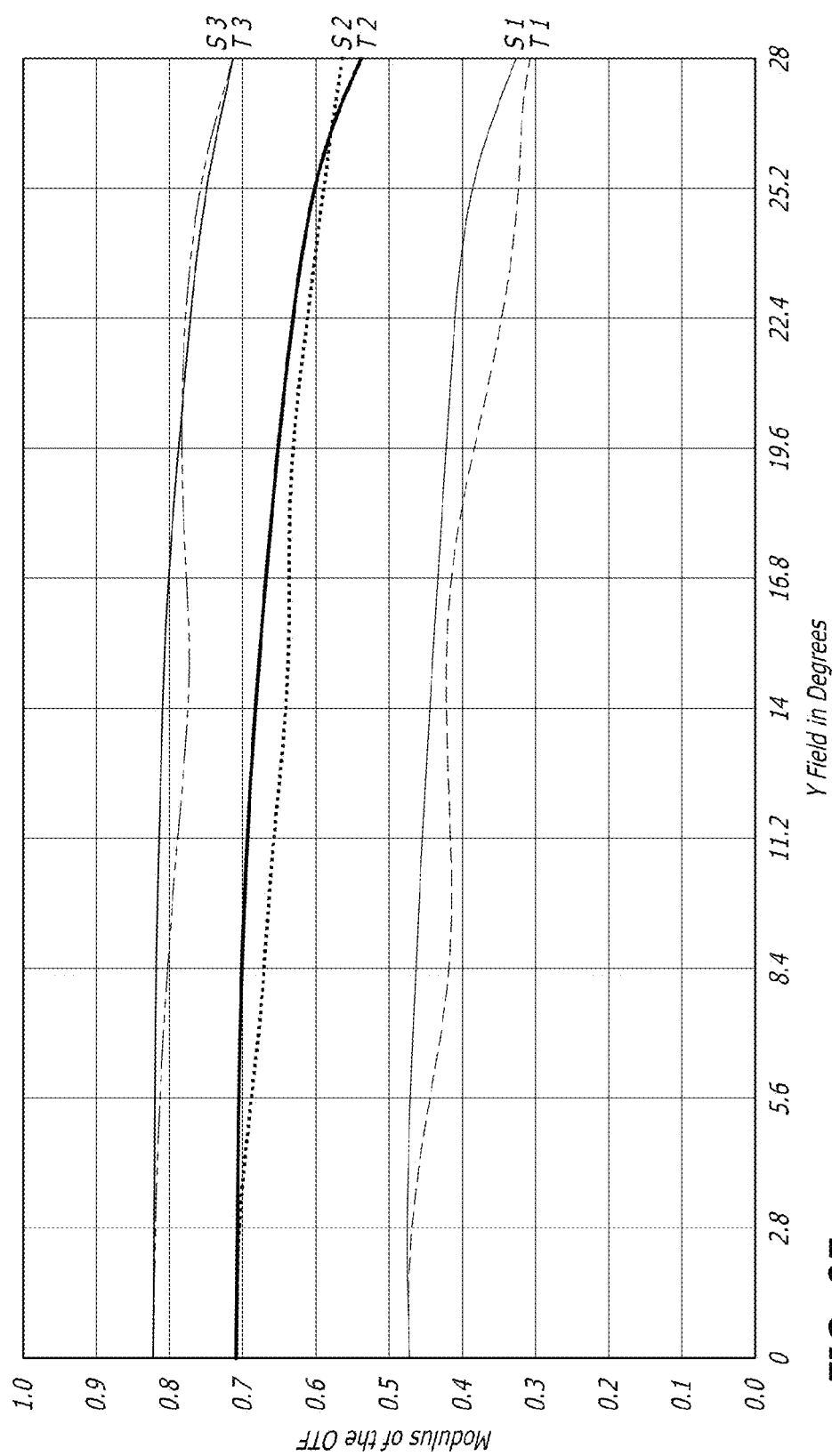
FIGS. 8E to 8J are data graphs of characteristic performance indicators of the three-element monolithic optical arrangements according to one embodiment of the invention.
Figure 8F:
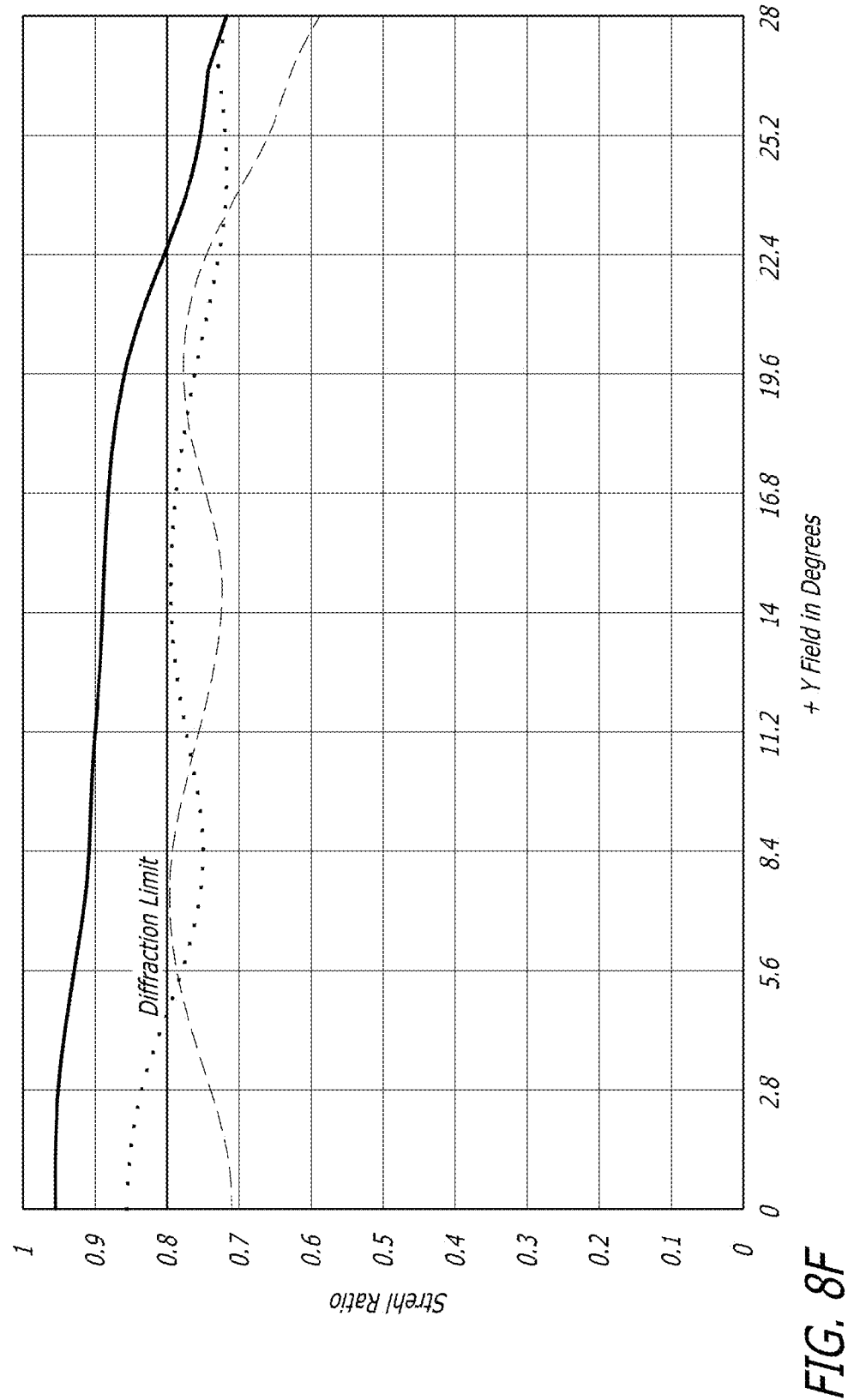
Figure 8G:
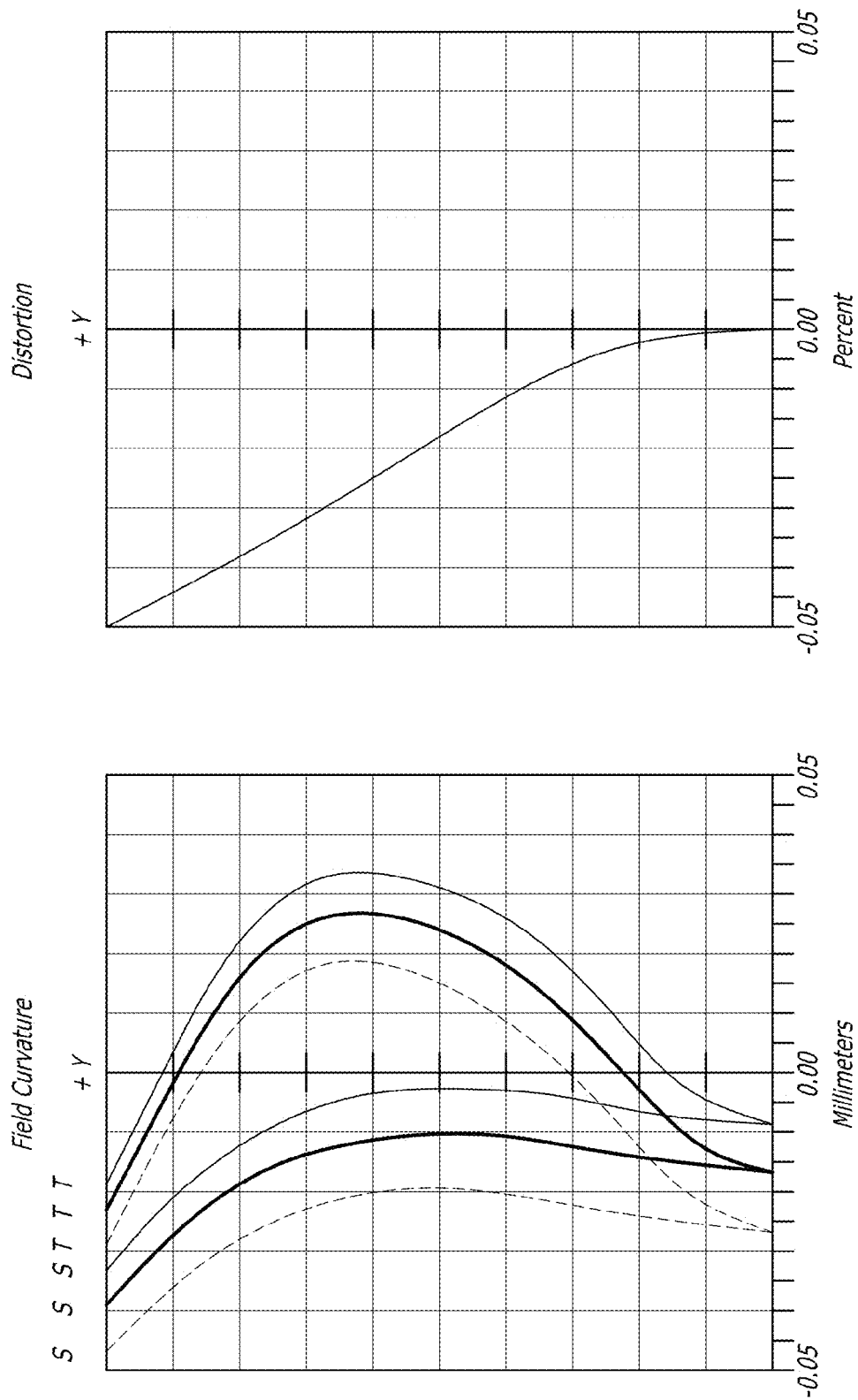
Figure 8H:
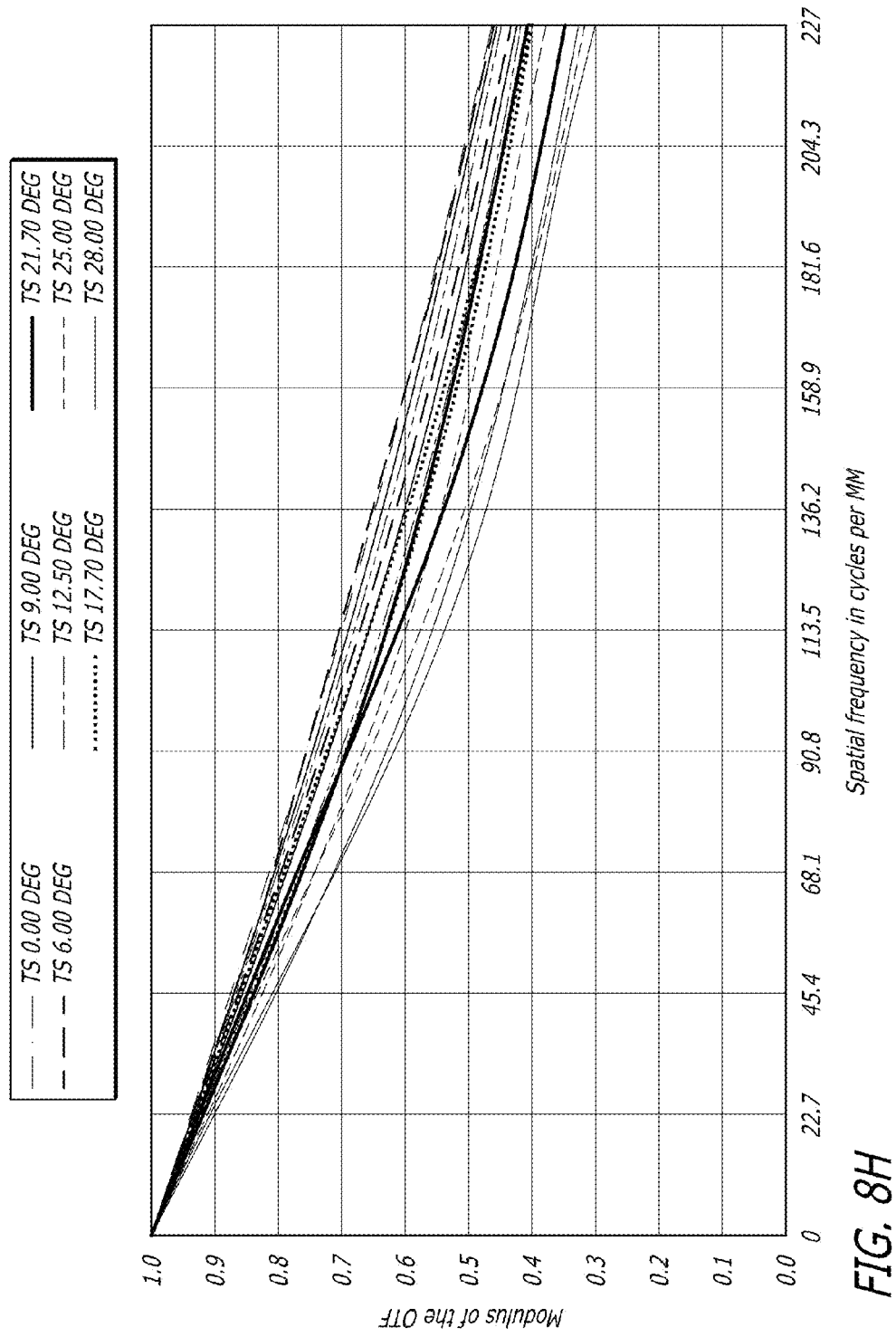

Although one specific embodiment of the three-element monolithic lens design is shown in FIG. 8A, it should be understood that there are many different implementations of the above general design principle, as shown and described in FIGS. 8B to 8D, below. In particular, FIG. 8B shows a modification of the basic optical arrangement in which the curvature at edges 818 of the second surface 820 of the second lens element 806, and at the edges 820 of both surfaces of the third lens element 812 quickly change slope towards these edges. Such a design has the benefit of allowing for a decrease in the steepness at the edge of the first surface of the third element. FIG. 8C shows a modification of the basic optical arrangement in which the first element 800 is thinner and the third element 812 is in consequence made thicker. Such a design, however, requires an increase in the steepness of the first surface 822 of the third element 812. FIG. 8D shows a modification of the basic optical arrangement in which the first element 800 is thinner and the third element 812 is thicker, and where the curvature of the surface at the edge 818 of the second surface 820 of the second element 806 quickly changes slope towards the edge formed thereof. Again, this design has the benefit of decreasing the steepness of the first surface of the third element 812.

In another alternative embodiment that can be applied to any of the arrangements described above, the first lens element can be made as a polymer-on-glass wafer level lens instead of a (polymer or glass) monolithic lens. This would mean that there would be a (comparatively thick) glass substrate where the aperture stop and filters would be lithographically applied to the second side thereof, and the first lens surface would be replicated on the first side. This "hybrid lens" would then be stacked with the second and third lens elements, which would both be fabricated by a monolithic lens process. Alternatively, the second lens element could be a hybrid lens in which the polymer lens surfaces would be replicated on both sides of a thinner glass substrate. However, the third lens element would always be monolithic due to the menisc-nature of this lens. There are several advantages of this combination of technologies, namely:

The first lens is a comparatively thick element with a plane backside and a shallow front lens surface, so little is lost functionally by inserting the glass substrate.

The use of the substrate provides additional robustness/stability/planarity during the application of the aperture and filters due to the presence of the glass substrate. In addition, the first lens surface quality can be improved due to the stable glass substrate it is replicated on.

There is less (especially lateral) thermal expansion than with a purely monolithic lens since the thick glass substrate with about $\frac{1}{10}^{th}$ of the CTE of the polymer serves as a permanent carrier of the overall lens stack providing the majority of the mechanical integrity.

Figure 8I:
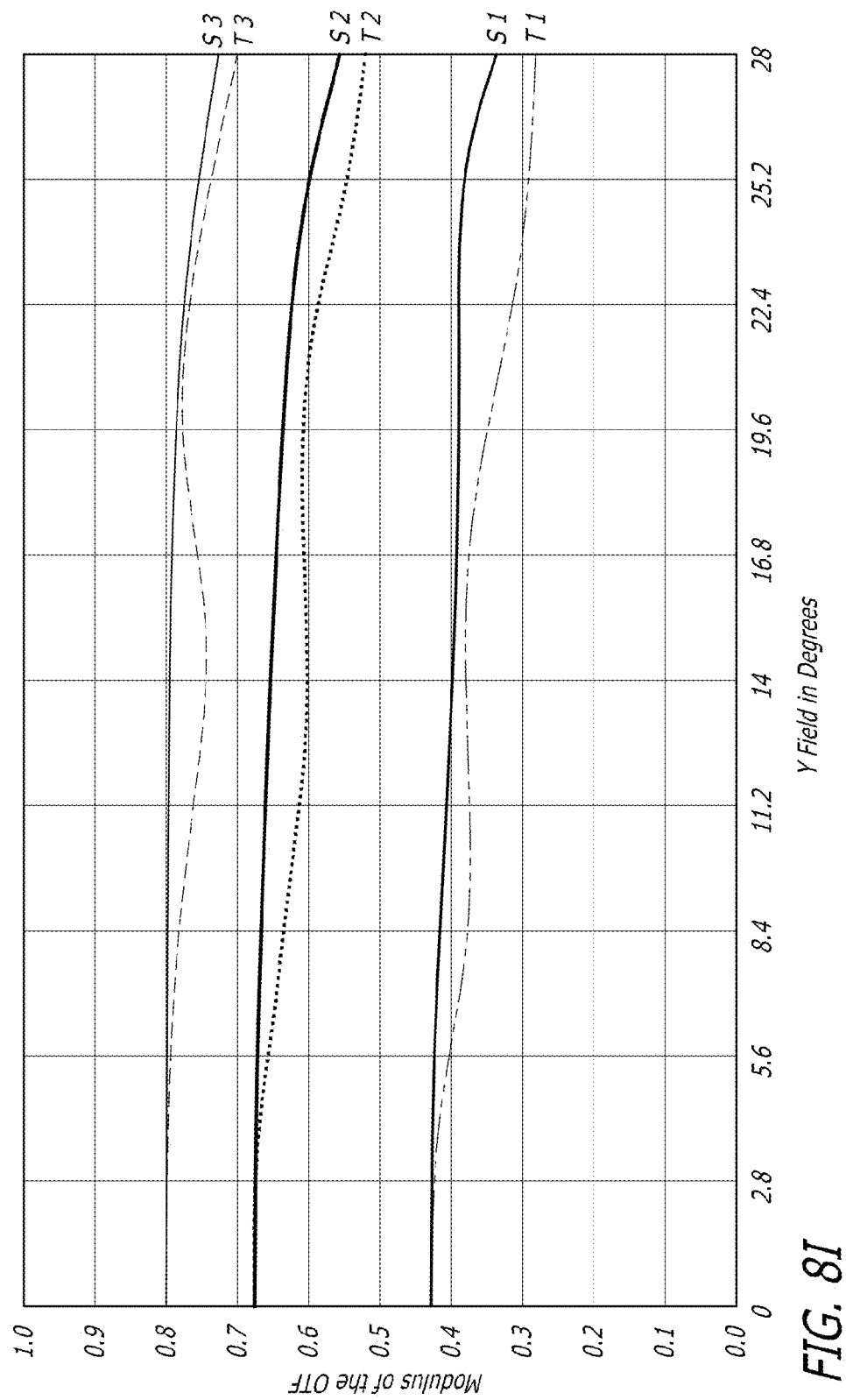
Figure 8J:
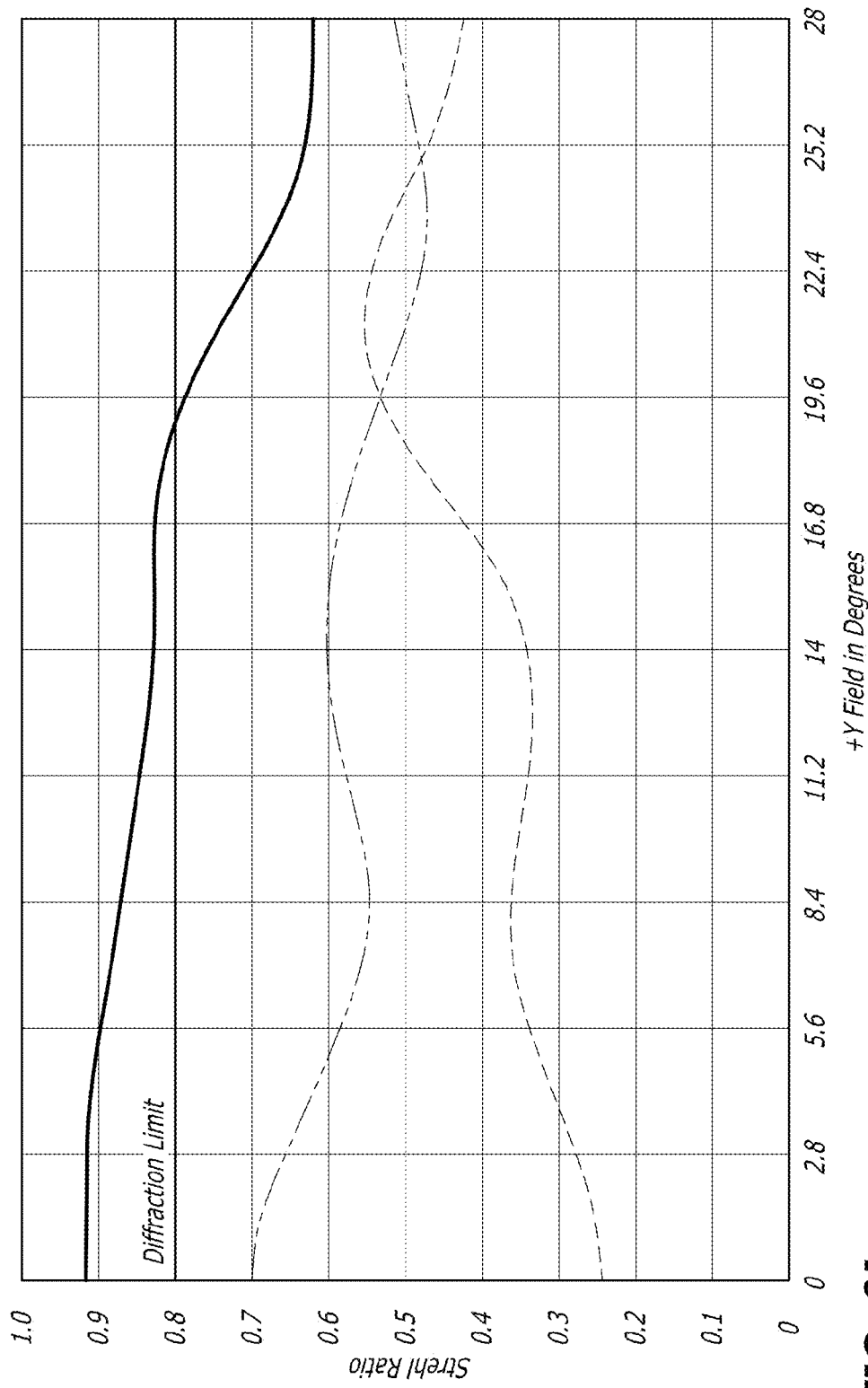

FIGS. 8E to 8J provide data plots showing the optical properties of these novel three-element monolithic optical arrangements. In particular, FIGS. 8E to 8H, provide plots of MTF vs field (8E), Strehl ratio vs. field (8F), distortion and field curvature (8G) as well as MTF vs. spatial frequency (8H) of the lens design shown in FIG. 8A for a green channel. Meanwhile, FIGS. 8I & 8J provide plots of MTF vs field (8I) and Strehl ratio vs. field plots (8J) of the corresponding blue channel of the design shown in FIG. 8A. It should be noted that only the surface profile of the first surface 808 of the second element 806 needs to be altered to optimize the optical arrangement for a different color channel. As can be seen from this data, the three-element monolithic optical arrangement provides high image quality (See, e.g., FIGS. 8E to 8H) comparable to that of a design using a field-flattening element (such as e.g. applied in Embodiment 2 above). Moreover, because only three lens elements need to be stacked in the current design it is much more suitable for manufacture using a monolithic method compared to complex conventional multi-element optical arrangements.

The lens material sequence (i.e., in the above embodiment high Abbe number, high Abbe number, low Abbe number) for the positive, positive, negative elements provides an efficient way of achromatization for each considered channel's spectral band (See Embodiment 6). For example, even for regular dispersion materials the blue channel performance seen in the exemplary embodiment is much better than can be obtained for regular designs (See, e.g., FIGS. 8I and 8J). Moreover, even though for array cameras each channel only has to perform well for a comparatively narrow spectral band, this achromatization still increases the performance since both the central wavelength and the wavelengths at the sides of the used spectral band of the considered channels are imaged sharply.

In many embodiments the MTF characteristics of the three element monolithic optical arrangement allow for contrast at spatial frequencies that are at least as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

Embodiment 6: Different Lens Material Sequences for Channels that Work with Different Spectral Bands Although the above embodiments have focused on specific optical arrangements, it will be understood that the current invention is also directed to novel methods and materials for modifying the optical properties of the various lens elements of these novel optical arrangements. For example, in a first such embodiment, the invention is directed to the use of different lens materials (or combinations thereof) for different color channels.

As shown in FIGS. 9A, 9B and 9D, using conventional array optics, channel specific color-focusing in an array camera so far is limited to adjusting at least one surface, (i.e., the surface profiles of front- and/or backside for lens 900 or lens 902) for channel-specific correction of the back-focal-length (BFL) for axial color. However, the material sequence for the different elements of the lens channels is always the same, independently of the color the considered channel is supposed to work for. It should be noted that the only difference between the lens arrays in FIGS. 9A and 9B is that in FIG. 9B the supporting structure of the array is opaque and going through the full length of a channel. (For reference the specific color channel red "R", green "G", or blue "B" is indicated by the letter in the schematics provided.) However, while there are several materials with high refractive index, which are beneficial in achieving strong refractive power with shallow lens profiles, these materials usually also show high spectral dispersion. In particular, typically one has a choice between high refractive index and low Abbe number (high dispersion) materials ("flint-like"), and low refractive index and high Abbe number (low dispersion) materials ("crown-like"). Indeed, for (lens-) polymers the above connection is always valid, dispersion always increases with increasing refractive index. If this physical connection of the two material properties was not the case, from an optical design standpoint the choice would usually be made to use a high index material (so that the surface of the lens can be shallow, while still maintaining strong optical power) with low dispersion (so that the difference in refractive power for different wavelengths would be small). However, as stated above, such polymer materials are not available, so one has to choose if the priority is on either one of the two properties.

While using a flint-like material can be acceptable for the green and red channels, it can impact the blue spectral band disproportionately, because dispersion is related to the change of refractive index with wavelength and usually this change is stronger in the blue spectral band than in the green and red ones. In short, while green and red channels would profit from the use of such a high index material, the blue channel would show too strong axial color aberration due to the related large dispersion. The current embodiment takes advantage of the array nature of the camera to allow the use of a different material sequence in the blue channel (as shown in FIG. 9C), which may be less optimal with regard to refractive index, but shows much less spectral dispersion. Using such a method makes it possible to adapt one or more lens profiles to optimize a channel to its respective spectral band, and to optimize the material sequence used, e.g., here changing the material sequence for the blue channel.

It should be understood that the ability to modify the material sequence to optimize it for a specific color channel may be used in injection molded lenses (as shown in FIG. 9C) or with a specific type of polymer on glass "WLO" lenses (as shown in FIGS. 9D and 9E) (where the lens material is dispensed in separated islands prior to the replication (e.g. by some device similar to an ink jet) other than with the wafer scale puddle dispense). For example, in an injection molding process a "crown-like" polymer material would, e.g., be PMMA, Zeonex (COP) and Topas (COC), and a "flint-like" material would be Polycarbonate (PC) and Polystyrene (PS). Finally, as described in reference to the invention more broadly, the material sequence may also be modified in glass molded lenses as well.

Embodiment 7: Polymer on Glass WLO Novel Aperture Stop

Again, although the above embodiments have focused on specific optical arrangements, it will be understood that the current invention is also directed to novel methods and materials for modifying the optical properties of the various lens elements of these novel optical arrangements. In a second such embodiment, the invention is directed to a novel arrangement that could be used in any polymer on glass WLO, in which the aperture stop is disposed on a separate substrate in the air spacing between lenses.

As shown schematically in FIG. 10A, in the conventional polymer on glass WLO, apertures 1000, and in particular the aperture stop, is structured on the supporting glass substrate 1002, and then the lenses 1004 and 1006 are replicated above the aperture. In the current embodiment, an additional layer 1010 is introduced between the lens substrates 1012 and 1014, upon which the aperture stop 1016 is disposed. In such an embodiment, the apertures may be made using any suitable technique, such as, for example, transparent openings in an opaque layer (e.g. metal, metal oxide or opaque photoresist) on a thin (glass) substrate, be (metal) etch mask, etc. Positioning the aperture in the air space between the lenses as an additional diaphragm, or as an aperture on very thin (glass) sheet, rather than forcing it to be on the substrate under the polymer lens yields a number lens designs benefits in terms of MTF performance. In contrast, constraining the apertures to the substrate surfaces for a large variety of lens designs reduces performance by 5-10% over the full field.

Embodiment 8: Polymer Injection- or Precision Glass Molded Lens Arrays

Again, although the above embodiments have focused on specific optical arrangements, it will be understood that the current invention is also directed to novel methods of manufacturing the various lens elements of these novel optical arrangements. In a third such embodiment, the invention is directed to a novel method of manufacturing optical arrangements for use in camera arrays in which stand-offs and mechanical self-alignment features for assembly are included in the manufacture of the lenses.

In conventional polymer injection- or precision glass molding techniques, a cavity for producing one lens array (front and back side) is provided. The mold cavity is filled with a suitable material, such as, for example, PMMA or polycarbonate for polymer injection molding or preferably "low-Tg-glasses" such as e.g. P-BK7 or P-SF8 for precision glass molding. Then for conventional camera assembly alignment barrels are used in which the molded lenses are stacked and glued together. In an array camera this method does not provide sufficient alignment precision. The current invention proposes a method in which mechanical alignment features are provided in the lens mold. In other words, during the polymer injection- or precision glass molding process, not only the lens features are replicated into the array, nor even optical alignment marks, but also small mechanical features are formed into the front- and back-faces of the elements, which allow mechanical self-alignment with the adjacent array, such as, for example, complementary rings and spherical segments, pins and holes, cones and pyramids with complementary (and correspondingly shaped) cavities on the opposing element.

Figure 11A:
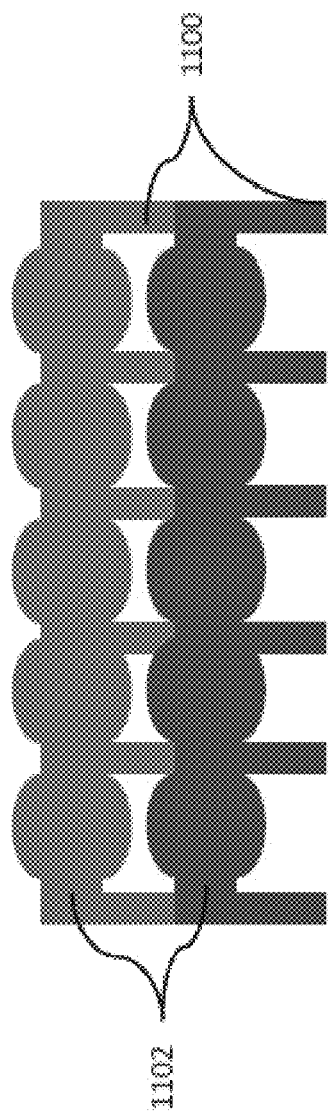
FIGS. 11A and 11B are schematics of optical arrangements having preformed spacing and alignment elements according to one embodiment of the invention.
Figure 11B:
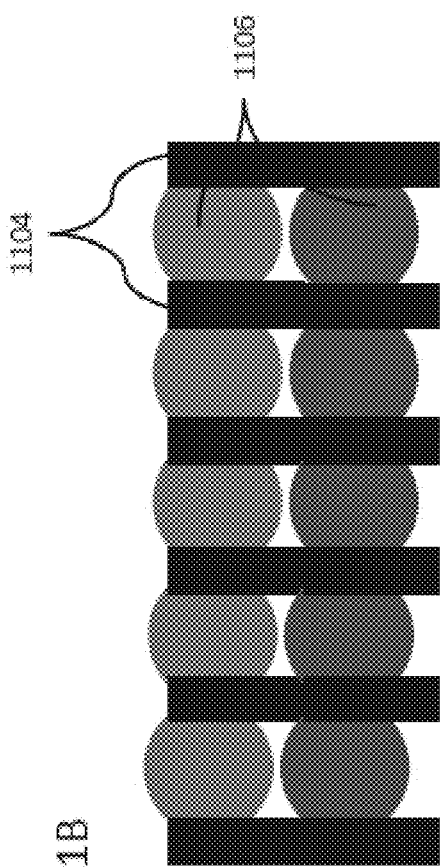

Two such embodiments are shown in FIGS. 11A and 11B. For example, FIG. 11A shows an example in which spacing structures/stand-offs 1100 are included in injection molding process of the lens array 1102. For polymer injection molding it is desirable in such an embodiment that the material combination choice and spacer thickness provide athermalization. In short, it is desirable that the dn/dT of the lens material is compensated by the CTE of spacer. Alternatively, the same technique may be used in independently fabricated spacer or hole matrix structures. In such an embodiment, as shown in FIG. 11B an (opaque) cavity array 1104 is used as the supporting structure into which the lenses 1106 are replicated.

Embodiment 9: Waveplate or Multilevel Diffractive Phase Elements

In yet another embodiment, the invention is directed to a waveplate or multilevel diffractive phase element ("kinoform") for channelwise correction of chromatic aberrations in an array camera, and an iterative fabrication process tolerance compensation.

Currently one of the three or four lens surfaces in the objective is channel-wisely optimized in order to correct for chromatic aberrations of the specific channel (see, e.g., U.S Pat. Pub. No. US-2011-0069189-A1, the disclosure of which is incorporated herein by reference). For this a special mastering regime for the array tool is required since slightly different lenses need to be fabricated within one array. The overall lens property can be considered as the sum of the average required shape, and the individual color correction. However, the total profile has to be implemented by machining, which adds difficulty for diamond turning mastering techniques. (See, e.g., U.S. patent application Ser. No. 13/050,429, the disclosure of which is incorporated herein by reference.)

Lens design experiments show that it could be beneficial to separate the channel-averaged optical power from the channel-specific optical power, which is then related to the color correction. The current embodiment is directed to an optical arrangement that accomplishes this channel-wise correction using a channel-specific surface that introduces only a minor wavefront deformation of exactly the size needed to distinguish the channels from each other so that they are perfectly adapted to their individual waveband. The wavefront deformation required for this is typically on the order of only several wavelengths. As a result, this surface can either be a very shallow refractive surface ("waveplate"), a "low frequency" diffractive lens ("kinoform") or radial symmetric multilevel diffractive phase element. As a result, there is no longer a need to machine slightly different lenses (e.g. by diamond turning), but all the lens surfaces within one array could be equal. In addition, different technologies can be used for the origination of arrays of such channel specific surfaces, including, "classical" lithographic microoptics fabrication technologies such as laser beam writing, gray scale lithography, E-beam lithography, binary lithography, etc. Moreover, these techniques are more suitable for manufacturing slight differences in the surfaces comprised in the array, they have much higher lateral precision than mechanical origination means, and they provide much higher thickness precision (i.e., phase accuracy of the surface).

In addition, it is possible to use the above advantages to compensate for the effects of systematic fabrication errors on image quality. A flow chart of this manufacturing method is provided in FIG. 12. As shown, in a first step the optical channels of the array camera are designed. This at this time includes the nominal shape of the waveplate or multilevel diffractive phase element which is used for channel-wise color aberration correction only. In a second step the array lens module is fabricated by a suitable means (as described above). Then in step three, the systematic deviation of the lens prescriptions from design expectations are determined by lens surface metrology, centering- and distances-measurements are performed, as well as the systematic deviation of optical performance from design expectation are experimentally determined. The module is then redesigned (Step Four) by adapting the above aberration correcting surfaces in order to compensate for all determined systematic errors elsewhere in the stack (profile, xy-position, thickness, etc.). In step six the array lens module is re-fabricated. And finally, the back focal length is used as a last compensator for all remaining systematic deviations (Step Seven). The advantage of this method is that there are more degrees of freedom, rather then being able to change back focal length only, as is the case in conventional system. This leads to better overall performance, potentially without impacting optical magnification.

GENERAL CONSIDERATIONS

Finally, it will be understood that in any of the above embodiments, multiple identical or slightly varied versions of such optical arrangements may be collocated next to each other in an array. The variation of the optical arrangements within an optical array is related to e.g. one of the following optical performance parameters of the considered channel: "color" (identifying the narrow spectral band the considered optical channel is supposed to image of the overall spectral band the whole system shall image), e.g. RGB (and NIR), field of view (FOV), F/#, resolution, object distance, etc. Most typical is the differentiation into different colors, but different FOVs, for example, would allow for different magnifications while different F/#s would allow for different sensitivities and so forth. In many embodiments the MTF characteristics of the optical arrangements are configured to allow for contrast at spatial frequencies that are at least as great as the resolution of the high resolution images synthesized by the array camera, and significantly greater than the Nyquist frequency of the pixel pitch of the pixels on the focal plane, which in some embodiments may be 1.5, 2 or 3 times the Nyquist frequency.

DOCTRINE OF EQUIVALENTS

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. An array camera, comprising:
  a camera array, where the camera array is a monolithic integrated module comprising:
    a single semiconductor substrate on which light sensing elements for a plurality of focal planes are formed, where the light sensing elements of a given focal plane from the plurality of focal planes have a pixel pitch defining a Nyquist frequency;
    optics including a plurality of lens elements forming a plurality of lens stacks, where each lens stack in the plurality of lens stacks:
      forms an image on one of the plurality of focal planes;
      has a field of view that is shifted with respect to the field-of-views of the other lens stacks and so that each shift includes a sub-pixel shifted view of the scene; and
      has a modular transfer function (MTF) such that the lens stack optically resolves contrast at spatial frequencies larger than the Nyquist frequency (Ny); and
    control circuitry that coordinates the independent capture of low resolution images of a scene by the focal planes;
  a processor;
    wherein each of the lens stacks in the plurality of lens stacks comprises a five-surface optical arrangement comprising:
      a first lens element having a first convex proximal surface and a first concave distal surface, wherein the diameter of the first convex surface is larger than the diameter of the first concave surface;
      a second lens element having a second concave proximal surface and a second convex distal surface, wherein the diameter of the second concave proximal surface is smaller than the diameter of the second convex surface; and
      a third lens element having a third concave proximal surface and a third planar distal surface, wherein the diameter of the third concave proximal surface is larger than the diameters of any of the surfaces of the first and second lens elements;
      wherein the first, second and thirds lens elements are arranged sequentially in optical alignment with an imager positioned at the distal end thereof; and
    wherein software directs the processor to:
      obtain a set of low resolution images from the camera array, where each of the low resolution images include aliasing patterns, where each of the low resolution images includes different aliasing patterns due to the different sub-pixel shifted views of the scene provided by the lens stacks;
      determine disparity between pixels in the set of low resolution images to generate a depth map from a reference viewpoint, where the depth map indicates distances to surfaces of scene objects from the reference viewpoint;
      synthesizing a high resolution image using the set of images and the depth map, where the spatial frequency at which the high resolution image displays contrast is greater than the Nyquist frequencies (Ny) of the plurality of focal planes and less than the spatial frequencies at which the plurality of lens stacks optically resolve contrast.

2. The array camera of claim 1, wherein the software further directs the processor to synthesize a high resolution image by:
  determining scene dependent geometric corrections to apply to the pixels from each of the images within the set of low resolution images to eliminate disparity; and
  fusing the set of low resolution images using the scene dependent geometric corrections.

3. The array camera of claim 2, wherein the software further directs the processor to perform super resolution processing to reconstruct the high resolution image using the fused image, the scene dependent geometric corrections, and the set of low resolution images.

4. The array camera of claim 1, wherein the MTF of each of the lens stacks in the plurality of lens stacks is such that the optics optically resolve contrast at spatial frequencies at least 1.5 times the Nyquist frequency Ny.

5. The array camera of claim 1, wherein the MTF of each of the lens stacks in the plurality of lens stacks is such that the optics optically resolve contrast at spatial frequencies at least 2 times the Nyquist frequency Ny.

6. The array camera of claim 1, wherein the MTF of each of the lens stacks in the plurality of lens stacks is such that the optics optically resolve contrast at spatial frequencies at least 3 times the Nyquist frequency Ny.

7. The array camera of claim 1, wherein the MTF of each of the lens stacks in the plurality of lens stacks is such that the optics optically resolve contrast at spatial frequencies at least 10% greater than the Nyquist frequency Ny multiplied by the ratio of the resolution of the high resolution image to the resolution of the images in the set of low resolution images.

8. The array camera of claim 1, wherein the MTF of each of the lens stacks in the plurality of lens stacks is such that the optics optically resolve contrast at spatial frequencies at least 20% greater than the Nyquist frequency Ny multiplied by the ratio of the resolution of the high resolution image to the resolution of the images in the set of low resolution images.

9. The array camera of claim 1, wherein the MTF of each of the lens stacks in the plurality of lens stacks is such that the optics optically resolve contrast at spatial frequencies at least 30% greater than the Nyquist frequency Ny multiplied by the ratio of the resolution of the high resolution image to the resolution of the images in the set of low resolution images.

10. The array camera of claim 1, wherein:
  each lens stack and the focal plane on which it forms an image constitute one of a plurality of cameras in the camera array; and
  each of the plurality of cameras includes one of a plurality of different types of filter.

11. The array camera of claim 10, wherein the each camera includes one of a plurality of different types of filter selected from the group consisting of: spectral color filters; a Bayer Filter, an IR-cut filter, a near-IR filter, a polarizing filter, and a hyper-spectral filter.

12. The array camera of claim 10, wherein cameras that include different types of filter operate with different operating parameters.

13. The array camera of claim 10, wherein cameras having the same type of filter are uniformly distributed about the geometric center of the camera array.

14. The array camera of claim 1, wherein at least one of the cameras formed by the lens stack and focal planes does not include a filter.

15. An array camera, comprising:
a camera array, where the camera array is a monolithic integrated module comprising:
a single semiconductor substrate on which light sensing elements for a plurality of focal planes are formed, where the light sensing elements of a given focal plane from the plurality of focal planes have a pixel pitch defining a Nyquist frequency;
optics including a plurality of lens elements forming a plurality of lens stacks, where each lens stack in the plurality of lens stacks:
forms an image on one of the plurality of focal planes;
has a field of view that is shifted with respect to the field-of-views of the other lens stacks and so that each shift includes a sub-pixel shifted view of the scene; and
has a modular transfer function (MTF) such that the lens stack optically resolves contrast at spatial frequencies larger than the Nyquist frequency (Ny); and
control circuitry that coordinates the independent capture of low resolution images of a scene by the focal planes;
wherein each of the lens stacks in the plurality of lens stacks comprises a five-surface optical arrangement comprising:
a first lens element having a first convex proximal surface and a first concave distal surface, wherein the diameter of the first convex surface is larger than the diameter of the first concave surface;
a second lens element having a second concave proximal surface and a second convex distal surface, wherein the diameter of the second concave proximal surface is smaller than the diameter of the second convex surface; and
a third lens element having a third concave proximal surface and a third planar distal surface, wherein the diameter of the third concave proximal surface is larger than the diameters of any of the surfaces of the first and second lens elements:
wherein the first second and thirds lens elements are arranged sequentially in optical alignment with an imager positioned at the distal end thereof; and
a processor;
wherein software directs the processor to:
obtain a set of low resolution images from the camera array, where each of the low resolution images include aliasing patterns, where each of the low resolution images includes different aliasing patterns due to the different sub-pixel shifted views of the scene provided by the lens stacks;
determine disparity between pixels in the set of low resolution images to generate a depth map from a reference viewpoint, where the depth map indicates distances to surfaces of scene objects from the reference viewpoint;
synthesizing a high resolution image using the set of images and the depth map by:
determining scene dependent geometric corrections to apply to the pixels from each of the images within the set of low resolution images to eliminate disparity;
fusing the set of low resolution images using he scene dependent geometric corrections; and
performing super resolution processing to reconstruct the high resolution image using the fused image, the scene dependent geometric corrections, and the set of low resolution images;
wherein the spatial frequency at which the high resolution image displays contrast is greater than the camera Nyquist frequencies (Ny) of the plurality of focal planes and less than the spatial frequencies at which the plurality of lens stacks optically resolve contrast;
wherein each of the cameras formed by the lens stack and focal planes include one of a plurality of different types of filer; and
wherein cameras that include different types of filter operate with different operating parameters.

16. An array camera, comprising:
a camera array, where the camera array is a monolithic integrated module comprising:
a single semiconductor substrate on which light sensing elements for a plurality of focal planes are formed, where the light sensing elements of a given focal plane from the plurality of focal planes have a pixel pitch defining a Nyquist frequency;
optics including a plurality of lens elements forming a plurality of lens stacks, where each lens stack in the plurality of lens stacks:
forms an image on one of the plurality of focal planes;
has a field of view that is shifted with respect to the field-of-views of the other lens stacks and so that each shift includes a sub-pixel shifted view of the scene; and
has a modular transfer function (MTF) such that the lens stack optically resolves contrast at spatial frequencies larger than the Nyquist frequency (Ny); and
control circuitry that coordinates the independent capture of low resolution images of a scene by the focal planes;
wherein the plurality of lens stacks are part of a three-element monolithic lens optical arrangement comprising:
a first lens element having a first convex proximal surface and a first plano distal surface;
a second lens element having a second concave proximal surface and a second convex distal surface;
a third menisci lens element having a third concave proximal surface and a third convex distal surface; and
at least one aperture disposed on the first plano distal surface;

wherein the first, second and third lens elements are arranged sequentially in optical alignment with the aperture stop and an imager; and a processor;

wherein software directs the processor to:
  obtain a set of low resolution images from the camera array, where each of the low resolution images include aliasing patterns, where each of the low resolution images includes different aliasing patterns due to the different sub-pixel shifted views of the scene provided by the lens stacks;
  determine disparity between pixels in the set of low resolution images to generate a depth map from a reference viewpoint, where the depth map indicates distances to surfaces of scene objects from the reference viewpoint;
  synthesizing a high resolution image using the set of images and the depth map by:
    determining scene dependent geometric corrections to apply to the pixels from each of the images within the set of low resolution images to eliminate disparity;
    fusing the set of low resolution images using the scene dependent geometric corrections; and
    performing super resolution processing to reconstruct the high resolution image using the fused image, the scene dependent geometric corrections, and the set of low resolution images;
    wherein the spatial frequency at which the high resolution image displays contrast is greater than the camera Nyquist frequencies (Ny) of the plurality of focal planes and less than the spatial frequencies at which the plurality of lens stacks optically resolve contrast;
  wherein each of the cameras formed by the lens stack and focal planes include one of a plurality of different types of filer; and
  wherein cameras that include different types of filter operate with different operating parameters.

17. An array camera, comprising:
a camera array, where the camera array is a monolithic integrated module comprising:
  a single semiconductor substrate on which light sensing elements for a plurality of focal planes are formed, where the light sensing elements of a given focal plane from the plurality of focal planes have a pixel pitch defining a Nyquist frequency;
  optics including a plurality of lens elements forming a plurality of lens stacks, where each lens stack in the plurality of lens stacks:
    forms an image on one of the plurality of focal planes;
    has a field of view that is shifted with respect to the field-of-views of the other lens stacks and so that each shift includes a sub-pixel shifted view of the scene; and
    has a modular transfer function (MTF) such that the lens stack optically resolves contrast at spatial frequencies larger than the Nyquist frequency (Ny); and
  control circuitry that coordinates the independent capture of low resolution images of a scene by the focal planes;
a processor;
  wherein the plurality of lens stacks are part of a three-element monolithic lens optical arrangement comprising:
    a first lens element having a first convex proximal surface and a first plano distal surface;
    a second lens element having a second concave proximal surface and a second convex distal surface;
    a third menisci lens element having a third concave proximal surface and a third convex distal surface; and
    at least one aperture disposed on the first plano distal surface;
    wherein the first, second and third lens elements are arranged sequentially in optical alignment with the aperture stop and an imager; and
  wherein software directs the processor to:
    obtain a set of low resolution images from the camera array, where each of the low resolution images include aliasing patterns, where each of the low resolution images includes different aliasing patterns due to the different sub-pixel shifted views of the scene provided by the lens stacks;
    determine disparity between pixels in the set of low resolution images to generate a depth map from a reference viewpoint, where the depth map indicates distances to surfaces of scene objects from the reference viewpoint;
    synthesizing a high resolution image using the set of images and the depth map, where the spatial frequency at which the high resolution image displays contrast is greater than the Nyquist frequencies (Ny) of the plurality of focal planes and less than the spatial frequencies at which the plurality of lens stacks optically resolve contrast.

* * * * *